(12) United States Patent
Seo et al.

(10) Patent No.: US 9,606,648 B2
(45) Date of Patent: Mar. 28, 2017

(54) DEFORMABLE DISPLAY DEVICE AND METHOD FOR CONTROLLING THEREOF

(71) Applicant: SAMSUNG ELECTRONICS CO., LTD., Suwon-si (KR)

(72) Inventors: Joon-kyu Seo, Suwon-si (KR); Kyung-a Kang, Seoul (KR); Ji-yeon Kwak, Seoul (KR); Geun-ho Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 557 days.

(21) Appl. No.: 13/858,221

(22) Filed: Apr. 8, 2013

(65) Prior Publication Data

US 2013/0265260 A1 Oct. 10, 2013

(30) Foreign Application Priority Data

Apr. 8, 2012 (KR) .................. 10-2012-0036473

(51) Int. Cl.
*G06F 3/041* (2006.01)
*G06F 1/16* (2006.01)

(52) U.S. Cl.
CPC ............ *G06F 3/041* (2013.01); *G06F 1/1652* (2013.01); *G06F 2203/04102* (2013.01)

(58) Field of Classification Search
CPC .................. G06F 3/041; G06F 1/1652; G06F 2203/04102
See application file for complete search history.

(56) References Cited

U.S. PATENT DOCUMENTS

| 8,543,166 | B2 | 9/2013 | Choi et al. | |
|---|---|---|---|---|
| 2010/0011291 | A1* | 1/2010 | Nurmi | ........................ 715/702 |
| 2010/0056223 | A1 | 3/2010 | Choi et al. | |
| 2010/0060548 | A1 | 3/2010 | Choi et al. | |
| 2010/0120470 | A1 | 5/2010 | Kim et al. | |

(Continued)

FOREIGN PATENT DOCUMENTS

| CN | 102089737 A | 6/2011 |
|---|---|---|
| KR | 1020100027501 A | 3/2010 |

(Continued)

OTHER PUBLICATIONS

Communication dated Dec. 4, 2014, issued by the Australian Patent Office in counterpart Australian Application No. 2013204857.

(Continued)

*Primary Examiner* — Andrew Sasinowski
(74) *Attorney, Agent, or Firm* — Sughrue Mion, PLLC

(57) ABSTRACT

A deformable display device is provided. The deformable display device includes a deformable display, a sensor which senses a deformation located in a first area of the deformable display and a second area of the deformable display and a controller which receives deformation information corresponding to the deformation, determines whether to identify one of only the first area and only the second area as a deformation area of the deformation based on the deformation information, and identifies i) only the first area as the deformation area if it is determined to identify only the first area and ii) only the second area as the deformation area if it is determined to identify only the second area.

27 Claims, 61 Drawing Sheets

(56) References Cited

U.S. PATENT DOCUMENTS

| | | | |
|---|---|---|---|
| 2010/0141605 A1 | 6/2010 | Kang et al. | |
| 2011/0057873 A1 | 3/2011 | Geissler et al. | |
| 2012/0078614 A1* | 3/2012 | Galor et al. | 704/9 |
| 2012/0188153 A1* | 7/2012 | Tziortzis | G06F 1/1641 |
| | | | 345/156 |

FOREIGN PATENT DOCUMENTS

| | | |
|---|---|---|
| KR | 1020110028650 A | 3/2011 |
| WO | 2010004080 A1 | 1/2010 |

OTHER PUBLICATIONS

International Search Report (PCT/ISA/237) dated Jul. 31, 2013 from the International Searching Authority in counterpart Application No. PCT/KR2013/002930.

Written Opinion (PCT/ISA/210) dated Jul. 31, 2013 from the International Searching Authority in counterpart Application No. PCT/KR2013/002930.

Communication dated Apr. 20, 2015 issued by the Australian Patent Office in counterpart Australian Patent Application No. 201304857.

Communication dated Nov. 6, 2015 issued by the Australian Patent Office in Australian Patent Application No. 2013204857.

Communication dated Dec. 4, 2015 issued by the European Patent Office in European Patent Application No. 13162728.3.

Communication issued on Aug. 18, 2015 by the Australian Intellectual Property Office in related Application No. 2013204857.

Communication dated Mar. 14, 2016, issued by the Korean Intellectual Property Office in counterpart Korean Application No. 10-2012-0036473.

Communication dated Sep. 26, 2016, issued by the State Intellectual Property Office of the People's Republic of China in counterpart Chinese Patent Application No. 201380018983.5.

* cited by examiner

DEFORMABLE DISPLAY DEVICE AND METHOD FOR CONTROLLING THEREOF

CROSS-REFERENCE TO RELATED APPLICATION

This application claims priority from Korean Patent Application No. 10-2012-0036473, filed on Apr. 8, 2012 in the Korean Intellectual Property Office, the disclosure of which is incorporated herein by reference in its entirety.

BACKGROUND

1. Field

Apparatuses and methods consistent with exemplary embodiments relate to a deformable display device and a method for controlling thereof, and more particularly, to a deformable display device which includes a display that can be deformed or have its shape changed, and a method for controlling thereof.

2. Description of the Related Art

With the development of electronic technologies, various kinds of display apparatuses have been developed. In particular, display apparatuses such as television (TVs), personal computers (PCs), laptops, tablet PCs, mobile phones, and MP3 players are widely used to such an extent that they can be found in most households.

In order to meet consumer demands for new functions and new forms of displays, an effort to develop new forms of display apparatuses is ongoing. One of the results of this effort is a next generation display apparatus in the form of a flexible display apparatus.

The flexible display apparatus refers to a display apparatus that can be deformed or deformed into different shapes and configuration like paper or rubber.

The flexible display apparatus can be deformed by a force that is applied by a user and thus may be used for various purposes. For instance, the flexible display apparatus may be used for mobile apparatuses such as mobile phones, tablet PCs, electronic albums, personal digital assistants (PDAs), and MP3 players.

The flexible display apparatus has flexibility unlike existing display apparatuses. Considering this characteristic, a method for applying a bending gesture as an inputting means and determining an intended input area of the bending gesture input to the flexible display apparatus is required.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a deformable display device which can use a bending gesture as an inputting means and provide a different function according to a location where bending is performed, and a method for controlling thereof.

According to an aspect of an exemplary embodiment, there is provided a deformable display device including: a deformable display, a sensor which senses a deformation located in a first area of the deformable display and a second area of the deformable display, and a controller which receives deformation information corresponding to the deformation, determines whether to identify one of only the first area and only the second area based on the deformation information, and identifies i) only the first area if it is determined to identify only the first area and ii) only the second area if it is determined to identify only the second area.

The controller may also determine whether to identify both the first area and the second area based on the deformation information and the controller may also identify iii) both the first area and the second area if it is determined to identify both the first area and the second area.

The controller may determine to identify only the first area if the deformation is wholly located in the first area and at least one predetermined margin area adjacent to the first area.

The controller may determine to identify only the second area if the deformation is wholly located in the second area and at least one predetermined margin area adjacent to the second area.

The at least one predetermined margin area adjacent to the first area may be set based upon at least one of a usage history of the deformable display, a manufacturer setting, a bending type, a usage history of a user, and/or a user setting.

The at least one predetermined margin area adjacent to the second area may be set based upon at least one of a usage history of the deformable display, a manufacturer setting, a bending type, a usage history of a user, and/or a user setting.

The deformation information may include at least one of a partial size of the deformation located in one or more areas of the deformable display, a total size of the deformation, an angle of the deformation, a location of the deformation, a number of areas where the deformation is located, and a holding time of the deformation.

The controller may further determines whether to identify one of only the first area and only the second area based on an application being displayed on the deformable display and one or more active input areas corresponding to the application.

The controller further determines whether to identify one of only the first area and only the second area based on a skill level of a user.

The skill level of the user may be determined based upon a user profile comprising at least one of a date of first use of the deformable display by a user, a number of uses of the deformable display by a user, a total time of usage of the deformable display by a user, a metric which indicates an accuracy of deformation inputs by a user, and a total number of deformations input by a user.

The skill level may include at least one of a score of a user determined based upon the user profile and a category of a user determined based upon the user profile.

The deformation may be a line that connects different points at which the sensor outputs a greatest value.

The controller may further determines whether to identify none of the first area and the second area based on the deformation information, and the controller may further identify iv) none of the first area and the second area if it is determined to identify none of the first area and the second area.

According to an aspect of another exemplary embodiment, there is provided a method for controlling a deformable display device including: sensing a deformation located in a first area of the deformable display and a second area the deformable display, receiving deformation information corresponding to the deformation, determining whether to identify one of only the first area and only the second area based on the deformation information, identifying only the first area if it is determined to identify only the first area, and identifying only the second area if it is determined to identify only the second area.

The method may also include determining whether to identify both the first area and the second area based on the deformation information, and identifying both the first area and the second area if it is determined to identify both the first area and the second area.

The identifying only the first area may include identifying only the first area if the deformation is wholly located in the first area and at least one predetermined margin area adjacent to the first area.

The identifying only the second area may include identifying only the second area if the deformation is wholly located in the second area and at least one predetermined margin area adjacent to the second area.

The at least one predetermined margin area adjacent to the first area may be set based upon at least one of a usage history of the deformable display, a manufacturer setting, a bending type, a usage history of a user, and/or a user setting.

The at least one predetermined margin area adjacent to the second area may be set based upon at least one of a usage history of the deformable display, a manufacturer setting, a bending type, a usage history of a user, and/or a user setting.

The deformation information may include at least one of a partial size of the deformation located in one or more areas of the deformable display, a total size of the deformation, an angle of the deformation, a location of the deformation, a number of areas where the deformation is located, and a holding time of the deformation.

The determining whether to identify one of only the first area and only the second area may include determining whether to identify one of only the first area and only the second area based on an application being displayed on the deformable display and one or more active input areas corresponding to the application.

The determining whether to identify one of only the first area and only the second area may include determining whether to identify one of only the first area and only the second area based on a skill level of a user.

The skill level of the user may be determined based upon a user profile comprising at least one of a date of first use of the deformable display by a user, a number of uses of the deformable display by a user, a total time of usage of the deformable display by a user, a metric which indicates an accuracy of deformation inputs by a user, and a total number of deformations input by a user.

The skill level may be at least one of a score of a user determined based upon the user profile and a category of a user determined based upon the user profile.

The deformation may be a line that connects different points at which the sensor outputs a greatest value.

The method may also include determining whether to identify none of the first area and the second area based on the deformation information and identifying none of the first area and the second area if it is determined to identify none of the first area and the second area.

The method may be embodied on a non-transitory computer readable medium having recorded thereon instructions which are executed by a computer to perform the method.

According to the exemplary embodiments described above, the bending of the display may be used as an inputting means for performing various functions. Accordingly, user's convenience can be improved.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF EXEMPLARY EMBODIMENTS

Figure 1:
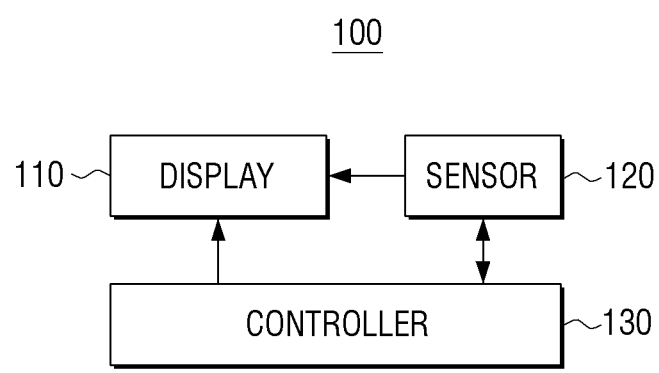
FIG. 1 is a block diagram illustrating a display apparatus according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a block diagram illustrating a display apparatus according to an exemplary embodiment. Referring to FIG. 1, a display apparatus 100 (or, a deformable display device 100) includes a display 110, a sensor 120, and a controller 130.

The display apparatus 100 of FIG. 1 may be embodied by various types of apparatuses which are portable and have a display function, such as a mobile phone, a smart phone, a portable multimedia player (PMP), a personal digital assistant (PDA), a tablet PC, or a navigation system. Also, the display apparatus 100 may be embodied by a stationary type apparatus such as a monitor, a TV, or a kiosk, besides the portable apparatus.

The display apparatus 100 including the display 110 is bendable (e.g., deformable). Accordingly, the display 110 may be implemented in a flexible form. That is, the display 110 should have a bendable structure and be made of a flexible material, while maintaining a display characteristic of an existing flat panel display. Hereinafter, a detailed configuration of the display 110 will be explained with reference to FIG. 2.

Figure 2:
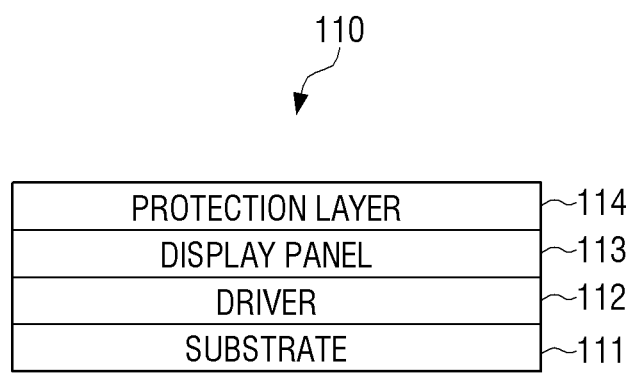
FIG. 2 is a view illustrating an example of a display which has flexibility.

FIG. 2 is a view illustrating a basic structure of the display according to an exemplary embodiment. Referring to FIG. 2, the display 110 includes a substrate 111, a driver 112, a display panel 113, and a protection layer 114.

The substrate 111 may be implemented by using a plastic substrate (for example, a high molecular film) which is deformable by an external pressure.

The plastic substrate has a structure which is formed by barrier coating opposite surfaces of a base film. The base film may be implemented by using various resins such as polyimide (PI), polycarbonate (PC), polyethyleneterephtalate (PET), polyethersulfone (PES), polythylenenaphthalate (PEN), and fiber reinforced plastic (FRP). The barrier coating is performed on the opposite surfaces of the base film, and an organic membrane or an inorganic membrane may be used for the purpose of maintaining flexibility.

The substrate 111 may also be formed of a flexible material such as thin glass or metal foil The driver 112 drives the display panel 113. Specifically, the driver 112 applies a driving voltage to a plurality of pixels which constitute the display panel 113, and may be implemented by using a-si TFT, a low temperature poly silicon (LTPS) TFT, or an organic TFT (OTFT). The driver 112 may also be implemented in various forms according to the form of the display panel 113. For instance, the display panel 113 may consist of an organic light emitting substance which includes a plurality of pixel cells, and an electrode layer which covers opposite surfaces of the organic light emitting substance. In this case, the driver 112 may include a plurality of transistors corresponding to the plurality of pixel cells of the display panel 113. The controller 130 applies an electric signal to a gate of each transistor and controls the pixel cells connected to the transistors to emit light. Accordingly, an image is displayed.

The display panel 113 may be implemented by using an electroluminescent display (EL), an electrophoretic display (EPD), an electrochromic display (ECD), a liquid crystal display (LCD), an active matrix LCD (AMLCD), and a plasma display panel (PDP), besides an organic light emitting diode (OLED). If the display panel 113 is embodied by the LCD, it cannot emit light by itself and thus may require a separate backlight unit. If the LCD does not use backlight, it may use ambient light. In order to use the LCD display panel 113 without the backlight unit, an environment such as an outdoor environment which admits plenty of light may be used to operate the LCD.

The protection layer 114 protects the display panel 113. For example, the protection layer 114 may be made of ZrO, CeO2, or Th O2. The protection layer 114 may be manufactured as a transparent film and may cover the entire surface of the display panel 113.

The display 110 may also be implemented by using electronic paper (e-paper). The e-paper is a display that applies general ink characteristics to paper, and is different from a general flat panel display in that it uses reflected light. The electronic paper may change a picture or text using electrophoresis, which uses a twist ball or a capsule.

The electronic paper inserts a ball or a capsule between two thin electrode plates, and changes a picture or text using electrophoresis. In the case of the ball, the ball is divided into two parts, that is, a bright part and a dark part, and has positive charge and negative charge in the two parts. Accordingly, the ball is rotated by an external voltage and displays light and shade. In the case of the capsule, the capsule contains a plurality of minute particles having an electric charge called electronic ink, and the fixed capsule moves the electronic ink and displays light and shade.

If the display 110 is comprised of elements which are made of a transparent material, the display 110 may be implemented as a display apparatus that is bendable and transparent. For example, if the substrate 111 is made of a polymer material such as plastic having transparency, if the driver 112 is implemented by using a transparent transistor, and if the display panel 113 is implemented by using a transparent organic light emitting layer and a transparent electrode, the display 110 may have transparency.

The transparent transistor refers to a transistor that is manufactured by substituting opaque silicon of an existing thin film transistor with a transparent material such as zinc oxide or titanium oxide. The transparent electrode may be made of advanced materials such as indium tin oxide (ITO) or graphene. Graphene refers to a material that has a planar structure of a honeycomb shape in which carbon atoms are connected to one another, and has transparency. The transparent organic light emitting layer may be implemented by using various materials.

Referring back to FIG. 1, the sensor 120 senses a bending line (e.g., a deformation line) which is formed by bending the display. Specifically, the sensor 120 may sense a location of the bending line.

To achieve this, the sensor 120 may include a bend sensor (e.g., a deformation sensor). That is, the sensor 120 may include a bend sensor which is disposed on one surface such as a front surface or a rear surface of the display 110, or a bend sensor which is disposed on opposite surfaces of the display 110. The controller 130 may sense bending using a value which is sensed by the bend sensor of the sensor 120.

The bend sensor refers to a sensor that can be bent (e.g., deformed) in itself and has a resistance value which varies according to a degree of bending. The bending sensor may be implemented by using a strain gauge. The strain gage uses metal or a semiconductor in which a resistance is greatly changed according to an applied force, and senses a deformation of a surface of an object to be measured according to a change in the resistance value. It is common that a material such as metal increases a resistance value if its length is stretched by an external force, and decreases the resistance value if the length is contracted. Accordingly, it is determined whether bending is performed or not by sensing a change in the resistance value.

The sensor 120 may sense a resistance value of the bend sensor using a level of a voltage applied to the bend sensor or an intensity of a current flowing in the bend sensor, and may sense bending in a location of the bend sensor according to the sensed resistance value.

Figure 3:
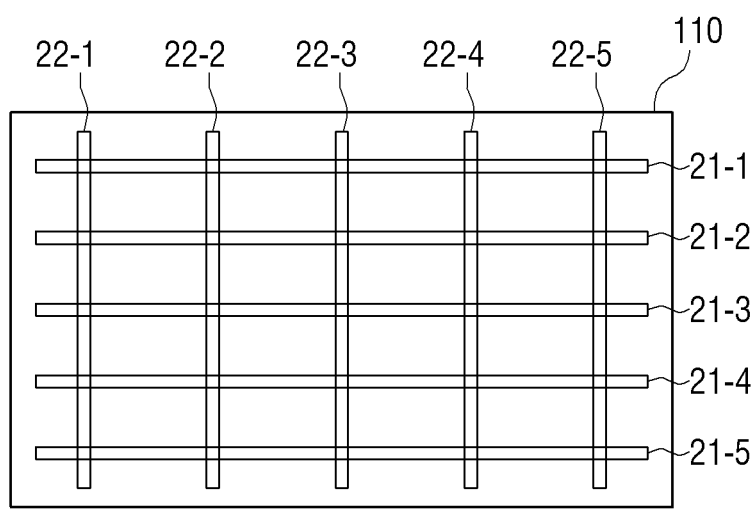
FIGS. 3 to 5 are views illustrating an example of a method for sensing bending of a display apparatus according to an exemplary embodiment.

In FIG. 3, the bend sensor is embedded in the front surface of the display 110. However, this is merely an example and the bend sensor may be embedded in the rear surface of the display 110 or may be embedded in opposite surfaces. Also, the shape, number, and location of bend sensors may be changed variously.

FIG. 3 illustrates an example of a plurality of bar-shaped bend sensors which are arranged in a vertical direction and a horizontal direction in a grid pattern.

Referring to FIG. 3, the bend sensor includes bend sensors 21-1 to 21-5 which are arranged in a first direction, and bend sensors 22-1 to 22-5 which are arranged in a second direction which is perpendicular to the first direction. The bend sensors are disposed away from one another by a predetermined distance.

In FIG. 3, five bend sensors (21-1 to 21-5, 22-1 or 22-5) are arranged in each of the horizontal direction and the vertical direction in a grid formation. However, this is merely an example and the number of bend sensors may be changed according to a size of the display. The bend sensors are arranged in the horizontal direction and the vertical direction to sense bending from the entire area of the flexible display apparatus. Therefore, if only a part of the display apparatus is flexible or if the display apparatus needs to sense bending from only a part of the apparatus, the bend sensor may be arranged in only a corresponding portion of the apparatus.

Each of the bend sensors 21-1 to 21-5, 22-1 to 22-5 may be implemented by using an electric resistance sensor which uses an electric resistance, or a micro optical fiber sensor which uses a strain of an optical fiber. Hereinafter, the bend sensor will be explained with the assumption that the bend sensor is the electric resistance sensor for the convenience of explanation.

Figure 4:
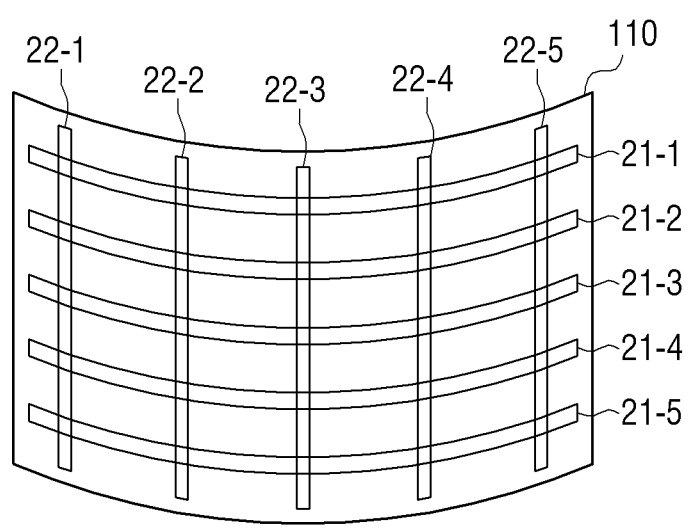

Specifically, if the display 110 is bent so that its center area with reference to left and right edges is oriented downwardly as shown in FIG. 4, tension caused by bending is exerted to the bend sensors 21-1 to 21-5 which are arranged in the horizontal direction. Therefore, the resistance value of each of the bend sensors 21-1 to 21-5 arranged in the horizontal direction is changed. The sensor 120 senses the change in the output value output from each of the bend sensor 21-1 to 21-5 and thus determines that bending is performed in the horizontal direction with reference to the center of a display surface. In FIG. 4, the center area is bent in a downward direction (hereinafter, referred to as a Z− direction) which is perpendicular to the display surface. However, even if the center area is bent in an upward direction (hereinafter, referred to as a Z+ direction) with reference to the display surface, the bending may be sensed based on the change in the output values of the bend sensors 21-1 to 21-5 arranged in the horizontal direction.

Figure 5:
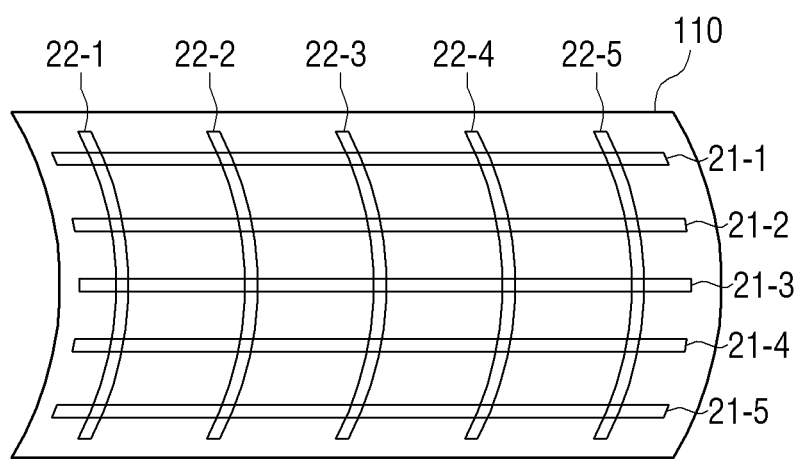

If the display 110 is bent so that the center area with reference to upper and lower edges is oriented upwardly as shown in FIG. 5, tension is exerted to the bend sensors 22-1 to 22-5 which are arranged in the vertical direction. The sensor 120 may sense shape deformation of the vertical direction based on the output values of the bend sensors 22-1 to 22-5 arranged in the vertical direction. Although the bending in the Z+ direction is illustrated in FIG. 5, bending in the Z− direction may also be sensed using the bend sensors 22-1 to 22-5 which are arranged in the vertical direction.

If shape deformation occurs in a diagonal direction, tension is exerted to all of the bend sensors which are arranged in the horizontal direction and the vertical direction. Therefore, the shape deformation of the diagonal direction may be sensed based on the output values of the bend sensors which are arranged in the horizontal and vertical directions.

Hereinafter, a method for sensing bending using a bending sensor will be explained in detail.

Figure 6:
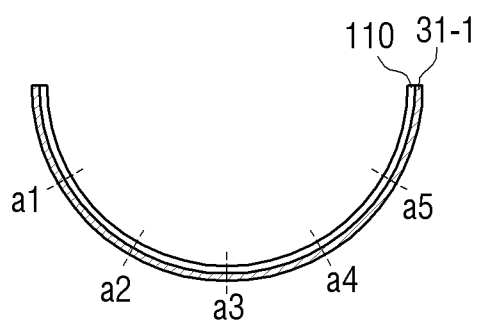
FIGS. 6 to 8 are views illustrating an example of a method for sensing bending using a bend sensor in a display apparatus.
Figure 7:
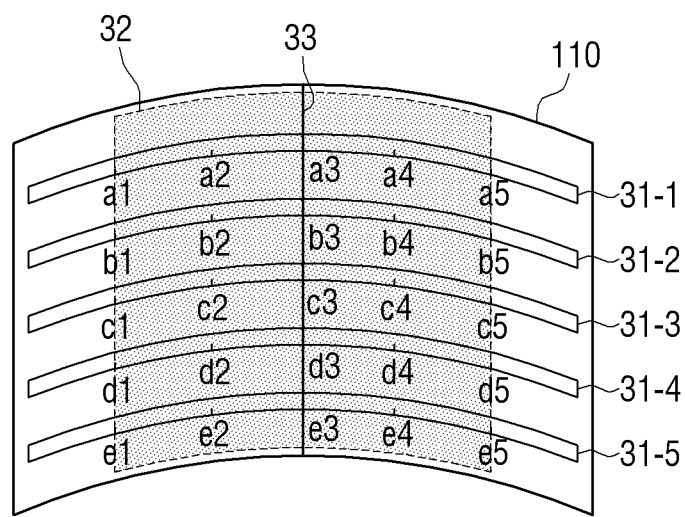
Figure 8:
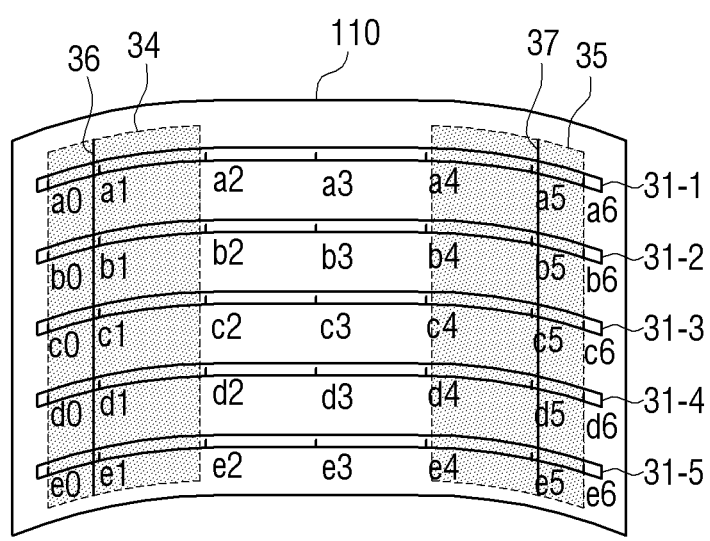

FIGS. 6 to 8 are views illustrating a method for sensing bending in the display apparatus using the bend sensors according to an exemplary embodiment.

First, FIG. 6 is a cross section view of the display apparatus 100 when the display is bent.

If the display 110 is bent, the bend sensors, which are arranged on one surface or opposite surfaces of the display, are also bent and have resistance values corresponding to a magnitude of exerted tension, and output values corresponding to the resistance values.

For instance, if the display 110 is bent as shown in FIG. 6, a bend sensor 31-1 which is disposed on a rear surface of the display 110 is also bent and outputs a resistance value according to a magnitude of exerted tension.

In this case, the magnitude of the tension increases in proportion to a degree of bending. If the bending occurs as shown in FIG. 6, the greatest bending occurs in the center area. Accordingly, the greatest tension is exerted to the bend sensor 31-1, which is disposed at a point a3 which is the center area, and accordingly, the bend sensor 31-1 has the greatest resistance value. On the other hand, the degree of bending gradually decreases toward the outside. Accordingly, the bend sensor 31-1 has smaller resistance values as it goes away from the point a3 to points a2 and a1 or points a4 and a5.

If the resistance value output from the bend sensor has the greatest value at a specific point and gradually decreases in opposite directions, the sensor 120 may determine that the area from which the greatest resistance value is sensed is most significantly bent. Also, if an area has no change in the resistance value, the sensor 120 determines that the area is a flat area in which bending is not performed, and, if an area has the resistance value changed greater than a predetermined value, determines that the area is a bent area in which a degree of bending occurs.

FIGS. 7 and 8 are views illustrating a method for defining a bending area according to an exemplary embodiment. FIGS. 7 and 8 are views illustrating the case in which the display apparatus 100 is bent in the horizontal direction with reference to the front surface, and thus do not illustrate the bend sensors which are arranged in the vertical direction for the convenience of explanation. Although different reference numerals are used for the bend sensors in each drawing, the bend sensors illustrated in FIG. 3 may be used as they are.

A bending area is an area in which the display apparatus is bent. Since the bend sensor is also bent by bending, all points at which the bend sensors output different resistance values from originals values may delineate a bending area.

The sensor 120 may sense a size of a bending area, a location of the bending area, and a number of bending areas, a location of a bending line, a range of a bending line, and a direction of the bending line based on a relationship between the points at which a change in the resistance value is sensed.

Specifically, if a distance between the points at which the change in the resistance value is sensed lies within a predetermined distance, the points are sensed as one bending area. On the other hand, if the distance between the points at which the change in the resistance value is sensed lies beyond the predetermined distance, different bending areas are delineated with reference to these points. This will be explained in detail below with reference to FIGS. 7 and 8.

FIG. 7 is a view illustrating a method for sensing one bending area. If the display 110 is bent as shown in FIG. 7, the resistance values from points a1 to a5 of a bend sensor 31-1, from points b1 to b5 of a bend sensor 31-2, from c1 to c5 of a bend sensor 31-3, from points d1 to d5 of a bend sensor 31-4, and from points e1 to e5 of a bend sensor 51-5 are different from the resistance values from the aforementioned points in their default or original state.

In this case, the points at which the change in the resistance value is sensed in each bend sensor 31-1 to 31-5 are located within a predetermined distance and are continuously arranged.

Accordingly, the sensor 120 senses an area 32 which includes all of the points, from points a1 to a5 of the bend sensor 31-1, from points b1 to b5 of the bend sensor 31-2, from points c1 to c5 of the bend sensor 31-3, from points d1 to d5 of the bend sensor 31-4, and from points e1 to e5 of the bend sensor 31-5, as one bending area.

FIG. 8 is a view illustrating a method for sensing a plurality of bending areas.

In FIG. 8, according to bending of the display, the resistance values from points a1 to a2 and from points a4 to a5 of the bend sensors 31-1, from points b1 to b2 and from points b4 to b5 of the bend sensor 31-2, from the points c1 to c2 and from points c4 to c5 of the bend sensor 31-3, from the points d1 to d2 and from the points d4 to d5 of the bend sensors 31-4, and from the points e1 to e2 and from the points e4 to e5 of the bend sensor 31-5 are different from the resistance values of points in their default or original state.

The points from a1 to a2 and the points from a4 to a5 in the bend sensor 31-1 are continuous with reference to each point. However, since a point a3 exists between the points a2 and a4, the points from a2 to a4 are not continuous. Accordingly, if the points a2 and a4 are regarded as being disposed away from each other by a predetermined distance, the bending area is divided into a bending area from the points a1 to a2 and a bending area from the points a4 to a5. Also, the points in the other bend sensors 31-2 to 31-5 may be divided in this way.

Accordingly, the flexible display apparatus 100 delineates an area 34 including all of the points from a1 to a2 of the bend sensor 31-1, from b1 to b2 of the bend sensor 31-2, from c1 to c2 of the bend sensor 31-3, from d1 to d2 of the bend sensor 31-4, and from e1 to e2 of the bend sensor 31-5, as one bend area, and delineates an area 35 including all of the points from a4 to a5 of the bend sensor 31-1, from b4 to b5 of the bend sensor 31-2, from c4 to c5 of the bend sensor 31-3, from d4 to d5 of the bend sensor 31-4, and from e4 to e5 of the bend sensor 31-5, as another bend area.

The bending area may include a bending line. The bending line may refer to a line which connects different points at which the greatest value is output in the bend sensor. That is, the bending line may be a line which connects the points at which the greatest resistance value is sensed in each bending area.

For instance, in the case of FIG. 7, a line 33 in the bending area 32, which connects the point a3 at which the greatest resistance value is output in the bend sensor 31-1, the point b3 at which the greatest resistance value is output in the bend sensor 31-2, the point c3 at which the greatest resistance value is output in the bend sensor 31-3, the point d3 at which the greatest resistance value is output in the bend sensor 31-4, and the point e3 at which the greatest resistance value is output in the bend sensor 31-5, corresponds to a bending line. FIG. 7 illustrates the bending line which is formed in the center area of the display surface in the vertical direction.

In the case of FIG. 8, a line 36 in the bending area 34, which connects the point a1 at which the greatest resistance value is output in the bend sensor 31-1, the point b1 at which the greatest resistance value is output in the bend sensor 31-2, the point c1 at which the greatest resistance value is output in the bend sensor 31-3, the point d1 at which the greatest resistance value is output in the bend sensor 31-4, and the point e1 at which the greatest resistance value is output in the bend sensor 31-5, delineates one bending line. Also, a line 37 in the bending area 35, which connects the point a5 at which the greatest resistance value is output in the bend sensor 31-1, the point b5 at which the greatest resistance value is output in the bend sensor 31-2, the point c5 at which the greatest resistance value is output in the bend sensor 31-3, the point d5 at which the greatest resistance value is output in the bend sensor 31-4, and the point e5 at which the greatest resistance value is output in the bend sensor 31-5, delineates another bending line. That is, in FIG. 8, the two vertical bending lines are formed along the left and right edges of the display surface.

Figure 9:
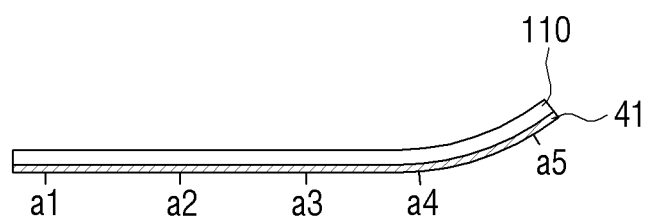
FIGS. 9 and 10 are views illustrating a method for determining a degree of shape deformation in a display apparatus.
Figure 10:
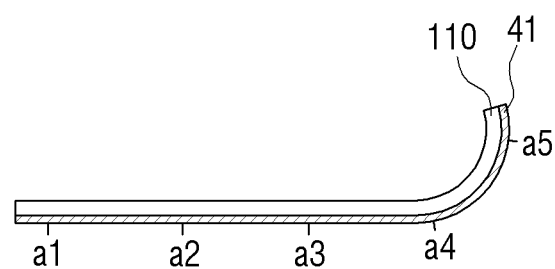

FIGS. 9 and 10 are views illustrating a method for determining a degree of bending.

Referring to FIGS. 9 and 10, the display apparatus 100 determines a degree of bending of the display 110 using a change in the resistance value output from the bend sensor at a predetermined interval.

Specifically, the controller 130 calculates a difference between a resistance value of a point where the greatest resistance value of a bend sensor is output and a resistance value output at a point which is disposed away from the point of the greatest resistance value by a predetermined distance.

The controller 130 determines a degree of bending using the calculated difference in the resistance value. Specifically, the display apparatus 100 divides the degree of bending into a plurality of levels, matches each level with a resistance value of a predetermined range, and stores the matched values.

Accordingly, the display apparatus 100 determines the degree of bending according to which level of the plurality of levels corresponds to the calculated resistance value difference.

For instance, as shown in FIGS. 9 and 10, the degree of bending is determined based on a difference between a resistance value output at a point a5 where a bend sensor 41 disposed on the rear surface of the display 100 outputs the greatest resistance value, and a resistance value output at a point a4 which is disposed away from the point a5 by a predetermined distance.

Specifically, a level corresponding to the resistance value difference, which is calculated in the exemplary embodiment of FIG. 9 and, is identified from among the plurality of pre-stored levels, and a degree of bending is determined based on the identified level. The degree of bending may be represented by a bending angle or an intensity of bending.

Since the degree of bending illustrated in FIG. 10 is greater than that of FIG. 9, the difference between the resistance value output at the point a5 and the resistance value output at the point a4 in the exemplary embodiment of FIG. 10 is greater than the difference between the resistance value output at the point a5 and the resistance value output the point a4 in the exemplary embodiment of FIG. 9. Accordingly, if the display apparatus 100 is bent as shown in FIG. 10, the controller 130 may determine that the degree of bending is increased.

As described above, the display 110 may be bent in different directions, a Z+ direction or a Z− direction.

The bending direction may be defined in various ways. It is assumed that the display 110 is a 2-dimensional x-y plane. If the left/right or upper/lower sides of the display 10 is bent concavely or convexly, and if the convex area of the bent display 110 is oriented in a z− direction of an z-axis which is perpendicular to the x-y plane, the bending direction is a Z+ direction, and, if the convex area of the bent display 110 is oriented in a z+ direction of the z-axis, the bending direction is a Z− direction. On the other hand, if the center of the display 110 is bent concavely or convexly, and if the convex area of the bent display 110 is oriented in the z+ direction of the z-axis which is perpendicular to the x-y plane, the bending direction is the Z+ direction, and, if the convex area of the bent display 110 is oriented in the z− direction of the z-axis, the bending direction is the Z− direction. However, this is merely an example and the bending direction may be defined variously.

The bending direction may be sensed in various ways. For instance, two bend sensors may be disposed one on the other and the bending direction is determined based on a difference in change in the resistance value of each bend sensor. A method for sensing a bending direction using overlapping bend sensors will be explained with reference to FIGS. 11 to 13.

Figure 11:
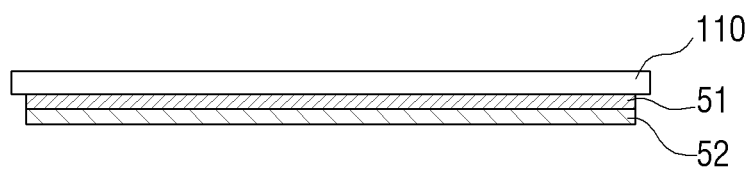
FIGS. 11 to 13 are views illustrating an example of a method for sensing a bending direction in a display apparatus.

Referring to FIG. 11, two bend sensors 51 and 52 may be disposed overlapping each other on one side of the display 110. In this case, if bending is performed in one direction, different resistance values are output from the upper bend sensor 51 and the lower bend sensor 52 at a point where the bending is performed. Accordingly, a bending direction may be determined by comparing the resistance values of the two bend sensors 51 and 52 at the same point.

Figure 12:
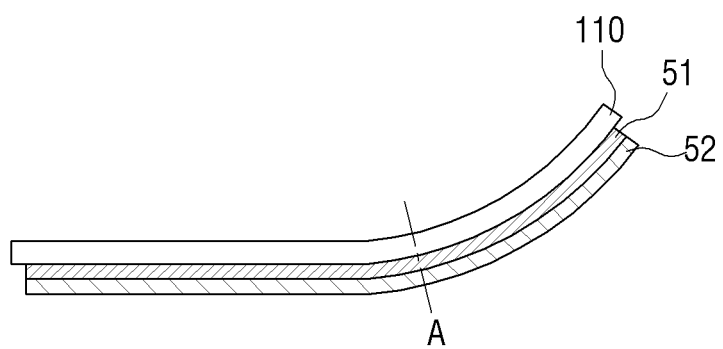

Specifically, if the display 110 is bent in the Z+ direction as shown in FIG. 12, tension exerted to the lower bend sensor 52 is greater than that of the upper bend sensor 71 at a point 'A' corresponding to a bending line.

Figure 13:
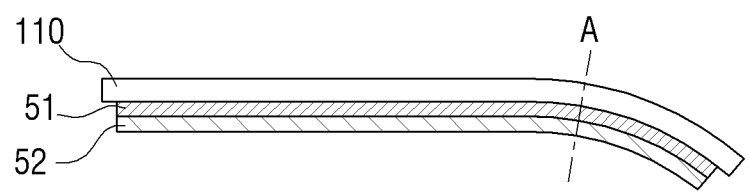

On the other hand, if the display 110 is bent toward the rear surface as shown in FIG. 13, tension exerted to the upper bend sensor 51 is greater than that of the lower bend sensor 52.

Accordingly, the controller 130 senses the bending direction by comparing the resistance values of the two bend sensors 51 and 52 at the point A.

Although the two bend sensors are disposed overlapping each other on one side of the display 110 in FIGS. 11 to 13, the bend sensors may be disposed on opposite surfaces of the display 110.

Figure 14:
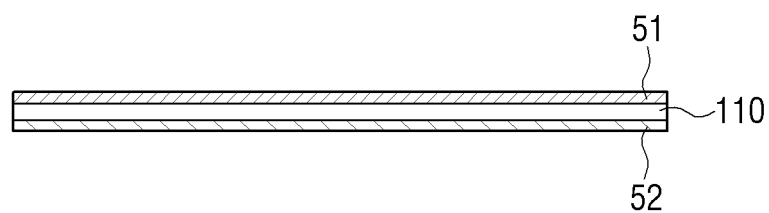
FIGS. 14 to 16 are views illustrating various examples of a structure to sense bending of a display apparatus.

FIG. 14 illustrates the two bend sensors 51 and 52 which are disposed on the opposite surfaces of the display 110.

Accordingly, if the display 110 is bent in a first direction perpendicular to the screen (hereinafter, the Z+ direction), the bend sensor which is disposed on a first surface of the opposite surfaces of the display 110 is subject to a compressive force, whereas the bend sensor which is disposed on a second surface is subject to tension. On the other hand, if the display 110 is bent in a second direction opposite to the first direction (hereinafter, the Z− direction), the bend sensor disposed on the second surface is subject to a compressive force, whereas the bend sensor disposed on the first surface is subject to tension. As described above, the different values are detected from the two bend sensors according to the bending direction and the controller 130 determines the bending direction according to a detection characteristic of the value.

Although the bending direction is sensed using the two bend sensors in FIGS. 11 to 14, the bending direction may be sensed by means of only a strain gage disposed on one surface of the display 110. That is, a compressive force or tension is exerted to the strain gage disposed on one surface according to a bending direction, and thus a bending direction can be determined by identifying a characteristic of the output value.

Figure 15:
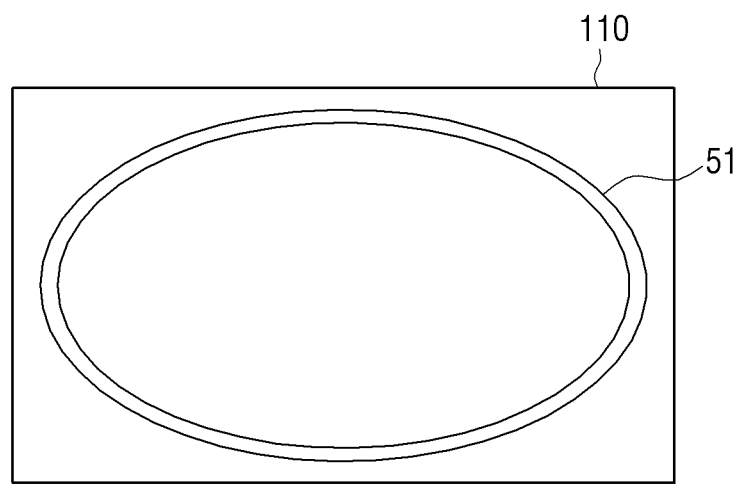

FIG. 15 is a view illustrating an example of a single bend sensor which is disposed on one surface of the display 110 to sense bending. Referring to FIG. 15, a bend sensor 51 may be implemented in a form of a looped curve forming a circle, a quadrangle, or other polygons, and may be disposed along an edge of the display 110. The controller 130 may determine a point at which a change in an output value of the looped curve is sensed to be a bending area. The bend sensor may be connected to the display 110 in a form of an open curve such as an S shape, a Z shape, or a zigzag shape.

Figure 16:
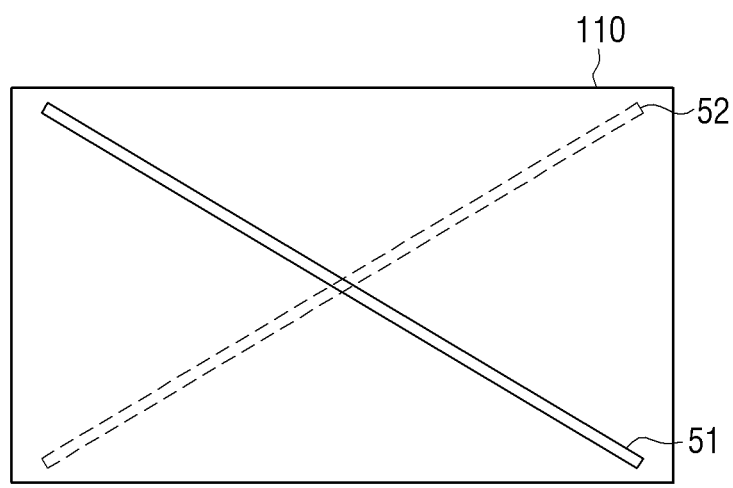

FIG. 16 is a view illustrating two bend sensors which intersect. Referring to FIG. 16, a first bend sensor 51 is disposed on a first surface of the display 110 and a second bend sensor 52 is disposed on a second surface of the display 110. The first bend sensor 51 is disposed on the first surface of the display 110 in a first diagonal direction, and the second bend sensor 52 is disposed on the second surface in a second diagonal direction. Accordingly, output values and output points of the first and second bend sensors 51 and 52 are changed according to various bending conditions such as a case in which each corner is bent, a case in which each edge is bent, and a case in which a center is bent. Accordingly, the controller 130 may determine which type of bending is performed according to a characteristic of the output value.

Although line type bend sensors are used in the above-described various exemplary embodiments, bending may be sensed using a plurality of separate strain gages.

Figure 17:
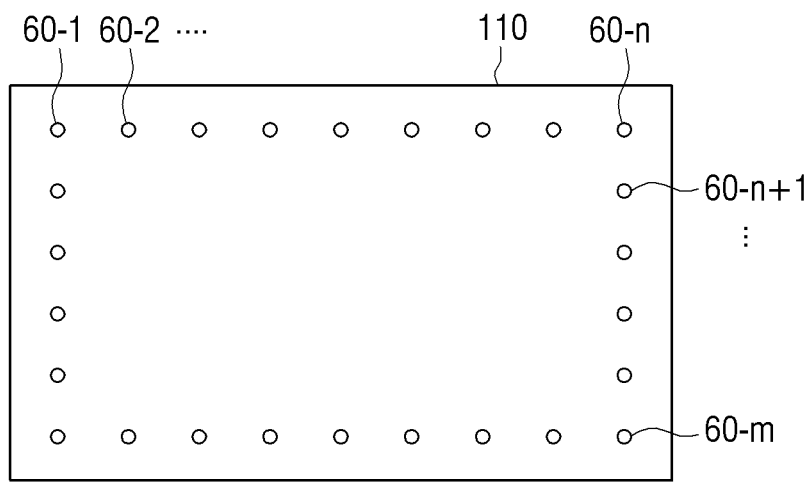
FIG. 17 is a view illustrating another example of a structure to sense bending of a display apparatus.
Figure 18:
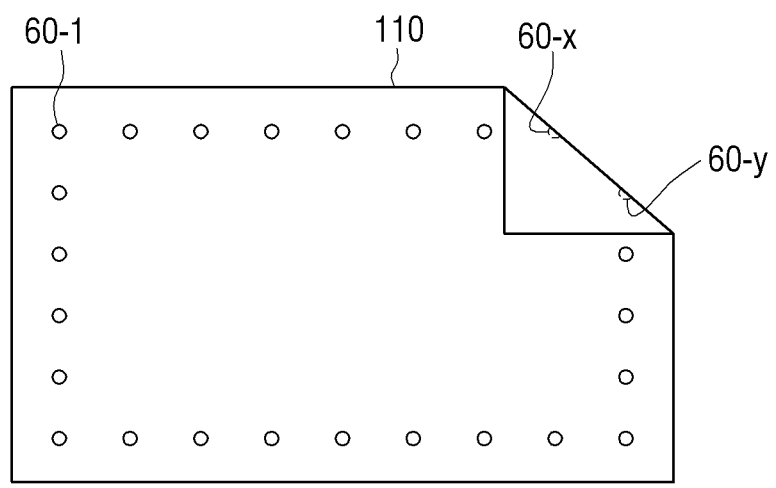
FIG. 18 is a view illustrating a method for sensing bending using the structure of FIG. 17.

FIGS. 17 and 18 are views illustrating a method for sensing bending using a plurality of strain gages.

Referring to FIG. 17, a plurality of strain gages are arranged along an edge of the display 110. The number of strain gages may be changed according to a size and a shape of the display 110, or a predetermined bending sensing resolution.

In the state in which the strain gages are arranged as shown in FIG. 17, a user may bend a certain point in an arbitrary direction. Specifically, if a certain corner is bent as shown in FIG. 18, a force is exerted to a strain gage 60-$x$ overlapped with a bending line from among strain gages 60-1 to 60-$n$ which are arranged in a horizontal direction. Accordingly, an output value of the corresponding strain gage 60-$x$ increases in comparison with output values of the other strain gages. Also, a force is exerted to a strain gage 60-$y$ overlapped with the bending line from among strain gages 60-$n$, 60-$n$+1 to 60-$m$ which are arranged in a vertical direction, and thus an output value is changed. The controller 130 determines that a line is connecting the two strain gages 60-$x$ and 60-$y$ in which the output values are changed is a bending line. The controller 130 projects a location of the strain gage onto 2-dimensional coordinates on the display 110, and connects coordinates values corresponding to locations of the strain gage where the output value is changed by bending, thereby sensing a location of the bending line on the display 110.

Also, in addition to the exemplary embodiments of FIGS. 11 to 18, the display apparatus 100 may sense a bending direction using various sensors such as a gyro sensor, a geomagnetic sensor, and an acceleration sensor.

Figure 19:
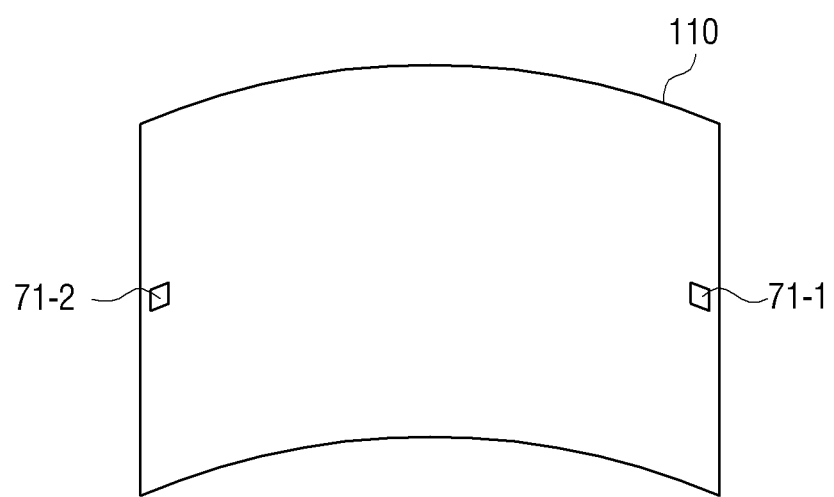
FIGS. 19 and 20 are views illustrating another example of a method for sensing a bending direction in a display apparatus.
Figure 20:
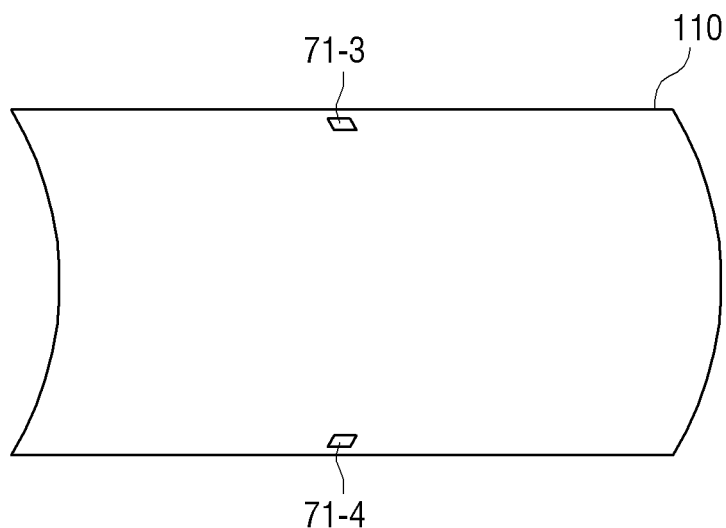

FIGS. 19 and 20 are views illustrating a method for sensing a bending direction using an acceleration sensor for example. Referring to FIGS. 19 and 20, the display apparatus 100 includes a plurality of acceleration sensors 71-1 and 71-2.

The acceleration sensors 71-1 and 71-2 can measure acceleration of a motion and a direction of the acceleration. Specifically, the acceleration sensors 71-1 and 71-2 output a sensing value corresponding to acceleration of gravity which changes according to a slope of an apparatus where the sensor is attached. Accordingly, if the acceleration sensors 71-1 and 71-2 are disposed on opposite edges of the display 110, output values sensed by the acceleration sensors 71-1 and 71-2 are changed when the display 110 is bent. The controller 130 calculates a pitch angle and a roll angle using the output values sensed by the acceleration sensors 71-1 and 71-2. Accordingly, the controller 130 may determine a bending direction based on changes in the pitch angle and the roll angle sensed by the acceleration sensors 71-1 and 71-2.

In FIG. 19, the acceleration sensors 71-1 and 71-2 are disposed on opposite edges in the horizontal direction with reference to the front surface of the display 110. However, the acceleration sensors may be disposed in the vertical direction as shown in FIG. 20. In this case, if the display 110 is bent in the vertical direction, a bending direction is sensed according to measurement values sensed by the acceleration sensors 71-3 and 71-4 in the vertical direction.

In FIGS. 19 and 20, the acceleration sensors are disposed on the left and right edges or the upper and lower edges of the display 110. However, the acceleration sensors may be disposed all of the left, right, upper and right edges and/or may be disposed on corners.

As described above, a bending direction may be sensed using a gyro sensor or a geomagnetic sensor besides the acceleration sensor. The gyro sensor refers to a sensor which, if a rotational motion occurs, detects an angular velocity by measuring Coriolis' force exerted in a velocity direction of the motion. Based on a measurement value of the gyro sensor, a direction of the rotational motion can be sensed and thus a bending direction can also be sensed. The geomagnetic sensor refers to a sensor which senses azimuth using a 2-axis or 3-axis fluxgate. If such a geomagnetic sensor is applied, the geomagnetic sensor disposed on each edge of the display 110 suffers from location movement when the edge is bent, and outputs an electric signal corresponding to a change in geomagnetism caused by the location movement. The controller 130 may calculate a yaw angle using the value output from the geomagnetic sensor. According to a change in the calculated yaw angle, various bending characteristics such as a bending area and a bending direction can be determined.

As described above, the display apparatus 100 may sense bending using various kinds of sensors. The above-described methods for arranging the sensors and methods for sensing may be applied to the display apparatus 100 individually or may be applied in combination.

The controller 130 may determine whether the bending direction of the display 110 is changed or not and may determine a number of times that the display 110 is bent based on the sensed bending direction. That is, if the bending direction of the −Z direction is sensed after the bending direction of the +Z direction has been sensed or if the bending direction of the +Z direction is sensed after the bending direction of the Z− direction has been sensed, it is determined that the bending direction is changed. Likewise, if the display 110 returns to a flat state after bending of the display 110 in one direction has been sensed, it is determined that bending is performed once. However, only if an output value of the bend sensor or the strain gage is greater than a predetermined value, that is, only if intended external pressure is applied by bending, it is determined that bending is performed and a number of times that bending is performed may be counted.

Figure 21:
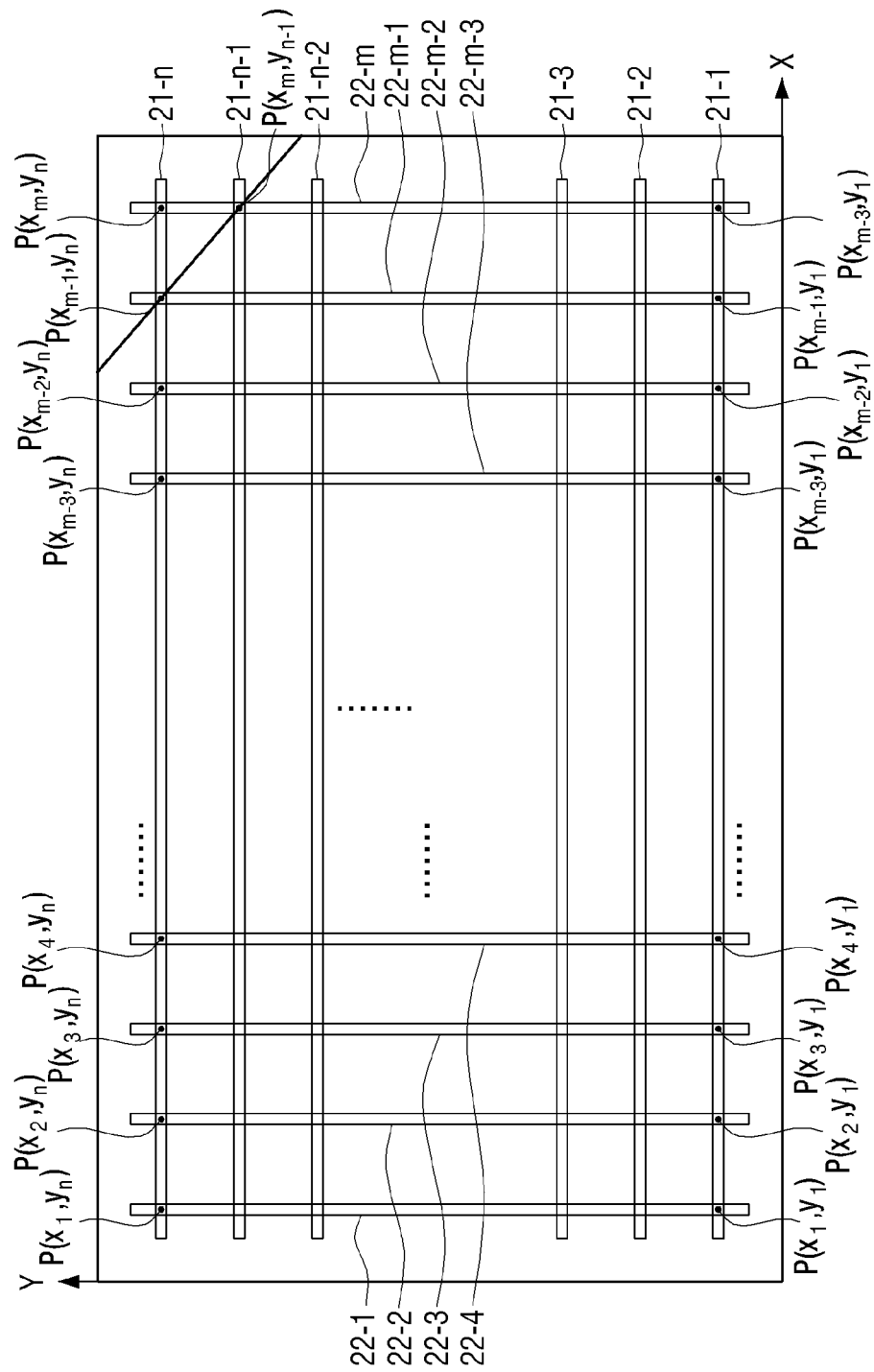
FIG. 21 is a view illustrating a method for determining a location of a bending line if a bend sensor is arranged in a grid formation according to an exemplary embodiment.

FIG. 21 is a view illustrating a method for determining a location of a bending line if a bend sensor is arranged in a grid formation according to an exemplary embodiment.

For example, the controller 130 projects locations of the bend sensors which are arranged in horizontal and vertical directions onto 2-dimensional coordinates on the display 110, as shown in FIG. 21. Accordingly, coordinate values of all points of the bend sensors may be represented by $P(x_1, y_1)$, $P(x_2, y_1)$, $P(x_3, y_1)$, . . . , $P(x_{m-2}, y_n)$, $P(x_{m-1}, y_n)$, and $P(x_m, y_n)$.

The controller 130 determines a bending line by connecting points at which the greatest resistance value is output from each bend sensor.

Specifically, the controller 130 may determine a location of a bending line by connecting coordinates values at which the greatest resistance value is output from each bend sensor arranged in the horizontal direction, or may determine a location of a bending line by connecting coordinate values at which the greatest resistance value is output from each bend sensor arranged in the vertical direction.

For example, in FIG. 21, it is assumed that a right upper corner is bent and thus bend sensors 21-$n$−1 and 21-$n$ are bent from among bend sensors 21-1 to 21-$n$ arranged in the horizontal direction, and bend sensors 22-$m$−1 and 22-$m$ are bent from among bend sensors 22-1 to 22-$m$ arranged in the vertical direction.

In this case, if the coordinate value of the point at which the bend sensor 21-$n$ outputs the greatest resistance value is $P(x_{m-1}, y_n)$, and if the coordinate value of the point at which the bend sensor 21-*n*-1 outputs the greatest resistance value is P($x_m$, $y_{n-1}$), the controller 130 defines the line connecting P($x_{m-1}$, $y_n$) and P($x_m$, $y_{n-1}$) as a bending line, and determines a location of the bending line.

Also, if the coordinate value of the point at which the bend sensor 22-*m*-1 outputs the greatest resistance value is P($x_{m-1}$, $y_n$) and if the coordinate value of the point at which the bend sensor 22-*m* outputs the greatest resistance value is P($x_m$, $y_{n-1}$), the controller defines the line connecting P($x_{m-1}$, $y_n$) and P($x_m$, $y_{n-1}$) as a bending line, and determines a location of the bending line.

The controller 130 controls an overall function of the display apparatus 100.

Specifically, the controller 130 may control the display 110 to display various screens such as an application execution screen or a home screen.

Also, the controller 130 may determine a bending state of the display 110 based on a result of sensing by the sensor 120. That is, the controller 130 may determine a location of a bending area of the display 110, a size of a bending area, a number of bending areas, a location of a bending line, and a direction of a bending line, using a sensing value of the bend sensor. This has been described above with reference to FIGS. 3 to 21.

The controller 130 may control to execute a different function according to where the bending line is located in the display 110. Specifically, the controller 130 may control to perform a different function according to whether a bending line goes through a center area of the display 110. According to an exemplary embodiment, the center area may refer to a pre-set area that includes a center of the display 110. That is, the center area may be a pre-set area that has a predetermined width and is formed on a substantially center portion of the display 110. The shape and size of the center area may be arbitrarily set or changed by the user. The center area may have various shapes such as a point, a polygon, or a circle, and the size of each shape may be changed variously.

To achieve this, the controller 130 sets a first area that includes the center area of the display 110 and a second area that does not include the center area of the display 110 in the display 110. These areas are virtual areas which are not displayed on the display 110. The controller 130 may control to perform a different function according to whether a bending line is located in the first area or the second area. This will be explained in detail with reference to FIGS. 22 to 29.

Figure 26:
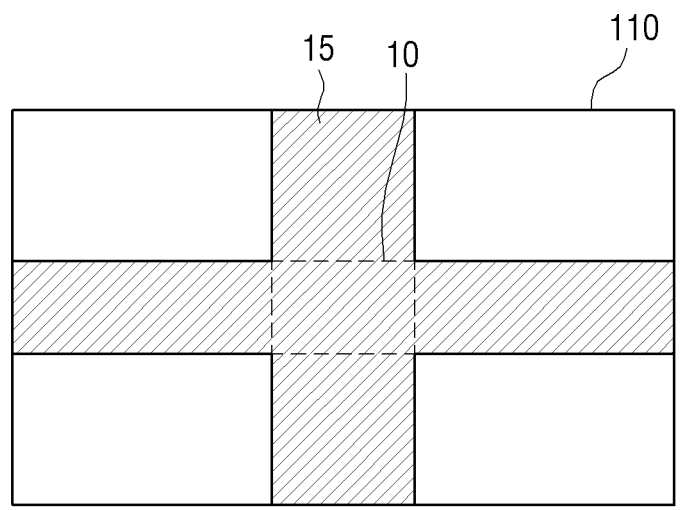
Figure 27:
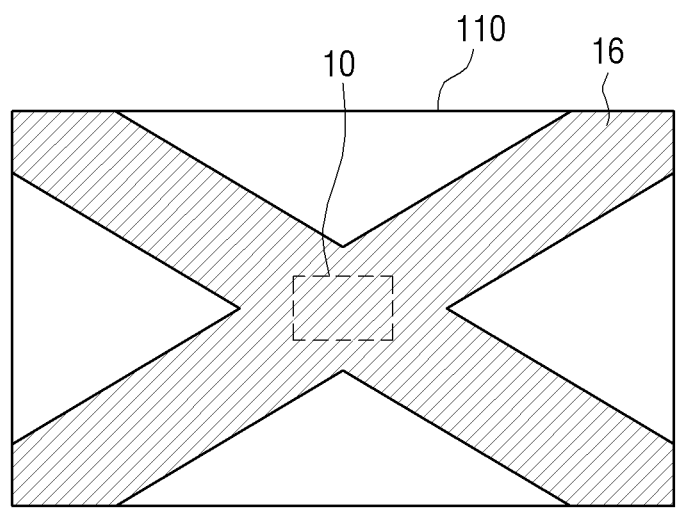
Figure 28:
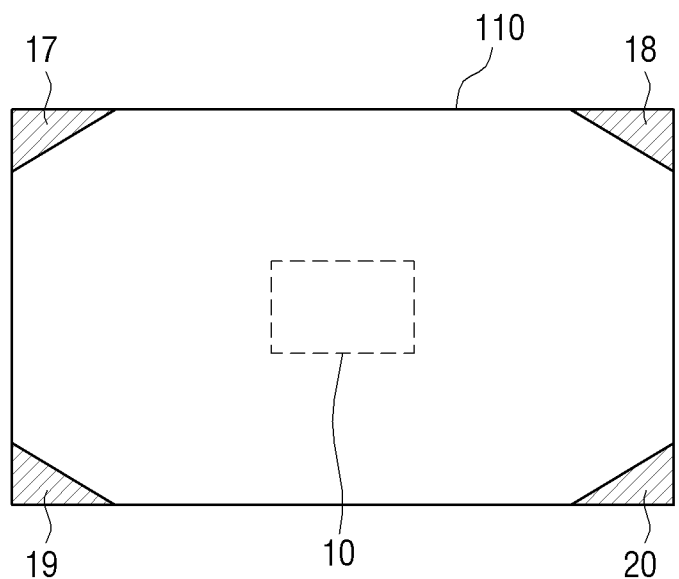
Figure 29:
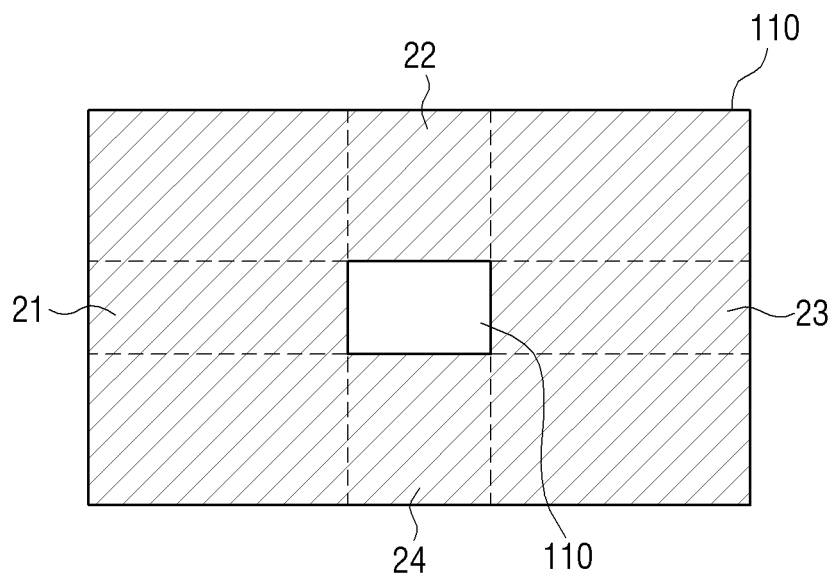

FIGS. 22 to 29 are views illustrating areas which are set in the display according to an exemplary embodiment. In particular, FIGS. 22 to 27 are views illustrating the first area which is set in the display, and FIGS. 28 and 29 are views illustrating the second area which is set in the display.

Figure 22:
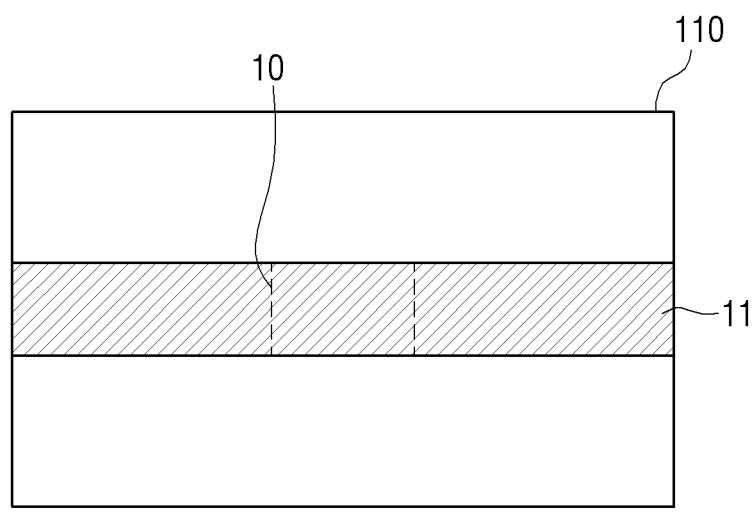
FIGS. 22 to 29 are views illustrating an area which is set on a display according to an exemplary embodiment.

As shown in FIG. 22, the first area may be a horizontal area 11 which has a predetermined width on the center of the display 110 in a vertical direction and is extended in a horizontal direction. The width of horizontal area 11 may be set so that the horizontal area 11 includes a center area 10 (or a substantially center) of the display 110, and may be changed variously according the shape and size of the center area 10.

Figure 23:
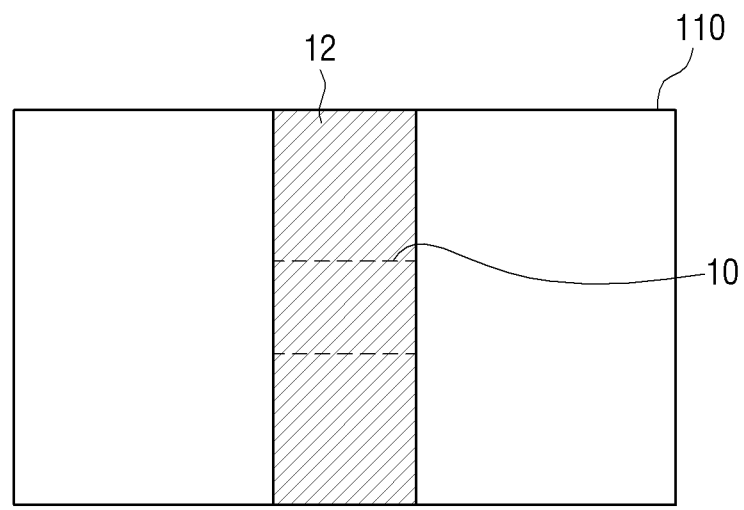

As shown in FIG. 23, the first area may be a vertical area 12 which has a predetermined width on the center of the display 110 in the horizontal direction and is extended in the vertical direction. The width of the vertical area 12 may be set so that the vertical area 12 includes the center area 10 (or a substantially center) of the display 110, and may be changed variously according to the shape and size of the center area 10.

Figure 24:
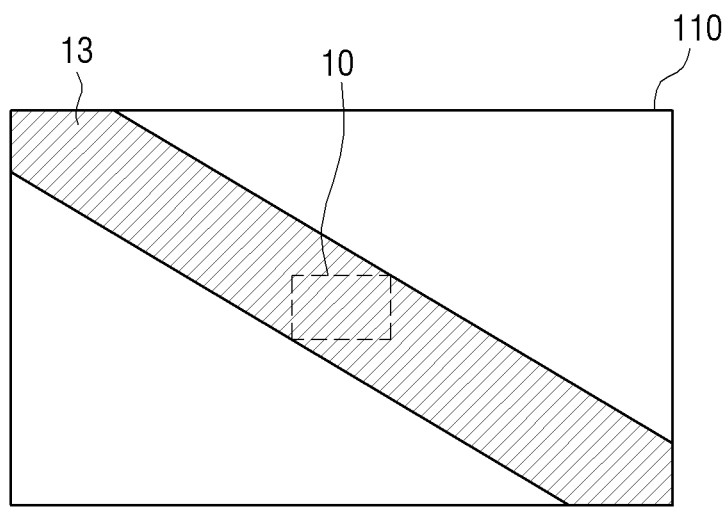

As shown in FIG. 24, the first area may be a first diagonal area 13 which has a predetermined width and is extended from a left upper end of the display 110 across to a right lower end of the display 110. The width of the first diagonal area 13 may be set so that the first diagonal area 13 includes the center area 10 (or a substantially center), and may be changed variously according to the shape and size of the center area 10.

Figure 25:
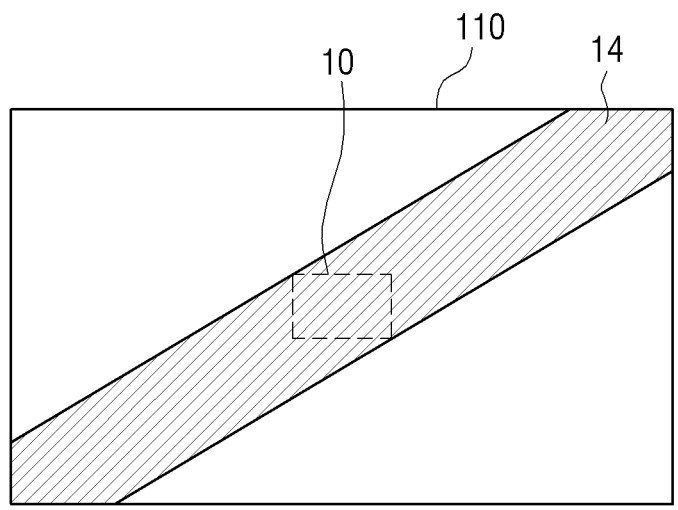

As shown in FIG. 25, the first area may be a second diagonal area 14 which has a predetermined width and is extended from a right upper end of the display 110 across to a left lower end of the display 110. The width of the second diagonal area 14 may be set so that the second diagonal area 14 includes the center area 10 (or a substantially center), and may be changed variously according to the shape and size of the center area 10.

As shown in FIG. 26, the first area may be an area 15 which includes the horizontal area and the vertical area. That is, the first area may be set to include the horizontal area 11 shown in FIG. 22 and the vertical area 12 shown in FIG. 23, and the horizontal and vertical widths may be set to include the center area 10 (or a substantially center) and may be changed variously according to the shape and size of the center area 10.

As shown in FIG. 27, the first area may be an area 16 which includes the first diagonal area and the second diagonal area. That is, the first area may be set to include the first diagonal area 13 shown in FIG. 24 and the second diagonal area 14 shown in FIG. 25, and their widths may be set to include the center area 10 (or a substantially center) and may be changed variously according to the shape and size of the center area 10.

FIGS. 28 and 29 are views illustrating the second area which is set in the display according to an exemplary embodiment.

The second area may be an area that does not include the center area of the display. However, the second area is a virtual area and may not be displayed on the display.

For example, as shown in FIG. 28, the second area may be corner areas 17, 18, 19, and 20 which are formed within a predetermined distance from each corner of the display 110. That is, the second area does not include the center area 10 and may include a left upper corner area 17, a right upper corner area 18, a left lower corner area 19, and a right lower corner area 20.

In another example, as shown in FIG. 29, the second area may be peripheral areas which are formed within a predetermined distance from each side of the display 110.

That is, the second area may include a left peripheral area 21 which is formed within a predetermined distance from a left side of the display 110, an upper peripheral area 22 which is formed within a predetermined distance from an upper side of the display 110, a right peripheral area 23 which is formed within a predetermined distance from a right side of the display 110, and a lower peripheral area 24 which is formed within a predetermined distance from a lower side of the display 110. However, each peripheral area 21, 22, 23, and 24 may be set not to include the center area 10.

According to an exemplary embodiment, the center area may not be used and the first area or the second area may be set and used. That is, in FIGS. 22 to 25, the first area may be an area that includes the center of the display 110. For example, if the display 110 has a quadrangular shape, the center of the display 110 may be defined as a point at which a line located at the same distance from the left and right sides of the display 110 and a line located at the same distance from the upper and lower sides of the display 110 intersect. However, the center of the display 110 may be defined variously according to the shape of the display 110.

The first area may be an area that includes the substantially center area of the display 110. The substantially center may refer to points that lie within a predetermined error range from the center of the display 110. Also, the first area may be an area that goes through the substantial center (or the center area) of the display 110. That is, the first area may be an area that includes at least one line going through the center area of the display 110. Also, the first area may be an area that includes at least one bending line going through the center area of the display 110 from among bending lines that may be sensed or input as the display 110 is deformed. The at least one bending line may be a line that meets (or goes through) two sides, two vertexes, or a side and a vertex. The at least one bending line may include a straight line, a curved line, and an atypical line. For example, in FIG. 22, the bending line included in the first area (for example, the horizontal area 11) may be a line that connects one point located on the left side of the horizontal area 11 and one point located on the right side of the horizontal area 11. In FIG. 23, the bending line included in the first area (for example, the vertical area 12) may be a line that connects one point located on the upper side of the vertical area 12 and one point located on the lower side of the vertical area 12. In FIG. 24, the bending line included in the first area (for example, the first diagonal area 13) may be a line that connects one point located on the two sides of the left upper end of the first diagonal area 13 or at the left upper vertex of the display 110, and one point located on the two sides of the right lower end of the first diagonal area 13 or at the right lower vertex of the display 110. In FIG. 25, the bending line included in the first area (for example, the second diagonal area 14) may be a line that connects one point located on the two sides of the right upper end of the second diagonal area 14 or the right upper vertex of the display 110, and one point located on the two sides of the left lower end of the second diagonal area 14 or the left lower vertex of the display 110. In FIG. 26, the bending line included in the first area may be a line that connects one point on a line meeting an upper side center area 15 of the display 110 and one point on a line meeting a lower side center area 15 of the display 110, or a line that connects one point on a line meeting a left side center area 15 of the display 110 and one point on a line meeting a right side center area 15 of the display 110. In FIG. 27, the bending line included in the first area may be the bending line included in the first diagonal area 13 of FIG. 24 or the bending line included in the second diagonal area 14 of FIG. 23.

The second area may be an area that does not include the center of the display 110. Also, the second area may be area that does not include the substantially center of the display 110. That is, as shown in FIGS. 28 and 29, the second area may be an area that does not go through the substantially center (or the center area). Also, the second area may be an area that includes at least one line that does not go through the center area of the display 110. Also, the second area may be an area that includes lines except for the bending lines included in the first area from among the bending lines input or sensed by the display 110. For example, the bending line included in the second area may include bending lines included in the corner areas 17, 18, 19, and 20. The bending line included in the left upper corner area 17 may be a line that connects one point on a line meeting the left upper corner area 17 and the upper side of the display 110, and one point on a line meeting the left upper corner area 17 and the left side of the display 110. The bending line included in the right upper corner area 18 may be a line that connects one point on a line meeting the right upper corner area 18 and the upper side of the display 110, and one point on a line meeting the right upper corner area 18 and the right side of the display 110. The bending line included in the left lower corner area 19 may be a line that connects one point on a line meeting the left lower corner area 19 and the lower side of the display 110, and one point on a line meeting the left lower corner area 19 and the left side of the display 110. The bending line included in the right lower corner area 20 may be a line that connects one point on a line meeting the right lower corner area 20 and the lower side of the display 110, and one point on a line meeting the right lower corner area 20 and the right side of the display 110. Also, in FIG. 29, the second area may be an area that includes bending lines that do not go through the area 110 from among the bending lines input or sensed by the display 110.

The first area and/or the second area may be arbitrarily changed according to a setting of a manufacturer or a user of the display apparatus. That is, the first area and/or the second area may be adjusted in its shape or size. Also, an effective bending gesture for receiving a bending line included in each of the first area and/or the second area as effective input and processing an event may be arbitrarily changed or set by the manufacturer or the user. For example, a bending angle and a bending speed which depends on a time that bending is input may be arbitrarily set and changed by the user.

As described above, the first area and the second area may be set in various ways according to an exemplary embodiment, and they may be combined with each other.

For example, if the first area is set to the vertical area shown in FIG. 23, the second area may be set to the corner areas shown in FIG. 28. In another example, if the first area is set to the vertical area shown in FIG. 23, the second area may be set to a combination of each corner area shown in FIG. 28 and the left and right peripheral areas shown in FIG. 29.

Hereinafter, a method for determining an area in which a bending line is located based on an area set in the display will be explained in detail.

FIGS. 30 to 36 are views illustrating a method for determining an area in which a bending line is located.

Figure 30:
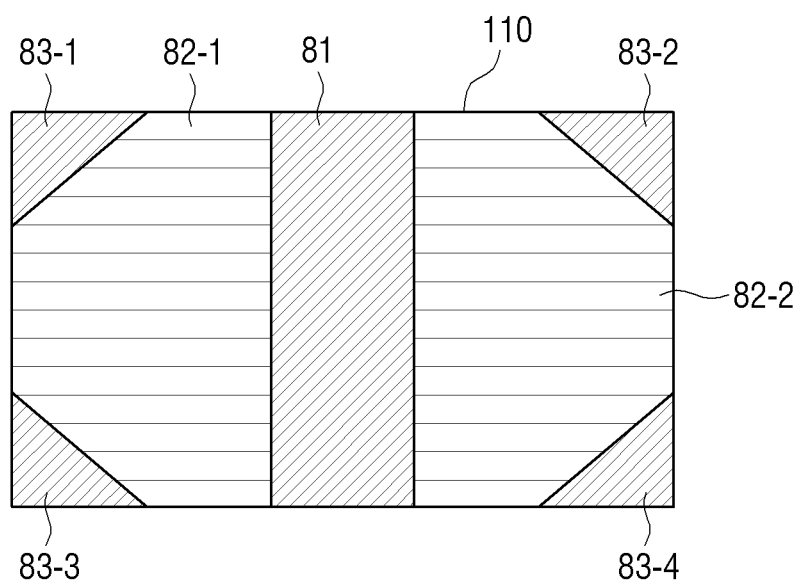
FIGS. 30 to 37 are views illustrating a method for determining an area in which a bending line is located.

For the convenience of explanation, it is assumed that the first area is set to a vertically extended area 81 in the display 110, and the second area is set to a left peripheral area 82-1, a right peripheral area 82-2, and four corner areas 83-1 to 83-4 as shown in FIG. 30.

If a bending line is wholly included in the first area or the second area, the controller 130 determines that the bending line is located in the area including the bending line.

Specifically, if the bending line intersects with opposite sides of the display 110 and is included in the first area, the controller 130 determines that the bending line is located in the first area. Also, if the bending line intersects with opposite sides of the display 110 and is included in the peripheral area of the second area, or if the bending line intersects with adjacent sides of the display 110 and is included in the corner area of the second area, the controller 130 determines that the bending line is located in the second area.

Figure 31:
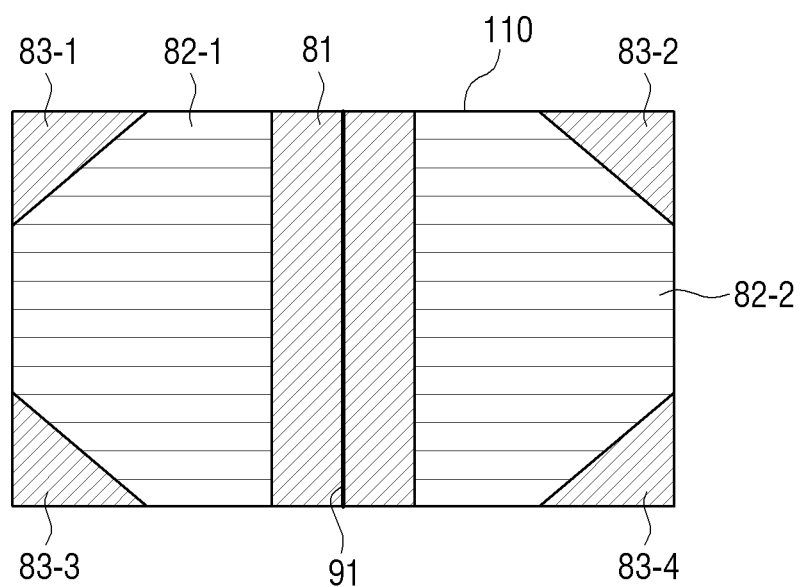
Figure 32:
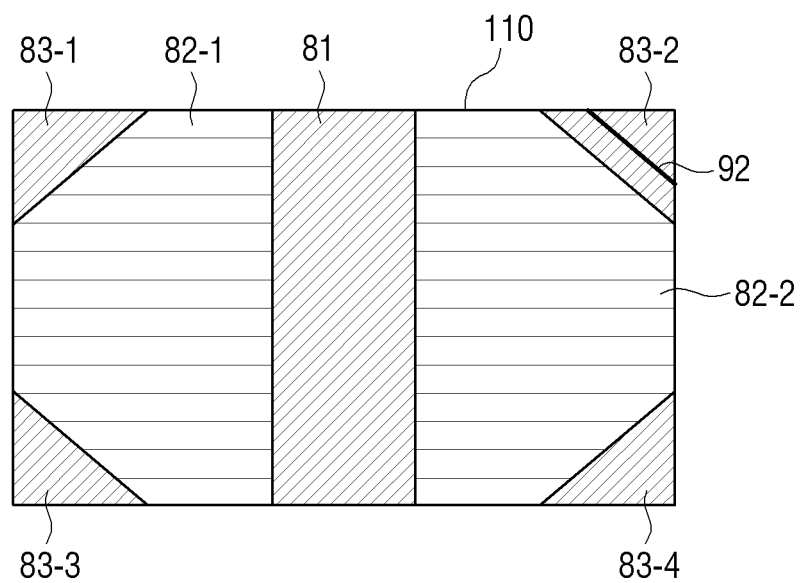
Figure 33:
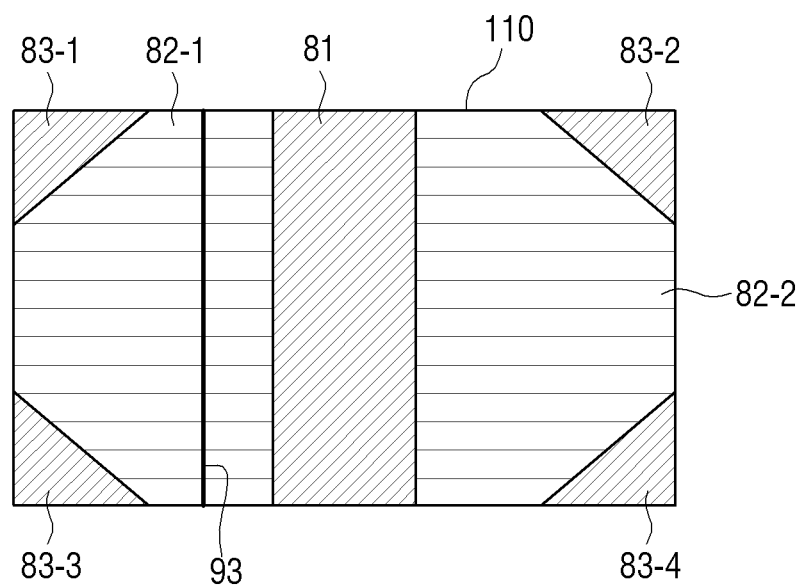

For example, in the case of FIG. 31, the controller 130 determines that a bending line 91 is located in the first area 81, and, in the case of FIG. 32, the controller 130 determines that a bending line 92 is located in the corner area of the second area. Also, in the case of FIG. 33, the controller 130 determines that a bending line 93 is located in the peripheral area of the second area.

If the bending line overlaps with the first area and the second area or the corner area and the peripheral area in the second area, the controller 130 determines that an effective bending line is not formed. That is, if the bending line is formed to overlap with different areas, the controller 130 does not perform a specific function, which is performed if the bending line is located in each area.

Figure 34:
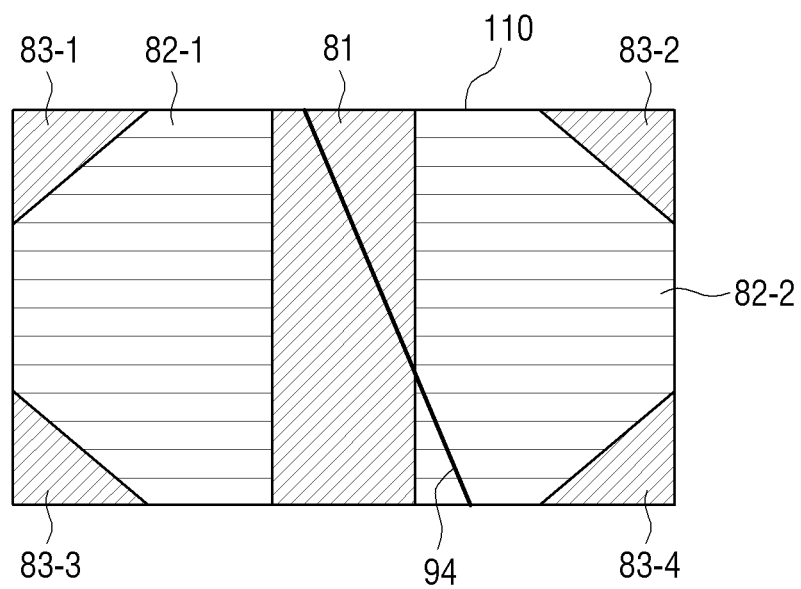
Figure 35:
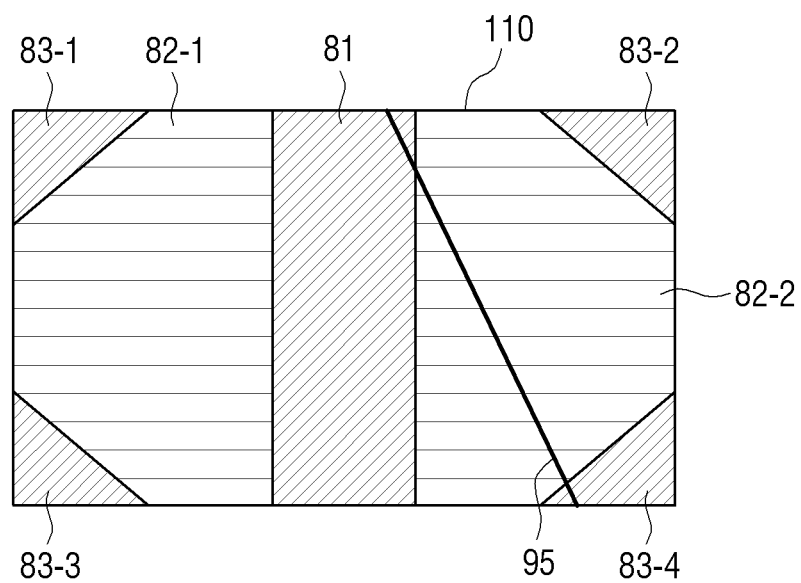

For example, if a bending line 94 overlaps with the first area 81 and the right peripheral area 82-2 as shown in FIG. 34, or if a bending line 95 overlaps with the first area 81, the right peripheral area 82-2, and the right lower corner area 83-4 as shown in FIG. 35, the controller 130 determines that an effective bending line is not formed.

However, the controller 130 may consider a margin of a predetermined range when determining a location of a bending line. For example, if a bending line overlaps with the first area and the second area or the corner area and the peripheral area in the second area and if a part of the bending line longer than a predetermined length is included in a specific area or included in a specific area having a predetermined margin, the bending line is determined to be an effective bending line.

Figure 36:
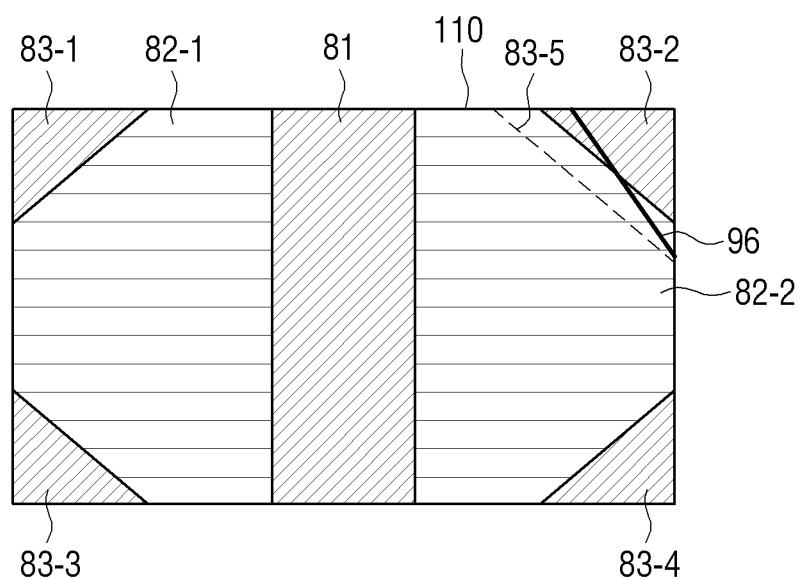

For example, the original size of the corner area may be set as that of the right upper corner area 83-2 shown in FIG. 36. However, the controller 130 may additionally set a right upper corner area 83-5 having a size greater than the size of the right upper corner area 83-2 by as much as a predetermined margin (e.g., margin of error, size, etc.). If a bending line 96 is not wholly included in the right upper corner area 83-2, but is included in the right upper corner area 83-5 having the predetermined margin, the controller 130 may determine that the bending line 96 is located in the right upper corner area 83-2.

Figure 37:
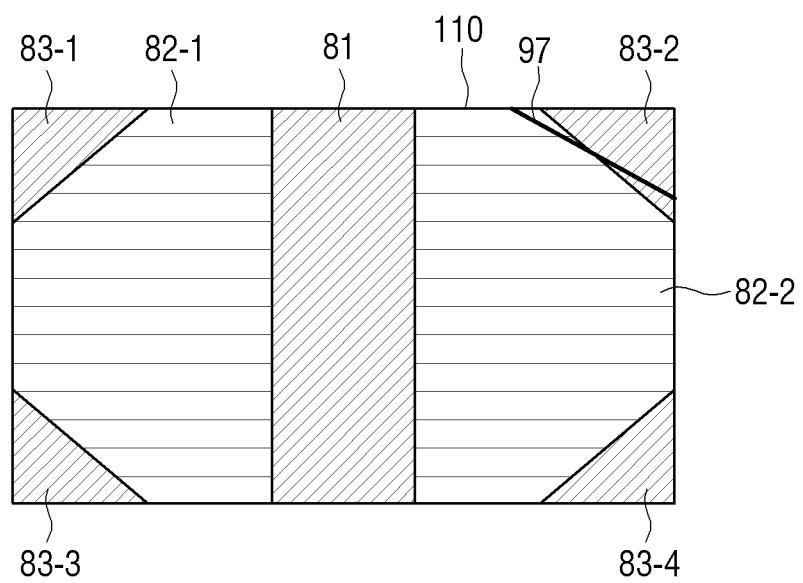

Also, if a part of an entire bending line 97 longer than a predetermined length is included in the right upper corner area 83-2 as shown in FIG. 37, the controller 130 may determine that the bending line 97 is located in the right upper corner area 83-2.

The predetermined margin or margin of error may be a portion of a second area of the bendable display that borders a first area of the bendable display and is added to the first area when determining whether the bending line is an effective bending line or intended to be in the first area of the display. In addition, the predetermined margin or margin of error may be a portion of a first area of the bendable display that borders the second area of the bendable display and is added to the second area when determining whether the bending line is an effective bending line, determining whether an intended input area is the first area or the second area, or identifying one of the first area or second area of the display.

The predetermined margin or margin of error may be determined based upon a usage history of the flexible display, a manufacturer setting, a bending type, a usage history of a user, and/or a user setting. The controller may compare a property of an input bending line (e.g., deformation information) and a predetermined margin or margin of error set based upon a usage history of the flexible display, a manufacturer setting of the predetermined margin, a bending type, a usage history of a user, and/or a user setting of the predetermined margin and determine whether the bending line is an effective bending line, determining whether an intended input area is the first area or the second area, or identifying one of the first area or second area of the display.

For example, the controller may determine to identify only the first area if the deformation is wholly located in the first area and at least one predetermined margin area adjacent to the first area. Additionally, the controller may determine to identify only the second area if the deformation is wholly located in the second area and at least one predetermined margin area adjacent to the second area.

The property of the bending line (e.g., deformation information) may be one or more of a partial size or length of the bending line (e.g., deformation) located in one or more areas of the flexible display and a total length of the bending line. Additionally, the property of the bending line may include one or more of a bending angle, a bending location, a number of areas that a bending line is located in and a holding time of the bend. In addition, the controller may consider an application being executed and/or displayed on the flexible display and input areas corresponding to the application when determining whether the bending line is an effective bending line or determining whether an intended input area is the first area or the second area, and/or identifying one of the first area or second area of the display Additionally, the flexible display may include a learning curve feature. The learning curve may allow for a large margin of error when the user of a flexible display is of a beginner skill level and may decrease the margin of error for an intermediate skill level or advanced skill level user of the flexible display. The skill level may be determined based upon a user profile. The user profile may include one or more of a date of first use of the flexible display by a user, a number of uses of the flexible display by a user, a total time of usage of the flexible display apparatus by a user, a metric which indicates an accuracy of bending inputs of a user, a number of bending inputs by a user, a number of each type of bending input by a user. The skill level may determine a score or category of a user determined based upon the user profile and set the predetermined margin or margin of error according to the score or category of the user.

Hereinafter, a function which is performed according to an area in which a bending line is located will be explained according to an exemplary embodiment.

Figure 38:
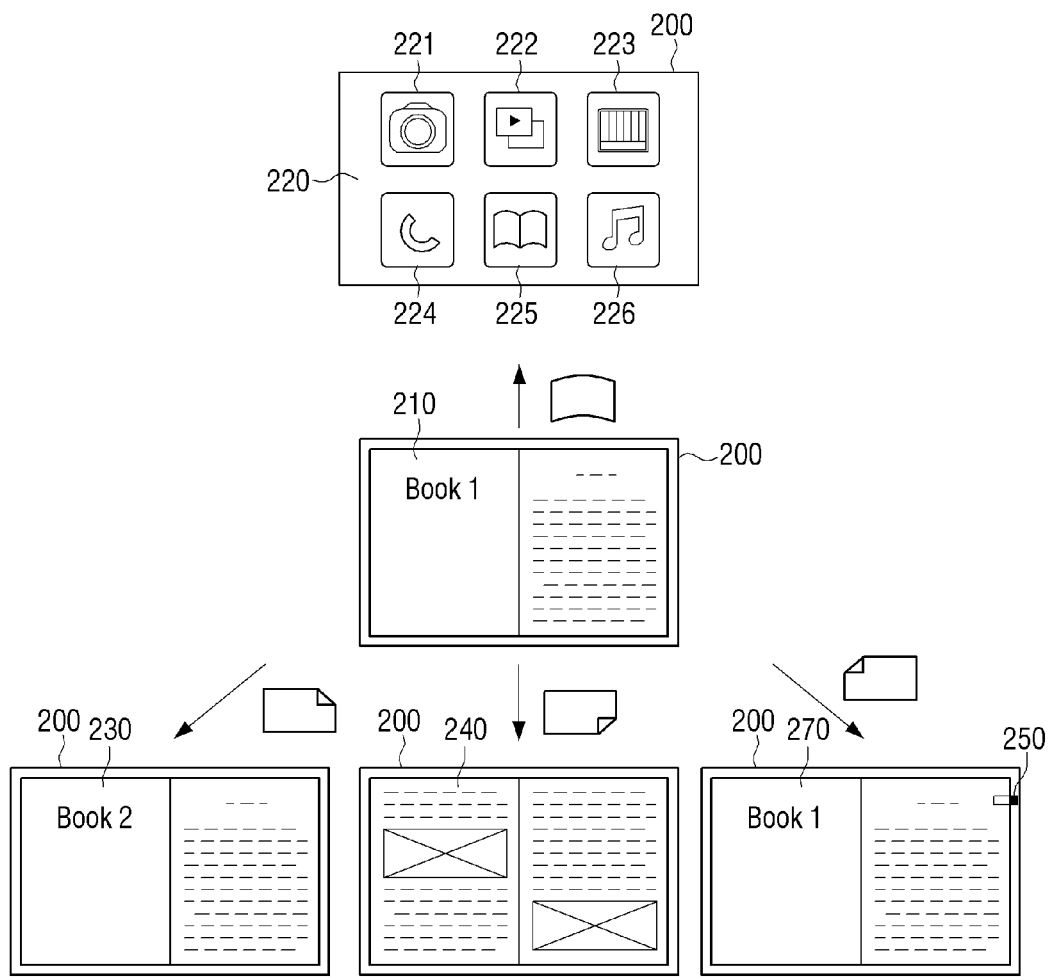
FIGS. 38 to 40 are views illustrating a function which is executed according to an area in which a bending line is located according to an exemplary embodiment.
Figure 39:
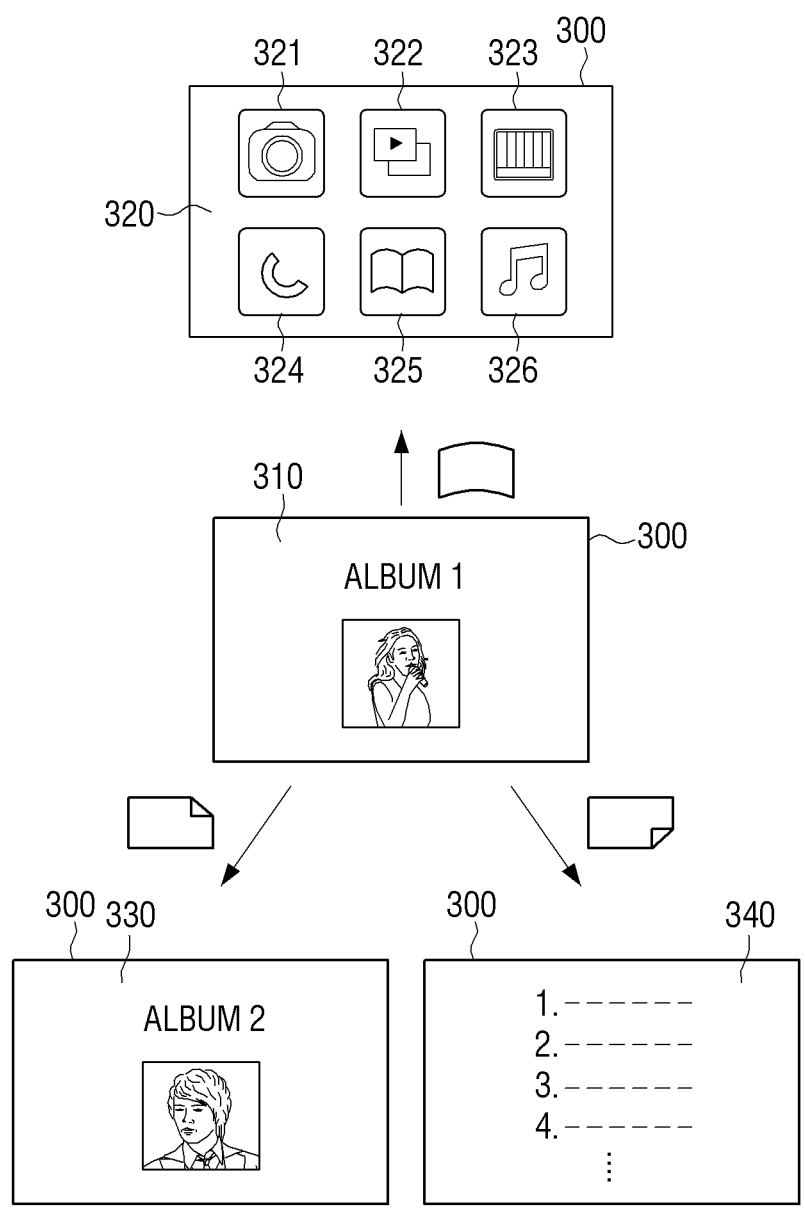
Figure 40:
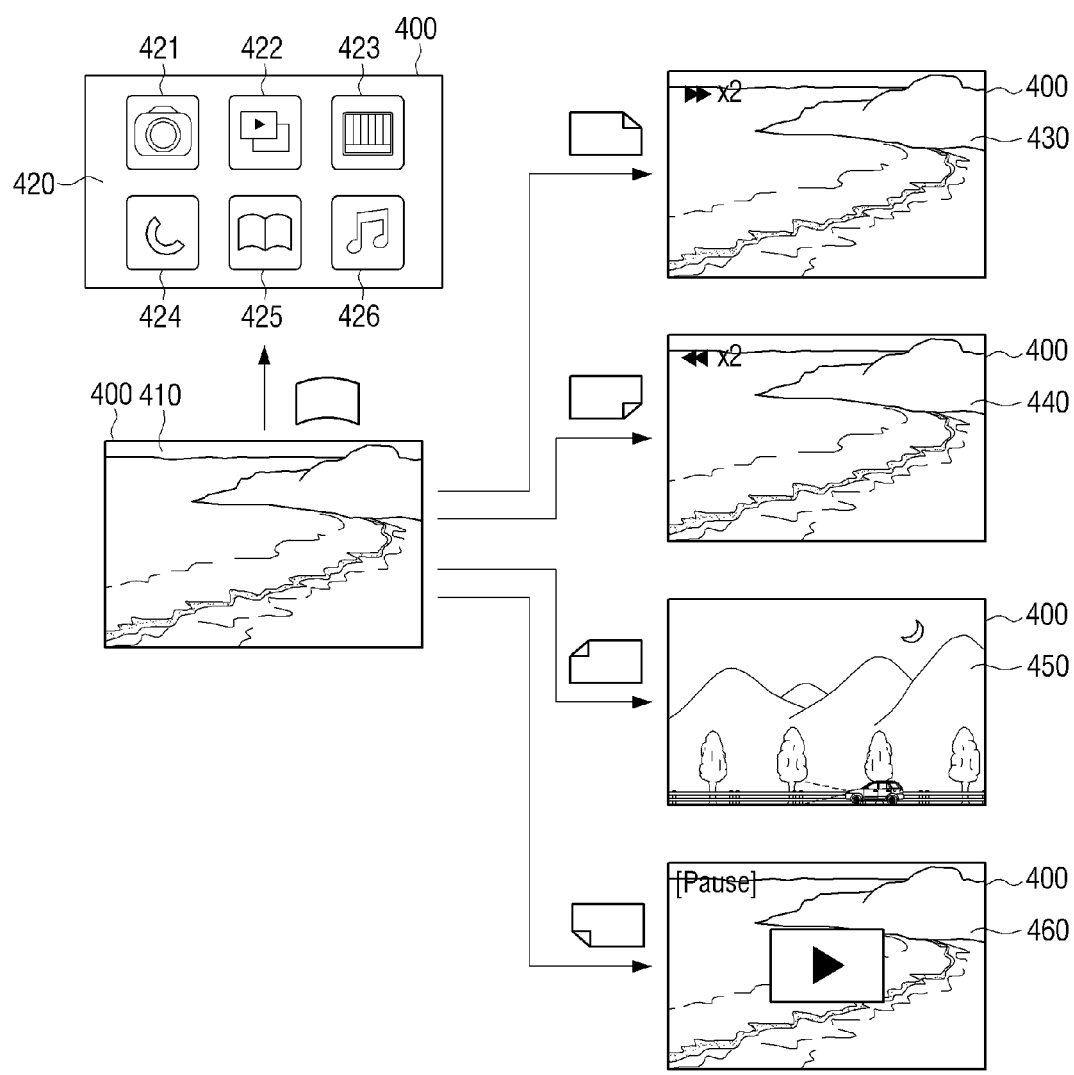

FIGS. 38 to 40 are views illustrating a function which is performed according to an area in which a bending line is located according to an exemplary embodiment. For the convenience of explanation, explanation will be provided with reference to FIG. 1.

Although not shown in FIG. 1, the display apparatus 100 may further include a storage (not shown) to store at least one application installed in the display apparatus 100, and the controller 130 may drive at least one of a plurality of applications stored in the storage (not shown).

If at least one application is driven and if a bending line is located in the first area of the display 110, the controller 130 displays a home screen on the display 110. The home screen described herein may be a screen that includes at least one icon indicating the application installed in the display apparatus 100.

In this case, if the bending line is located in the first area of the display, the controller 130 may stop driving the application displayed on the display 110 and may display the home screen.

That is, if the bending line is located in the first area while an application execution screen is being displayed on the display 110, the controller 130 may stop driving or executing the application the execution screen of which is displayed on the display 110. However, the controller 130 may change the screen displayed on the display 110 to the home screen without halting the execution or driving of the application.

If the bending line is located in the second area of the display 110, the controller 130 may perform a function that is executable by the application.

In this case, since the plurality of applications may be driven simultaneously according to a multitasking function, the controller 130 may perform a function that is executable by the application of the application execution screen currently displayed on the display 110.

The controller 130 may perform a different function according to where the bending line is located in the second area. That is, the controller 130 may perform a different function according to whether the bending line is located in a peripheral area or a corner area. Also, the controller 130 may perform a different function according to a location of the peripheral area to which the bending line belongs or a location of the corner area to which the bending line belongs.

Since the function executable by the application is diverse according to an application, a function of each application that is differently performed according to whether a bending line is located in the first area or the second area will be explained below.

FIG. 38 illustrates a case in which an electronic book (e-book) application is driven and an e-book is displayed on the display.

If an e-book application execution screen is displayed on the display 110, and if a bending line is located in the first area of the display 110, the controller 130 changes the screen to the home screen 220. If the bending line is located in the second area of the display 110, the controller 130 may change the current e-book to another e-book 230 or may change a page of the current e-book 240. Also, if the bending line is located in the second area of the display, the controller 130 may perform a function such as setting a bookmark 250, setting a font, inserting an empty page, doodling/erasing, taking notes/erasing, searching word, word translation/replacement/insertion, and looking up a dictionary.

An e-book content displayed as the e-book application is driven may be already stored in the storage (not show) or may be received from an external server (not shown) in a streaming form.

For example, as shown in FIG. 38, if the bending line is located in the first area, the controller 130 may change a screen 210 on which e-book 1 is displayed to a home screen 220 which includes a variety of icons 221 to 226 indicating applications installed in the display apparatus 100. If the bending line is located in the second area, the controller 130 may change current e-book 1 210 to e-book 2 230, may display a different page 240, or may set a bookmark 250 on the current page.

As described above, if the bending line is located in the second area, the controller 130 may perform various functions that are provided by the application. The controller 130 may also control to perform a different function according to where the bending line is located in the second area.

For example, if it is determined that the bending line is located in a right peripheral area or a right corner area (a right upper corner area or a right lower corner area), the controller 130 may control to display a next e-book content, and, if it is determined that the bending line is located in a left peripheral area or a left corner area (a left upper corner area or a left lower corner area), the controller 130 may control to display a previous e-book content.

Also, if it is determined that the bending line is located in the right peripheral area or the right corner area (the right upper corner area or the right lower corner area), the controller 130 may display a next page, and, if it is determined that the bending line is located in the left peripheral area or the left corner area (the left upper corner area or the left lower corner area), the controller 130 may display a previous page.

Also, if it is determined that the bending line is located in the peripheral area, the controller 130 may perform an e-book content changing function, and, if it is determined that the bending line is located in the corner area, the controller 130 may perform a page changing function.

For example, if the bending line is located in the right peripheral area, the controller 130 may control to display the next e-book content, and, if the bending line is located in the left peripheral area, the controller 130 may control to display the previous e-book content. In this case, if it is determined that the bending line is located in the right upper corner area, the controller 130 may control to display the next page, and, if it is determined that the bending line is located in the left upper corner area, the controller 130 may control to display the previous page.

In FIG. 38, if the bending line is located in the right upper corner area, the controller 130 changes the content, if the bending line is located in the right lower corner area, the controller 130 changes the page, and, if the bending line is located in the left upper corner area, the controller 130 sets the bookmark. However, this is merely an example. That is, the controller 130 may perform various functions according to where the bending line is located in the second area as described above, and the functions may be already set at the time that the display apparatus 100 is manufactured or may be set and changed by the user.

FIG. 39 illustrates a case in which an image is displayed on the display as an application is driven.

If an image is displayed on the display 110 as an application is driven, and if a bending line is located in the first area of the display 110, the controller 130 changes the screen to a home screen, and, if the bending line is located in the second area of the display 110, the controller may change the current image to another image or may display a rear side of the current image.

The image described herein may include a photo image and a text image, and may be already stored in the storage (not shown) or may be received from an external server (not shown) in a streaming form.

For example, as shown in FIG. 39, if the bending line is located in the first area, the controller 130 may change a screen 310 on which a cover image of album 1 is displayed to a home screen 320 which includes a variety of icons 321 to 326 indicating applications installed in the display apparatus 100. If the bending line is located in the second area, the controller 130 may display a cover image 330 of album 2 on the display 300 or may display a rear side 340 of the cover image of album 1 on the display 300. The cover image 330 of album 2 may be a next image or a previous image of the cover image 310 of album 1 currently displayed.

As described above, if the bending line is located in the second area, the controller 130 may perform various functions that are provided by the application. At this time, the controller 130 may control to perform a different function according to where the bending line is located in the second area.

Also, if the bending line is located in the right peripheral area or the right corner area (the right upper corner area or the right lower corner area), the controller 130 may control to display the next image, and, if the bending line is located in the left peripheral area or the left corner area (the left upper corner area or the left lower corner area), the controller 130 may control to display the previous image.

On the other hand, if the bending line is located in the peripheral area, the controller 130 may control to display the next image or the previous image of the current image by performing an image changing function, and, if the bending line is located in the corner area, the controller 130 may control to display a rear side of the current image.

In FIG. 39, if the bending line is located in the right upper corner area, the controller 130 displays a different image, and, if the bending line is located in the right lower corner area, the controller 130 displays a rear side of the image. However, this is merely an example. That is, as described above, the controller 130 may perform various functions according to where the bending line is located in the second area, and the functions may be already set at the time that the display apparatus 100 is manufactured, or may be set and changed by the user.

FIG. 40 illustrates a case in which a multimedia content is displayed on the display as an application is driven.

If a multimedia content is reproduced as an application is driven, and if a bending line is located in the first area of the display 110, the controller 130 may display a home screen on the display 110, and, if the bending line is located in the second area of the display 110, the controller 130 may display a different multimedia content or may perform at least one function of pausing, fast forwarding, rewinding, multi speeds reproducing, volume control of a current multimedia application, and changing a content.

The multimedia content recited herein includes at least one of moving image content and music content, and may be already stored in the storage (not shown) or may be received from an external server (not shown) in a streaming form.

For example, as shown in FIG. 40, if a moving image application is executed and "content A" 410 is reproduced, and if the bending line is located in the first area, the controller 130 may display a home screen 420 including a variety of icons 421 to 426 indicating applications installed in the display apparatus 100. If the bending line is located in the second area, the controller 130 may perform fast forwarding 430, rewinding 440, or pausing 460 with respect to the currently reproduced moving image application, or may reproduce content B 450 which is different from content A.

As described above, if the bending line is located in the second area, the controller 130 may perform various functions that are provided by the application. At this time, the controller 130 may control to perform a different function according to where the bending line is located in the second area.

For example, if it is determined that the bending line is located in the right peripheral area or the right corner area (the right upper corner area or the right lower corner area), the controller 130 may control to display a next moving image content, and, if it is determined that the bending line is located in the left peripheral area or the left corner area (the left upper corner area or the left lower corner area), the controller 130 may control to display a previous moving image content.

On the other hand, if it is determined that the bending line is located in the right upper corner area, the controller 130 may perform "volume up", and, if it is determined that the bending is located in the right lower corner area, the controller 130 may perform "volume down". If it is determined that the bending line is located in the left upper corner area, the controller 130 may perform "changing to the next moving image content", and, if it is determined that the bending line is located in the left lower corner area, the controller 130 may perform "changing to the previous moving image content".

However, this is merely an example and the function performed according to the location of the corner area to which the bending line belongs may be changed variously. That is, the controller 130 may control to perform at least one function of pausing, fast forwarding, rewinding, and volume control according to the location of the corner area to which the bending line belongs, or may control to perform opposite functions such as volume up and volume down or fast forwarding and rewinding)

In FIG. 40, if the bending line is located in the right upper corner area, the controller 130 performs fast forwarding, if the bending line is located in the right lower corner area, the controller 130 performs rewinding, if the bending line is located in the left upper corner area, the controller 130 changes the content, and, if the bending line is located in the left lower corner area, the controller 130 performs pausing. However, this is merely an example. That is, as described above, the controller 130 may perform various functions according to where the bending line is located in the second area, and the functions may be already set at the time that the display apparatus 100 is manufactured, or may be set and changed by the user.

FIGS. 41 to 44 are views illustrating a function which is performed according to an area in which a bending line is located according to an exemplary embodiment. For the convenience of explanation, explanation will be provided with reference to FIG. 1.

Although not shown in FIG. 1, the display apparatus 100 may further include a storage (not shown) to store at least one application installed in the display apparatus 100, and the controller 130 may drive at least one of a plurality of applications stored in the storage (not shown).

If at least one application is driven, and if a bending line is located in the first area of the display 110, the controller 130 may control to perform a first function of the application, and, if the bending line is located in the second area of the display 110, the controller 130 may control to perform a second function of the application.

The first function includes at least one of functions of changing content, changing an application, and changing a screen mode. The second function includes at least one function that is provided by the driven application.

Hereinafter, a function that is performed according to an area to which the bending line belongs according to types of the first function and the second function will be explained in detail.

FIGS. 41 to 44 are views illustrating a case in which the first function is a function of changing content in an exemplary embodiment.

If a bending line is located in the first area of the display 110, the controller 130 changes a content which is displayed on the display 110 by driving an application to another content. If the bending line is located in the second area of the display 110, the controller 130 performs at least one function that is provided by the application.

First, a case in which an e-book application is executed and e-book content is displayed on the display is explained.

If an e-book application execution screen is displayed on the display 110, and, if it is determined that a bending line is located in the first area of the display 110, the controller 130 may change a currently displayed e-book to another e-book, and, if it is determined that the bending line is located in the second area of the display 110, the controller 130 may change a page of the current e-book. Also, if the bending line is located in the second area of the display 110, the controller 130 may perform a function such as setting a bookmark, setting a font, inserting an empty page, doodling/ erasing, taking notes/erasing, searching word, word translation/replacement/insertion, and looking up a dictionary.

The e-book content which is displayed as the e-book application is driven may be already stored in the storage (not shown), or may be received from an external server (not shown) in a streaming form.

Figure 41:
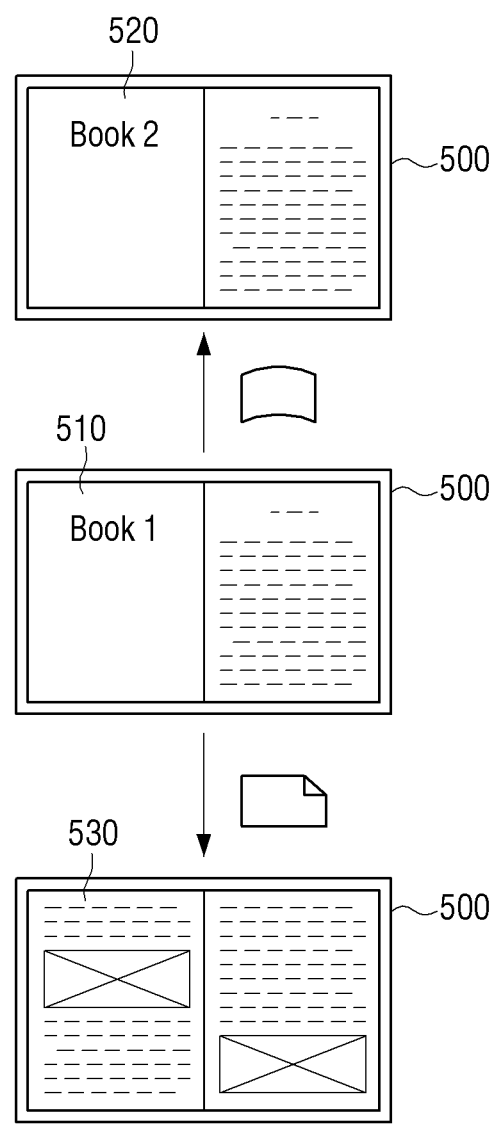
FIGS. 41 to 44 are views illustrating a function which is executed according to an area in which a bending line is located according to an exemplary embodiment.

For example, as shown in FIG. 41, if e-book 1 is displayed on a display 500 as the e-book application is executed, if the bending line is located in the first area, the controller 130 may change the currently displayed e-book content to e-book 2 520 and may display e-book 520. If it is determined that the bending line is located in the second area, the controller 130 may change a page of e-book 1 and may display another page 530.

On the other hand, the controller 130 may control to perform a different function according to where the bending line is located in the second area.

For example, if the bending line is located in the right upper corner area, the controller 130 may control to display a next page, and, if the bending line is located in the left upper corner area, the controller 130 may control to display a previous page. For another example, if the bending line is located in the right upper corner area, the controller 130 may perform a bookmark setting function, and, if the bending line is located in the right lower corner area, the controller 130 may perform a bookmark removing function.

In FIG. 41, if the bending line is located in the right upper corner area, the page changing function is performed. However, this is merely an example. That is, as described above, the controller 130 may perform various functions according to where the bending line is located in the second area. The functions may be already set at the time that the display apparatus 100 is manufactured, or may be set and changed by the user.

Next, a case in which an image is displayed on the display as an application is driven will be explained.

If an image is displayed on the display 110 as an application is driven, and if the bending line is located in the first area, the controller 130 may change the currently displayed image to another image, and, if the bending line is located in the second area of the display 110, the controller may display a rear side of the currently displayed image.

The image recited herein includes a photo image and a text image, and may be already stored in the storage (not shown) or may be received from an external server (not shown) in a streaming form.

Figure 42:
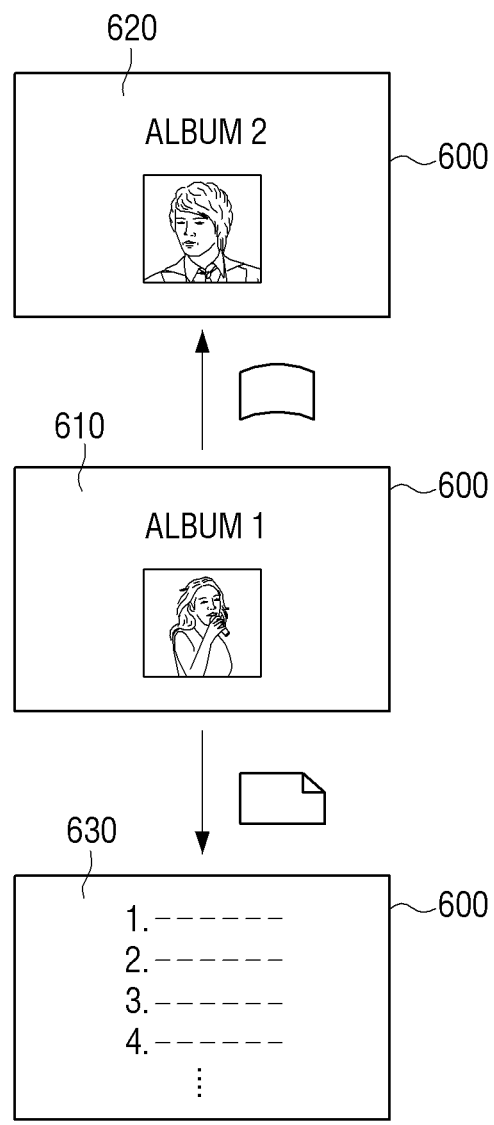

For example, as shown in FIG. 42, if a cover image 610 of album 1 is displayed on a display 600 as an application is driven, and if a bending line is located in the first area, the controller 130 may change the image and may display a cover image 620 of album 2. If the bending line is located in the second area, the controller 130 may display a rear side 630 of the cover image of album 1 currently displayed.

The cover image 620 of album 2 may be a previous image or a next image of the cover image of album 1.

In FIG. 42, if the bending line is located in the right upper corner area, the rear side of the image is displayed. However, this is merely an example. That is, if the bending line is located in the left upper corner area, the left lower corner area, or the right lower corner area, the rear side of the image may be displayed. Also, if the bending line is located in the peripheral area, the rear side of the image may be displayed. This may be already set at the time that the display apparatus 100 is manufactured or may be set and changed by the user.

Next, a case in which a multimedia content is displayed on the display as an application is driven will be explained.

If a multimedia content is reproduced as an application is driven, and if the bending line is located in the first area of the display 110, the controller 130 may reproduce another multimedia content, and if the bending line is located in the second area of the display 110, the controller 130 may perform at least one function of pausing, fast forwarding, rewinding, multi speeds reproducing, and volume control of the currently reproduced multimedia content.

The multimedia content includes at least one of a moving image content and a music content, and may be already stored in the storage (not shown) or may be received from an external server (not shown) in a streaming form.

Figure 43:
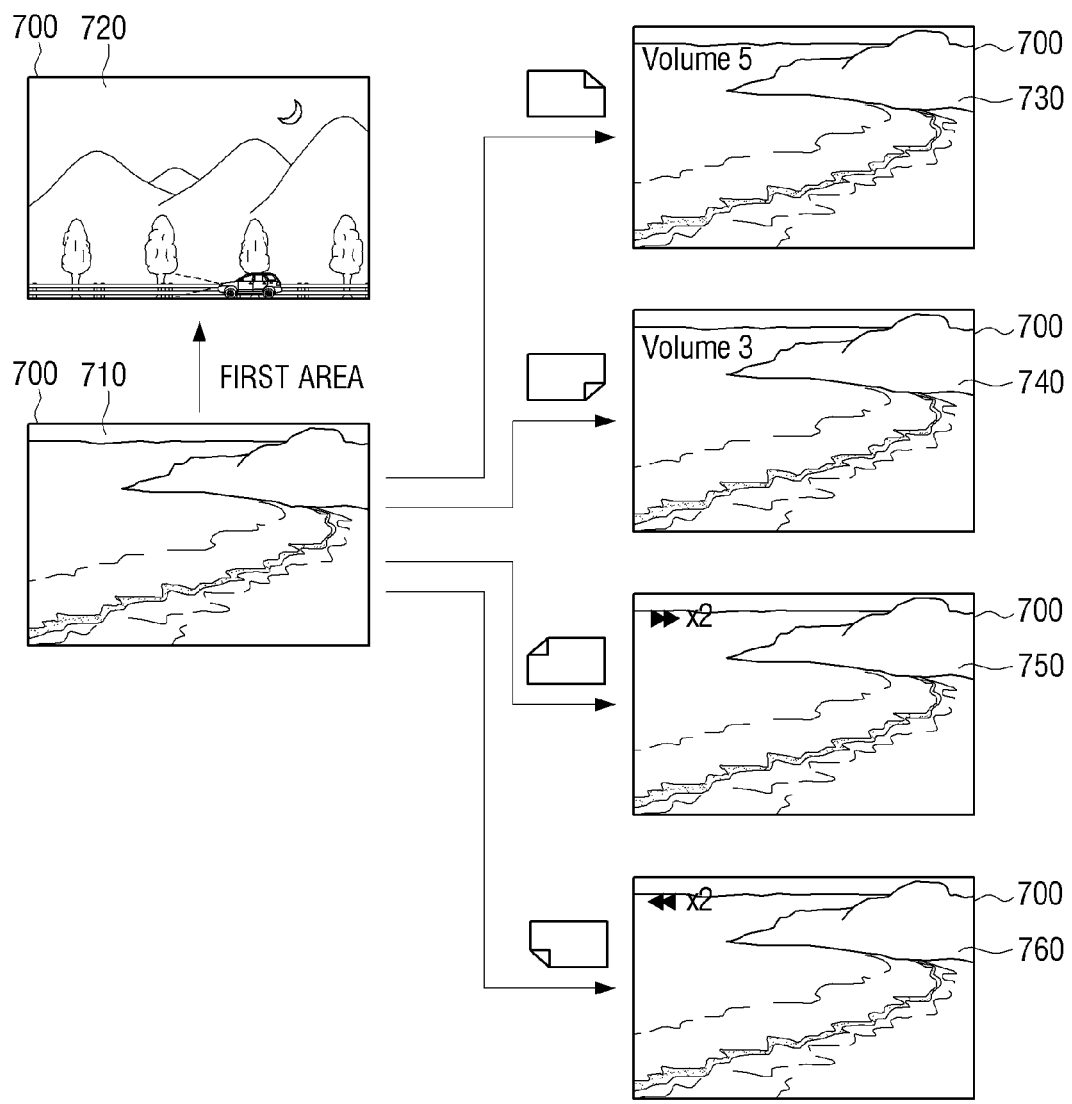

For example, as shown in FIG. 43, if content A 710 is reproduced as an application is driven, and if a bending line is located in the first area, the controller 130 may reproduce content B 720 which is different from the currently reproduced content A 710 by performing a content changing function. Also, if the bending line is located in the second area, the controller 130 may perform volume up 730, volume down 740, fast forwarding 750, and rewinding 760 with respect to the currently reproduced content A.

The controller 130 may control to perform a different function according to where the bending line is located in the second area.

For example, if it is determined that the bending line is located in the right upper corner area, the controller 130 may perform "volume up", if it is determined that the bending line is located in the right lower corner area, the controller 130 may perform "volume down", if it is determined that the bending line is located in the left upper corner area, the controller 130 may perform "changing to the next moving image content", and, if it is determined that the bending line is located in the left lower corner area, the controller 130 may perform "changing to the previous moving image content".

However, this is merely an example. The function which is performed according to the location of the corner area to which the bending line belongs may be changed variously. That is, the controller may control to perform at least one function of pausing, fast forwarding, rewinding, and volume control according to the location of the corner area to which the bending line belongs, and may control to perform opposite functions (for example, volume up and volume down or fast forwarding and rewinding).

In FIG. 43, if the bending line is located in the right upper corner area, the controller 130 may perform volume up, if the bending line is located in the right lower corner area, the controller 130 may perform volume down, if the bending line is located in the left upper corner area, the controller 130 may perform fast forwarding, and, if the bending line is located in the left lower corner area, the controller 130 may perform rewinding. However, this is merely an example. That is, the controller 130 may perform various functions according to where the bending line is located in the second area, and the functions may be already set at the time that the display apparatus 100 is manufactured, and may be set and changed by the user.

Next, a case in which a web page is executed as an application is driven will be explained.

If a plurality of web pages are executed as an application is driven, and if a bending line is located in the first area of the display 110, the controller 130 may change a currently displayed web page screen to another web page screen being executed, and, if the bending line is located in the second area of the display 110, the controller 130 may adjust a number of executed web pages. That is, an executed web page is terminated or a new web page is executed.

Figure 44:
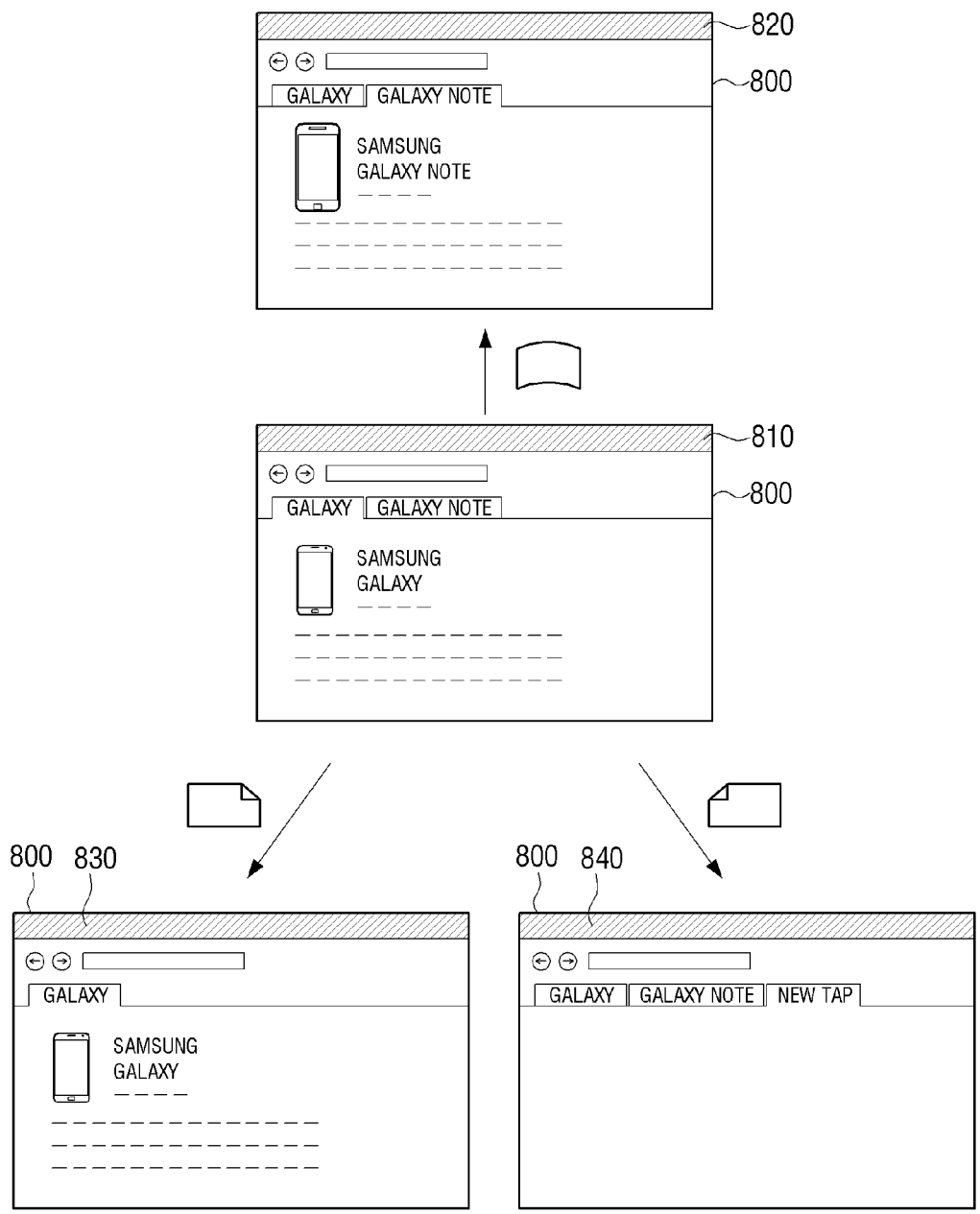

For example, as shown in FIG. 44, it is assumed that a plurality of web pages are executed as an application is driven, and one web page screen 810 is displayed on a display 800. In this case, if a bending line is located in the first area of the display 800, the other web page 820 may be displayed on the display 800.

If the bending line is located in the second area of the display 800, the controller 130 may terminate one web page screen 830 or may execute a new web page and display its execution screen 840 on the display 800.

The controller 130 may control to perform a different function according to where the bending line is located in the second area.

For example, if the bending line is located in the right peripheral area or the right corner area (the right upper corner area or the right lower corner area), the controller 130 may increase the number of executed web pages, and, if the bending line is located in the left peripheral area or the left corner area (the left upper corner area or the left lower corner area), the controller 130 may decrease the number of executed web pages.

In FIG. 44, if the bending line is located in the right upper corner area, the controller 130 decreases the number of executed web pages, and, if the bending line is located in the left upper corner area, the controller 130 increases the number of executed web pages. However, this is merely an example. That is, as described above, the controller 130 may perform various functions according to where the bending line is located in the second area, and the functions may be already set at the time that the display apparatus 100 is manufactured, or may be set and changed by the user.

As described above, if the bending line is located in the first area, a content changing function in the currently driven application is performed, and, if the bending line is located in the second area, a function that is executable in the application may be performed.

Figure 45:
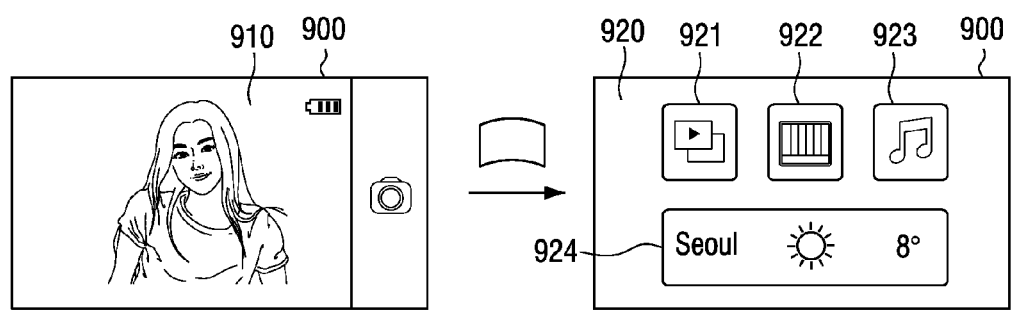
FIGS. 45 and 46 are views illustrating a case in which a first function is a function of changing a screen mode in an exemplary embodiment.
Figure 46:
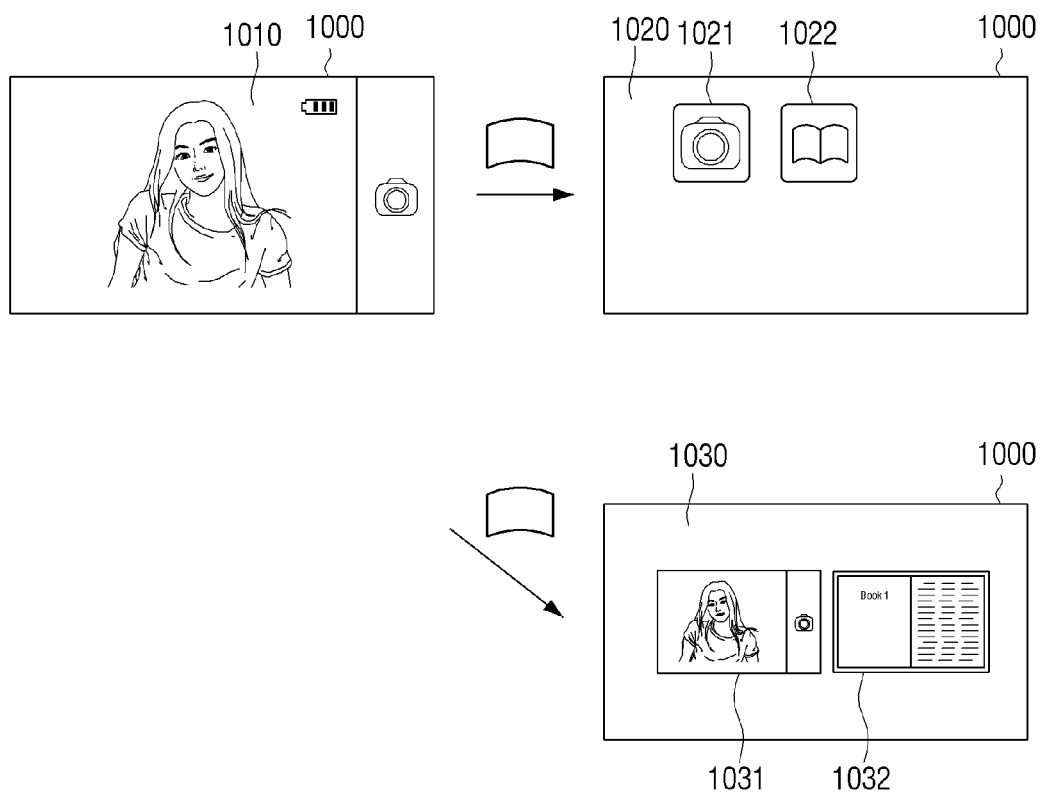

FIGS. 45 and 46 are views illustrating a case in which the first function is a function of changing a screen mode in the second exemplary embodiment.

If it is determined that a bending line is located in the first area of the display 110, the controller 130 changes a mode of a screen displayed on the display 110.

If it is determined that the bending line is located in the second area of the display 110, the controller 130 may control to perform a second function of an application. The second function of the application is a function that is executable in the application and varies according to a type of a currently driven application. This has been described above with reference to FIGS. 38 to 44 and thus a redundant explanation is omitted.

For example, if the bending line is located in the first area of the display 110, the controller 130 may display a screen including at least one object on the display 110. The object recited herein includes at least one of an icon, a widget, and an image.

For example, as shown in FIG. 45, if a camera application is driven and a screen 910 for taking a picture is displayed on a display 900, and, if a bending line is located in the first area, the controller 130 may display a screen 920 including icons 921 to 923 and a weather widget 924.

A type of an object constituting a screen may be already set by the user. That is, the user may select an icon of an application that the user has frequently used and information that the user wishes to have and a relevant widget in advance for the user's convenience.

For another example, if a plurality of applications are driven and if it is determined that a bending line is located in the first area of the display 110, the controller 130 may display a screen including information on the plurality of applications currently driven on the display 110.

The screen including the information on the plurality of applications may include an icon indicating each of the plurality of applications currently driven or an execution screen of each of the plurality of applications currently driven.

For example, as shown in FIG. 46, if a camera application is driven and a screen 1010 for taking a picture is displayed on a display 1000, and, if a bending line is located in the first area, the controller 130 may display a screen 1020 including icons 1021 and 1022 indicating a plurality of applications currently driven on the display 1000.

That is, the screen including the icon 1021 which indicates the camera application which is currently driven and the execution screen of which has been displayed on the display 1000, and the icon 1022 which indicates another application which is being driven, that is, an e-book application, is displayed on the display 1000.

In this case, if one icon is selected by user touch manipulation, the controller 130 may display an execution screen of the application corresponding to the selected icon on the display 1000.

In another example, as shown in FIG. 46, if a bending line is located in the first area, the controller 130 may display a screen 1030 that includes execution screens 1031 and 1032 of the plurality of applications currently driven on the display 1000. That is, the execution screen 1031 of the camera application which is being currently driven and the execution screen 1032 of the e-book application may be displayed on the display 1000.

In this case, if the user selects one execution screen using touch manipulation, the controller 130 may display the selected execution screen on the display 1000 in a full screen form.

As described above, if the bending line is located in the first area, the controller 130 performs a screen mode changing function, and, if the bending line is located in the second area, the controller 130 may perform a function that is executable in the application.

Figure 47:
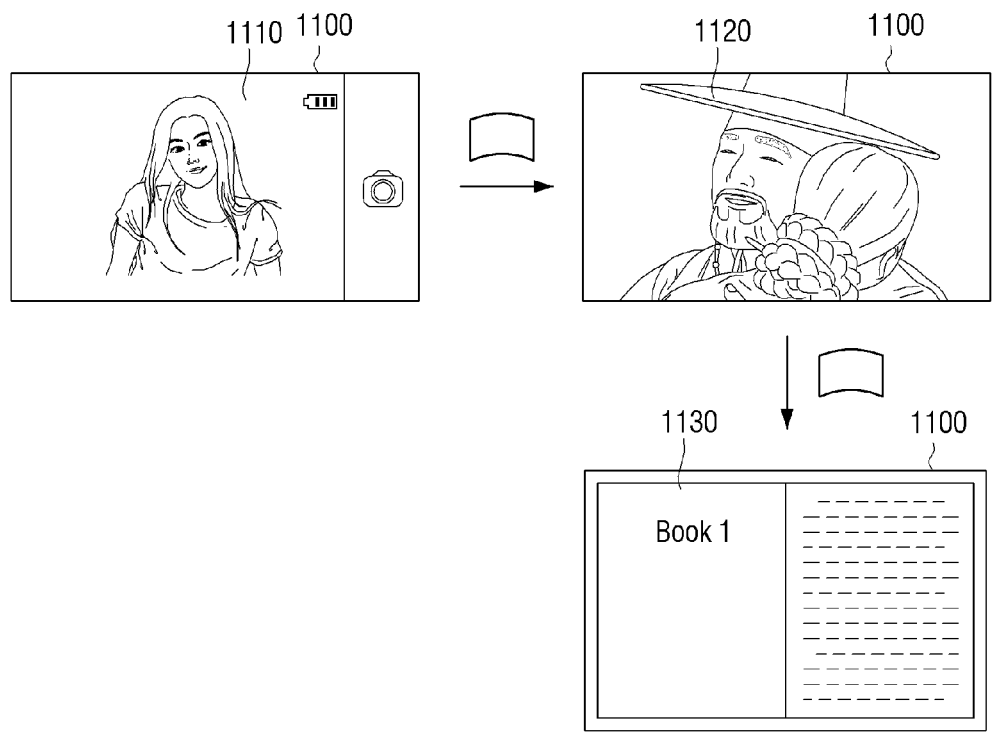
FIG. 47 is a view illustrating a case in which a higher function is a function of changing an application in an exemplary embodiment.

FIG. 47 is a view illustrating a case in which a higher function is a function of changing an application in the second exemplary embodiment.

If a bending line is located in the first area of the display 110, the controller 130 may change an application execution screen displayed on the display 110 to another application execution screen.

If a plurality of applications are simultaneously driven, the another application may be one of the plurality of applications. That is, the other application may be one of the plurality of applications which are driven according to a multitasking function.

If it is determined that the bending line is located in the second area of the display 110, the controller 130 may control to perform a second function of the application. The second function of the application refers to a function that is executable in the application and varies according to a type of the currently driven application. This has been described above with reference to FIGS. 41 to 44 and a redundant explanation is omitted.

For example, as shown in FIG. 47, if a camera application is driven and a screen 1110 for taking a picture is displayed on a display 1100, and, if a bending line is located in the first area, the controller 130 may change the camera application to another application which is being driven according to the multitasking function, that is, a moving image application, and may display content A 1120 on the display 1100.

Then, if bending of the display 1100 is performed again and the bending line is located in the first area, the controller 130 may change the application to still another application which is being driven according to the multitasking function, that is, an e-book application, and may display e-book 1 1130 on the display 1100.

As described above, if the bending line is located in the first area, the controller 130 performs an application changing function by displaying an execution screen of another application which is being currently driven, and, if the bending line is located in the second area, the controller 130 performs a function that is executable in the application.

Hereinafter, additional functions that can be commonly executed according to an area in which a bending line is located in an exemplary embodiment will be explained in detail. For the convenience of explanation, explanation will be provided with reference to FIG. 1.

Figure 48:
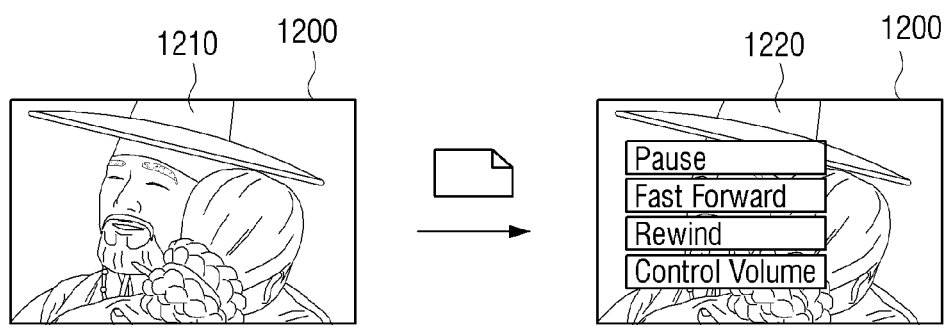
FIG. 48 is a view illustrating a graphic user interface (GUI) which is displayed if a bending line is located in a second area according to an exemplary embodiment.

FIG. 48 is a view illustrating a graphic user interface (GUI) which is displayed if a bending line is located in the second area according to an exemplary embodiment.

If the bending line is located in the second area of the display 110, the controller 130 may display a menu on a function that can be executed in an application in a form of a GUI.

The function that can be executed in the application refers to a function that can be executed in an application currently displayed on the display 110. That is, if a plurality of applications are driven according to a multitasking function, the application currently displayed on the display 110 refers to an application an execution screen of which is displayed on the display 110.

The function that can be executed in the application may be different according to a type of the application. This has been described above and a redundant explanation is omitted.

For example, as shown in FIG. 48, if content A 1210 is reproduced on a display 1200 as a moving image content reproducing application is driven, and, if a bending line is located in the second area of the display 1200, the controller 130 may display a function that can be executed in the moving image content reproducing application in a form of a GUI 1220. For example, the controller 130 displays the functions that can be executed in the moving image content reproducing application, pausing, fast forwarding, rewinding, and volume control, in the form of the GUI 1220, and, if the user selects a specific item on the GUI, the controller 130 executes a corresponding function.

In FIG. 48, the GUI is displayed if the bending line is located in the right upper corner area. However, this is merely an example. That is, if the bending line is located in a corner area other than the right upper corner area or in a peripheral area, the controller 130 may control to display the GUI. This may be already set at the time that the display apparatus 100 is manufactured or may be set or changed by the user.

Figure 49:
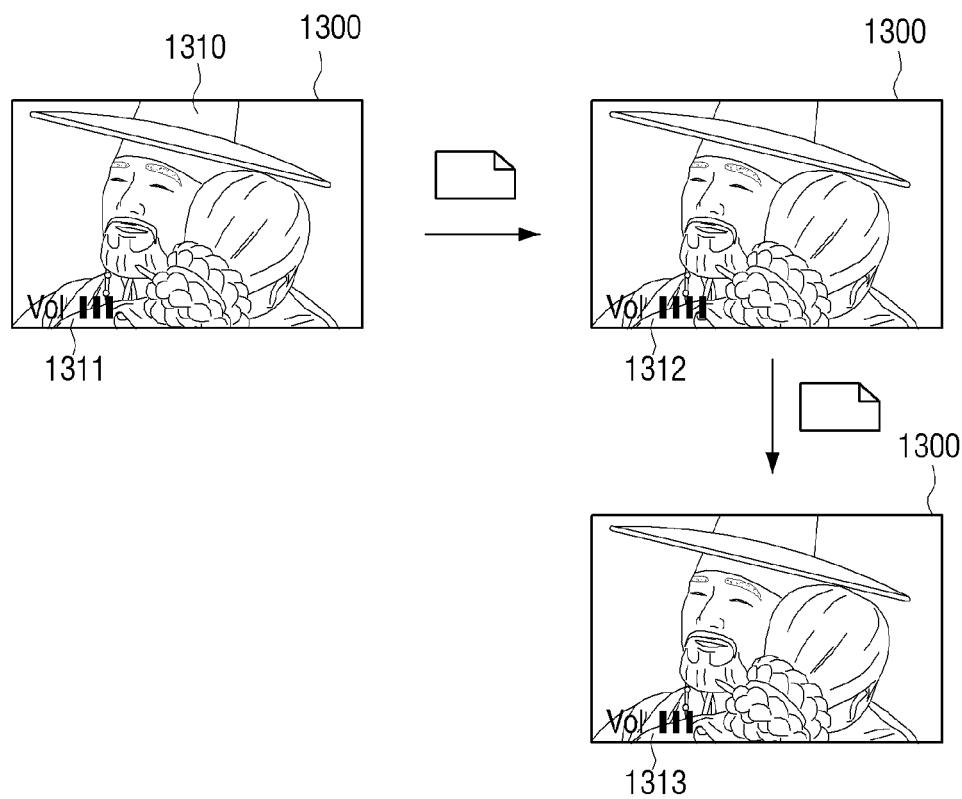
FIG. 49 is a view illustrating a method for controlling an object displayed on a display according to an area in which a bending line is located according to an exemplary embodiment.

FIG. 49 is a view illustrating a method for controlling an object displayed on a display according to an area in which a bending line is located according to an exemplary embodiment.

If a bending line is located in the second area, the controller 130 may control an object displayed on the display 110.

The object recited herein may include a graphic element for setting an environment of the display apparatus 100, such as a volume control graphic element and a brightness control graphic element. Also, the object may be embodied in a bar shape or a circular shape, and may include all graphic elements that can be gradually increased or decreased in their shapes.

Specifically, the controller 130 may increase or decrease the object in stages according to where the bending line is located in the second area.

For example, as shown in FIG. 49, it is assumed that a moving image reproducing application is executed, content A 1310 is reproduced on a display 1300, and a volume control graphic element 1311 having a bar shape is displayed.

In this case, if a bending line is located in the right upper corner area, the controller 130 may increase the volume control graphic element 1312 in stages and may display the same on the display 1300. If it is determined that the bending line is located in the right lower corner area, the controller 130 may decrease the volume control graphic element 1313 in stages and may display the same on the display 1300.

In the exemplary embodiment of FIG. 49, if the bending line is located in the right upper corner area or the right lower corner area, the controller 130 controls the displayed object. However, this is merely an example. That is, if the bending line is located in the second area, such as the left upper corner area and the left lower corner area or the left peripheral area and the right peripheral area, the controller 130 may control the displayed object.

Figure 50:
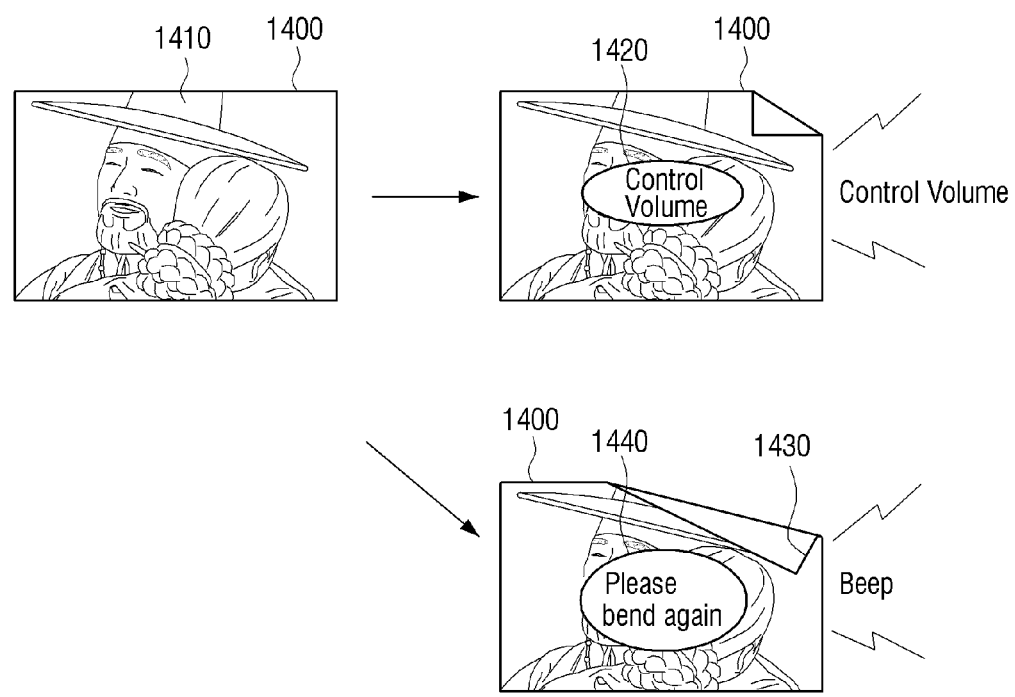
FIG. 50 is a view illustrating a method for providing a guide as to a function which is executed according to a bending line according to an exemplary embodiment.

FIG. 50 is a view illustrating a method for providing a guide as to a function that is executed according to a bending line according to an exemplary embodiment.

The controller 130 may display information on a function that is performed according to an area in which a bending line is located on a certain area of the display 110.

The certain area of the display 110 on which the information is displayed refers to an area in which one part of the display 110 does not overlap with the other part when the display 110 is bent, and may be located away from the bending line by a predetermined distance.

Specifically, if a bending line is located in the first area and thus a home screen is displayed or a first function of an application is executed, the controller 130 may relevant information on the certain area of the display 110 in a form of an on screen display (OSD).

Also, if the bending line is located in the second area and thus a function executable in an application is executed or a second function of an application is executed, the controller 130 may display relevant information on the certain area of the display 110 in a form of an OSD.

For example, as shown in FIG. 50, if a moving image reproducing application is executed and content A 1410 is displayed on a display 1400, and, if it is determined that a bending line is located in the right upper corner area, the controller 130 may perform a volume up or volume down function. At this time, the controller 130 may display information indicating that "volume control" is executed on an area in which one part of the display 1400 does not overlap with the other part when the right upper end is bent in a form of an on screen display (OSD) 1420.

In the above exemplary embodiment, information on a function that is executed is displayed on the display. However, this is merely an example. That is, as shown in FIG. 50, if the display apparatus 100 is equipped with an audio output apparatus such as a speaker, the controller 130 may output the information on the executable function (for example, "volume control") as audible information. That is, the information on the executable function may be displayed on the display or may be output through audible information, or may be output in a combination thereof.

For another example, the controller 130 may provide information regarding whether bending of the display 110 is normally performed or not in order to execute a specific function according to bending of the display 110.

That is, if it is impossible to execute a specific function according to bending like in the case in which a bending line overlaps with the first area and the second area, the controller 130, the controller 130 provides a relevant guide to the user and helps the user to perform correct bending.

For example, as shown in FIG. 50, it is assumed that a bending line, which is formed by bending 1430 of the display 1400, overlaps with the first area and the second area. In this case, the controller 130 may determine that the bending line is not effective and may control to display a message indicating "Please bend again" in a form of an OSD 1440.

In the above exemplary embodiment, the message to help the user to perform correct bending is displayed on the display. However, this is merely an example. That is, as shown in FIG. 50, if the display apparatus 100 is equipped with an audio output apparatus such as a speaker, the controller 130 may output the message to help the user to perform correct bending as audible information. That is, the message to help the user to perform correct bending may be displayed on the display or may be output as audible information, or may be output in a combination thereof.

Figure 51:
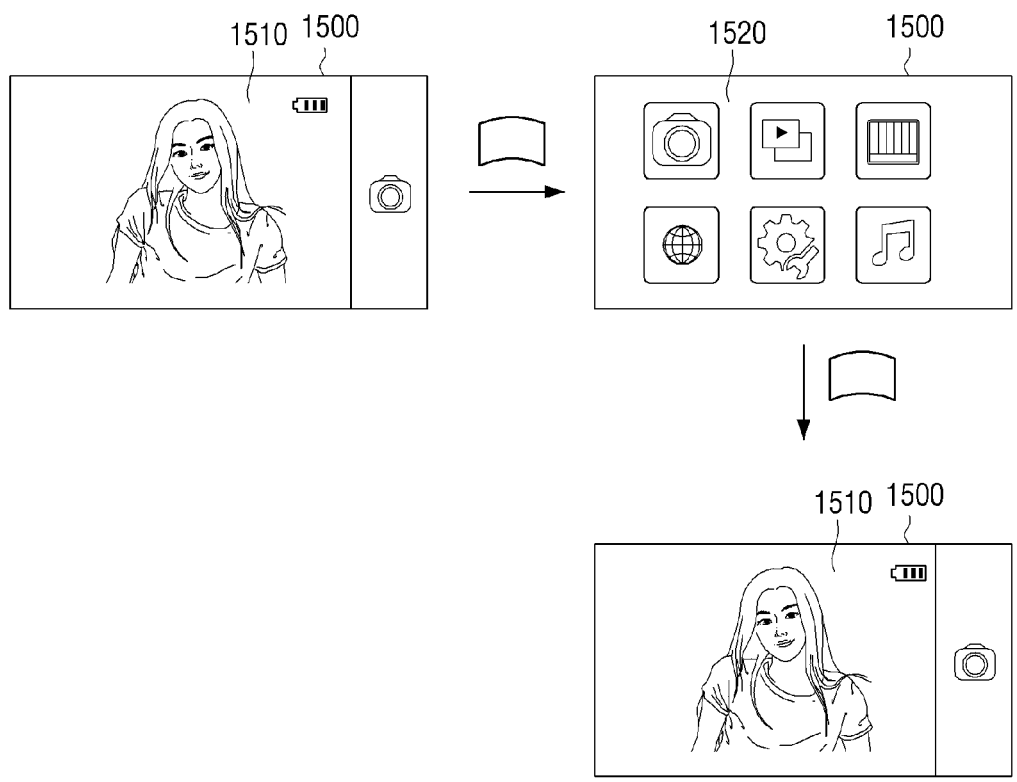
FIG. 51 is a view illustrating a function which is executed according to a bending direction according to an exemplary embodiment.

FIG. 51 is a view illustrating a function that is performed according to a bending direction according to an exemplary embodiment.

If the display 110 is bent, the controller 130 performs a function corresponding to an area in which a bending line is located. For example, if it is determined that the bending line is located in the first area, the controller 130 may display a home screen or performs a higher function of an application, and, if it is determined that the bending line is located in the second area, the controller 130 may perform a function that can be executed in an application or a lower function of an application.

The controller 130 may determine a bending direction in which the display 110 is bent using an output value of the sensor 120.

After that, if the display 110 is bent again, the controller 130 determines a location of a bending line and a bending direction. In this case, if it is determined that the display 110 is bent in a direction opposite to that of the previous bending and the bending line is located in the same area as the previous bending, the controller 130 may change the screen to a previous screen.

For example, as shown in FIG. 51, if a camera application is driven and a screen 1510 for taking a picture is displayed on a display 1500, and if a bending line is located in the first area, the controller 130 displays a home screen 1520 on the display 1500. At this time, it is assumed that the bending direction of the display 1500 is a forward direction of the display 1500.

After that, if the display 1500 is bent again, the bending direction is a backward direction of the display 1500, and the bending line is located in the first area, the controller 130 may display the screen that has been displayed before the home screen 1520 is displayed, that is, the screen 1510 for taking a picture, on the display 1500.

In the above exemplary embodiment, the function that is performed according to the bending direction if the bending line is located in the first area has been described. However, this is merely an example. That is, even if the bending line is located in the second area, the previous screen may be displayed according to the bending direction.

Figure 52:
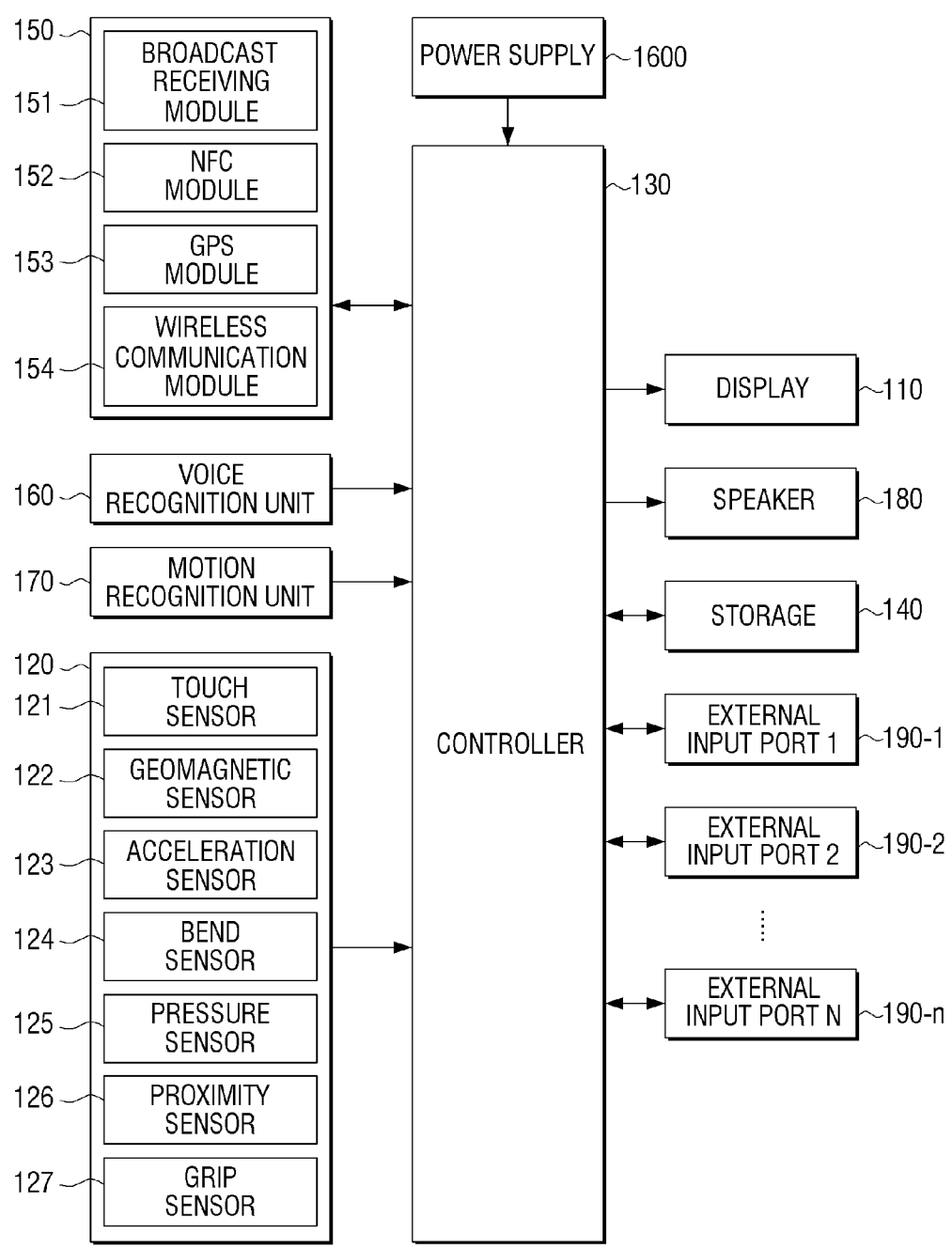
FIG. 52 is a block diagram illustrating a display apparatus according to an exemplary embodiment.

FIG. 52 is a block diagram illustrating a display apparatus according to an exemplary embodiment in detail. Referring to FIG. 52, a display apparatus 100 includes a display 110, a sensor 120, a controller 130, a storage 140, a communication unit 150, a voice recognition unit 160, a motion recognition unit 170, a speaker 180, external input ports 190-1-190-*n*, and a power supply 1600**.

The display 110 may be flexible. The detailed configuration and operation of the display 110 has been described above and thus a redundant explanation is omitted.

The storage 140 may store various programs or data associated with the operation of the display 110, setting information set by the user, system driving operating software, various applications, and information on operations corresponding to a user manipulation.

The sensor 120 senses a whole bending state of the display apparatus including the display 110. Referring to FIG. 52, the sensor 120 may include various kinds of sensors such as a touch sensor 121, a geomagnetic sensor 122, an acceleration sensor 123, a bend sensor 124, a pressure sensor 125, a proximity sensor 126, and a grip sensor 127.

The touch sensor 121 may be implemented by using a capacitive type or a resistive type of sensor. The capacitive type calculates touch coordinates by sensing minute electricity excited in a user's body when a part of the user's body touches the surface of the display 110, using a dielectric substance coated on the surface of the display 110. The resistive type includes two electrode plates, and, if a user touches a screen, calculates touch coordinates by sensing an electric current flowing due to contact between upper and lower plates at the touched point. As described above, the touch sensor 121 may be embodied in various forms.

The geomagnetic sensor 122 senses a rotation state and a moving direction of the display apparatus 100. The acceleration sensor 123 senses a degree of tilt of the display apparatus 100. The geomagnetic sensor 122 and the acceleration sensor 123 may be used to sense bending characteristics such as a bending direction or a bending area of the display apparatus 100 as described above. However, the geomagnetic sensor 122 and the acceleration sensor 123 may be used to sense a rotation state or a tilt state of the display apparatus 100.

The bend sensor 124 may be embodied in various shapes and numbers as described above, and may sense a bend state of the display apparatus 100. The configuration and operation of the bend sensor 124 has been described above and thus a redundant explanation is omitted.

The pressure sensor 125 senses a magnitude of pressure exerted to the display apparatus 100 when the user performs touch or bending manipulation, and provides the magnitude of pressure to the controller 130. The pressure sensor 125 may include a piezo film which is embedded in the display 110 and outputs an electric signal corresponding to the magnitude of pressure. Although the pressure sensor 125 is a separate element from the touch sensor 121 in FIG. 52, if the touch sensor 121 is implemented by using a resistive touch sensor, the resistive touch sensor may also perform the function of the pressure sensor 125.

The proximity sensor 126 senses a motion which approaches without directly contacting the display surface. The proximity sensor 126 may be implemented by using various types of sensors such as a high-frequency oscillation type proximity sensor which forms a high frequency magnetic field and detects an electric current induced by a magnetic characteristic which is changed when an object approaches, a magnetic type proximity sensor which uses a magnet, and a capacitive type proximity sensor which detects capacitance that changes when an object approaches.

The grip sensor 127 is disposed on a border or a handle of the display apparatus 100 separately from the pressure sensor 125, and senses a user's grip. The grip sensor 127 may be implemented by using a pressure sensor or a touch sensor.

The controller 130 analyzes various sensing signals sensed by the sensor 120, and performs a corresponding function. For example, the controller 130 may control to perform a different function according to an area to which a bending line formed by bending belongs. For another example, the controller 130 may process data which is obtained by communicating with an external apparatus, or data which is stored in the storage 140, and may output the processed data through the display 110 and the speaker 180. In this case, the controller 130 may communicate with the external apparatus using the communication unit 150.

The communication unit 150 may communicate with various types of external apparatuses according to various communication methods. The communication unit 150 may include various communication modules such as a broadcast receiving module 151, a near field communication (NFC) module 152, a GPS module 153, and a wireless communication module 154. The broadcast receiving module 151 may include a terrestrial broadcast receiving module (not shown) including an antenna to receive a terrestrial broadcast signal, a demodulator, and an equalizer, and a digital multimedia broadcasting (DMB) module to receive and process a DMB broadcast signal. The NFC module 152 is a module that communicates with an external apparatus located at a nearby distance according to an NFC method. The GPS module 153 is a module that receives a GPS signal from a GPS satellite and detects a current location of the display apparatus 100. The wireless communication module 154 is a module that is connected to an external network according to a wireless communication protocol such as WiFi or IEEE and communicates with the external network. The wireless communication module 154 may further include a mobile communication module that accesses a mobile communication network and performs communication according to various mobile communication standards such as 3$^{rd}$ generation (3G), 3$^{rd}$ generation partnership project (3GPP), and long term evolution (LTE) and further include communication module according to Bluetooth, or Zigbee.

The controller 130 may recognize touch manipulation, voice input or motion input besides the bending manipulation, and may perform an operation corresponding to the input. In this case, the controller 130 may activate the voice recognition unit 160 or the motion recognition unit 170.

The voice recognition unit 160 collects a user's voice or an external sound using a voice obtaining means such as a microphone (not shown), and transmits the user's voice or the external sound to the controller 130. If the user's voice is consistent with a pre-set voice command in a voice control mode, the controller 130 may perform a task corresponding to the user's voice. The task, which is controllable using a voice, may include various tasks such as adjusting a volume, selecting a channel, zapping a channel, adjusting a display property, reproducing, pausing, rewinding, fast forwarding, executing an application, selecting a menu, turning on an apparatus, and turning off an apparatus.

The motion recognition unit 170 obtains a user's image using an image picking up means (not shown) such as a camera, and provides the user's image to the controller 130. If the controller 130 analyzes the user's image and determines that the user makes a motion gesture corresponding to a pre-set motion command in a motion control mode, the controller 130 performs an operation corresponding to the motion gesture. For example, various tasks such as zapping a channel, turning on an apparatus, turning off, pausing, reproducing, stopping, rewinding, fast forwarding, mute may be controlled according to a motion. The above-described tasks that are controllable according to a voice and the tasks that are controllable according to a motion are merely examples and are not limited.

The external input ports 1, 2, . . . , n 190-1~190-n may be connected to various types of external apparatuses and may receive various data or programs or control commands. Specifically, the external input ports may include USB ports, headset ports, mouse ports, and LAN ports.

The power supply 1600 (e.g., a battery) supplies power to the elements of the display apparatus 100. The power supply 1600 may be implemented by including an anode collector, an anode electrode, an electrolyte, a cathode electrode, a cathode collector, and a sheath enclosing the aforementioned members. The power supply 1600 may be implemented by using a secondary cell which is chargeable and dischargeable. The power supply 1600 may be implemented in a flexible form so that it can be bent along with the display apparatus 100. In this case, the collector, the electrode, the electrolyte, and the sheath may be made of a flexible material. Detailed configuration and material of the power supply 1600 will be explained separately below.

Although FIG. 52 illustrates various elements which may be included in the display apparatus 100, the display apparatus 100 may not necessarily include all of the elements and may not include only the above elements. Therefore, some of the elements may be omitted or added according to a product type of the display apparatus 100, or may be replaced with other elements.

The controller 130 may control the elements according to user manipulation which is recognized through the sensor 120, the voice recognition unit 160, and the motion recognition unit 170 described above, and may perform various operations.

Figure 53:
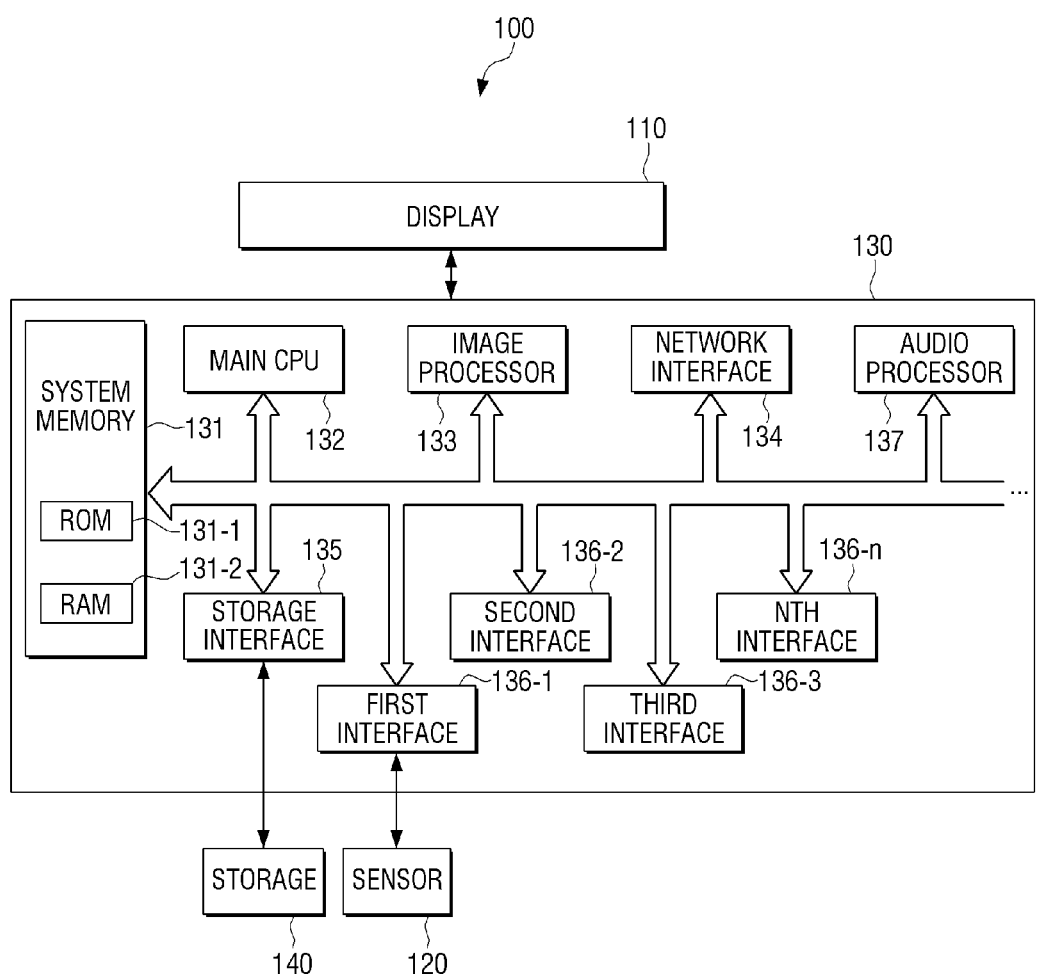
FIG. 53 is a view illustrating a controller in detail.

FIG. 53 is a view illustrating the controller 130 in detail.

Referring to FIG. 53, the controller 130 may include a system memory 131, a main CPU 132, an image processor 133, a network interface 134, a storage interface 135, first to nth interfaces 136-1 to 136-n, an audio processor 137, and a system bus.

The system memory 131, the main CPU 132, the image processor 133, the network interface 134, the storage interface 135, the first to nth interfaces 136-1 to 136-n, and the audio processor 137 may be connected to one another through the system bus, and may exchange various data or signals with one another.

The first to nth interfaces 136-1 to 136-n support interfacing between the elements including the sensor 120 and the elements of the controller 130. In FIG. 53, the sensor 120 is connected to only the first interface 136-1. However, if the sensor 120 includes various types of sensors as shown in FIG. 52, each of the sensors may be connected through each interface. Also, at least one of the first to nth interfaces 136-1 to 136-n may be implemented by using a button which is provided on a body of the display apparatus 100, or an input interface which receives various signals from an external apparatus which is connected through the external input ports 1 to n.

The system memory 131 includes a read only memory (ROM) 131-1 and a random access memory (RAM) 131-2.

The ROM 131-1 stores a set of commands for system booting. If a turn on command is input and power is supplied, the main CPU 132 copies an OS which is stored in the storage 140 into the RAM 131-2 according to a command stored in the ROM 131-1, executes the OS, and boots the system. If booting is completed, the main CPU 132 copies various applications stored in the storage 140 into the RAM 131-2, executes the applications copied into the RAM 131-2, and performs various operations.

As described above, the main CPU 132 may perform various operations according to the application stored in the storage 140.

The storage interface 135 is connected to the storage 140 and exchanges various programs, content, and data with the storage 140.

For example, if the user performs a touch manipulation or a bending manipulation corresponding to a reproducing command to reproduce and display a content stored in the storage 140, the main CPU 132 accesses the storage 140 through the storage interface 135, generates a list of stored contents, and displays the list on the display 110. In this state, if the user performs a touch manipulation or a bending manipulation to select one content, the main CPU 132 executes a content reproducing program which is stored in the storage 140. The main CPU 132 controls the image processor 133 to form a content reproducing screen according to a command included in the content reproducing program.

The image processor 133 may include a decoder, a renderer, and a scaler. Accordingly, the image processor 133 decodes a stored content, renders the decoded content data and forms a frame, and scales a size of the frame according to a screen size of the display 110. The image processor 133 provides the processed frame to the display 110 and displays the same.

The audio processor 137 refers to an element that processes audio data and provides the audio data to a sound outputting means such as a speaker 180. The audio processor 137 performs audio signal processing by decoding audio data which is stored in the storage 140 or audio data which is received through the communication unit 150, filtering noise, and amplifying the audio data to an appropriate decibel. In the above example, if the content to be reproduced is a moving image content, the audio processor 137 may process the audio data which is de-multiplexed from the moving image content, and may provide the audio data to the speaker 180 so that the audio data is synchronized with the image processor 133 and is output.

The network interface 134 is connected to external apparatuses through a network. For example, if a web browser program is executed, the main CPU 132 accesses a web server through the network interface 134. If web page data is received from the web server, the main CPU 132 controls the image processor 133 to form a web page screen, and displays the web page screen on the display 110.

As described above, if a bending manipulation is sensed in the display apparatus 100, the controller 130 determines an area in which a bending line is located. The controller 130 reads out information on an operation corresponding to the area in which the bending line is located from the storage unit 140, and performs an operation corresponding the information. The above-described operation of the controller 130 may be implemented by executing various programs stored in the storage 140.

Figure 54:
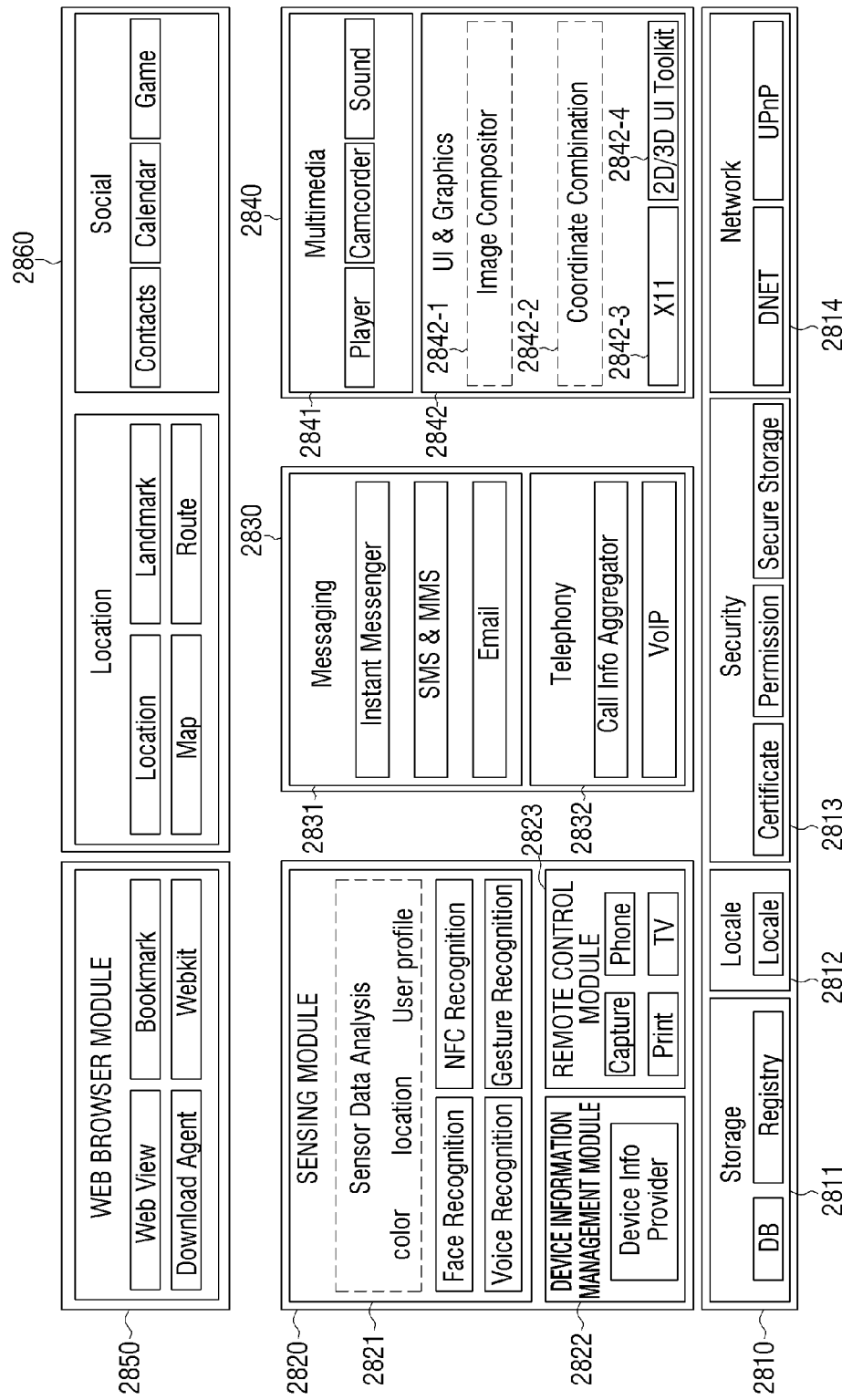
FIG. 54 is a view illustrating a software structure of a storage 140 to support operations of the controller 130 according to various exemplary embodiments.

FIG. 54 is a view illustrating a software structure of the storage 140 to support the operations of the controller 130 according to the above-described exemplary embodiments.

Referring to FIG. 54, the storage 140 includes a base module 2810, a device management module 2820, a communication module 2830, a presentation module 2840, a web browser module 2850, and a service module 2860.

The base module 2810 refers to a base module that processes signals transmitted from each hardware element that is included in the display apparatus 100, and transmits the signals to an upper layer module.

The base module 2810 includes a storage module 2811, a location-based module 2812, a security module 2813, and a network module 2814.

The storage module 2811 is a program module that manages a database (DB) or a registry. The location-based module 2812 is a program module that is interlocked with hardware such as a GPS chip and supports a location-based service. The security module 2813 is a program module that supports certification for hardware, permission of a request, and a secure storage, and the network module 2814 includes a Distributed.net (DNET) module and a Universal Plug and Play (UPnP) module as a module for supporting network connection.

The device management module 2820 is a module that manages information on external input and an external device, and uses the same. The device management module 2820 may include a sensing module 2821, a device information management module 2822, and a remote control module 2823.

The sensing module 2821 is a module that analyzes sensor data provided from various sensors of the sensor 120. Specifically, the sensing module 2821 is a program module that detects a location of a user or an object, color, shape, size, and other profiles. The sensing module 2821 may include a face recognition module, a voice recognition module, a motion recognition module, and an NFC recognition module. The device information management module 2822 is a module that provides information on various types of devices, and the remote control module 2823 is a program module that remotely controls a peripheral device such as a telephone, a television (TV), a printer, a camera, and an air conditioner.

The communication module 2830 is a module to communicate with an external apparatus. The communication module 2830 includes a messaging module 2831 such as a messenger program, a short message service (SMS) and multimedia message service (MMS) program, and an email program, and a telephony module 2832 which includes a call information aggregator program module and a voice over internet protocol (VoIP) module.

The presentation module 2840 is a module that generates a display screen. The presentation module 2840 includes a multimedia module 2841 to reproduce multimedia content and output the multimedia content, and a user interface (UI) and graphic module 2842 to process a UI and graphics. The multimedia module 2841 may include a player module, a camcorder module, and a sound processing module. Accordingly, the multimedia module 2841 generates a screen and a sound by reproducing various multimedia contents, and reproduces the same. The UI and graphic module 2842 may include an image compositor module 2842-1 to combine images, a coordinate combination module 2842-2 to combine coordinates on a screen to display an image and generate coordinates, an X11 module 2842-3 to receive various events from hardware, and a 2D/3D UI toolkit 2842-4 to provide a tool for configuring a UI of a 2D or 3D format.

The web browser module 2850 is a module that performs web-browsing and accesses a web server. The web browser module 2850 may include a web view module to render and view a web page, a download agent module to download, a bookmark module, and a web-kit module.

The service module 2860 is an application module that provides various services. Specifically, the service module 2860 may include various modules such as a navigation service module to provide a map, a current location, a landmark, and route information, a game module, and an advertisement application module.

The main CPU 132 of the controller 130 accesses the storage 140 through the storage interface 135, copies various modules stored in the storage 140 into the RAM 131-2, and performs operations according to operations of the copied modules.

Specifically, the main CPU 132 analyzes output values of the sensors of the sensor 120 using the sensing module 2821, determines a bending line, and detects information corresponding to an area in which the bending line is located from the database of the storage module 2810. The main CPU 132 drives a module corresponding to the detected information and performs an operation.

For example, if the operation is displaying a graphic user interface (GUI), the main CPU 132 configures a GUI screen using the image compositor module 2842-1 of the presentation module 2840. Also, the main CPU 132 determines a display location of the GUI screen using the coordinate combination module 2842-2 and controls the display 110 to display the GUI screen on the location.

If user manipulation corresponding to a message receiving operation is performed, the main CPU 132 executes the messaging module 2841, accesses a massage management server, and receives a message stored in a user account. Also, the main CPU 132 configures a screen corresponding to the received message using the presentation module 2840 and displays the screen on the display 140.

If a telephone call is performed, the main CPU 132 may drive the telephony module 2832.

As described above, programs of various structures may be stored in the storage 140 and the controller 130 may perform various operations using various programs stored in the storage 140.

Figure 55:
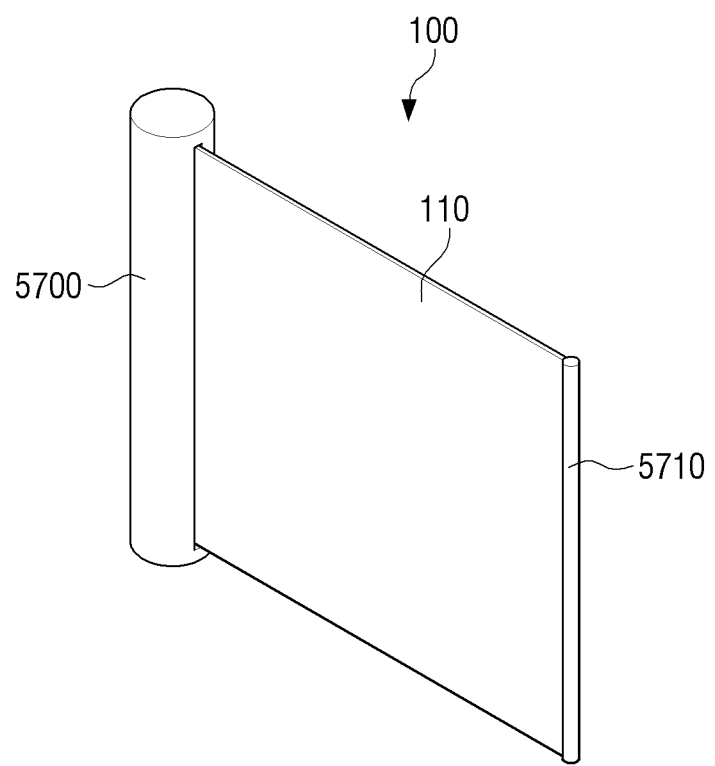
FIG. 55 is a view illustrating an example of a display apparatus which is embedded in a body.

FIG. 55 is a view illustrating an example of a display apparatus which is embedded in a body.

Referring to FIG. 55, the display apparatus 100 includes a body 5700, a display 110, and a grip unit 5710.

The body 5700 may serve as a kind of a case containing the display 110. If the display apparatus 100 includes various elements as shown in FIG. 52, elements other than the display 110 and some sensors may be mounted in the body 5700. The body 5700 includes a rotary roller for rolling the display 110. Accordingly, when not in use, the display 110 is rolled about the rotary roller and embedded in the body 5700.

If the user holds the grip unit 5710 and pulls the display 110, the rotary roller is rotated in the opposite direction to that of the rolling and rolling is released, so that the display 110 comes out to the outside of the body 5700. A stopper may be provided on the rotary roller. Accordingly, if the user pulls the grip unit 5710 by more than a predetermined distance, the rotation of the rotary roller is stopped by the stopper and the display 110 may be fixed. Accordingly, the user can execute various functions using the display 110 that is outside of the body 5700. If the user presses a button to release the stopper, the stopper is released and the rotary roller is rotated in a reverse direction. As a result, the display 110 is rolled in the body 5100. The stopper may have a switch shape to stop an operation of a gear to rotate the rotary roller. Since the rotary roller and the stopper may employ a general rolling structure as it is, detailed illustration and explanation thereof are omitted.

The grip unit 5710 and the body 5700 may be made of a flexible material so that they can be bent along with the display 110.

The body 5700 includes a power supply 1600. The power supply 1600 may be implemented by using a battery connector on which a disposable battery is mounted, a secondary cell which can be charged and used multiple times by the user, and a solar cell which generates electricity using solar heat. If the power supply is implemented by using the secondary cell, the user may connect the body 5700 to an external power source through a wire and may charge the power supply 1600.

In FIG. 55, the body 5700 has a cylindrical shape. However, the shape of the body 5700 may be quadrangular or other polygonal shape. Also, the display 110 may be implemented in various forms such as enclosing the body 5700, rather than being embedded in the body 5700 and being exposed to the outside by being pulled.

Figure 56:
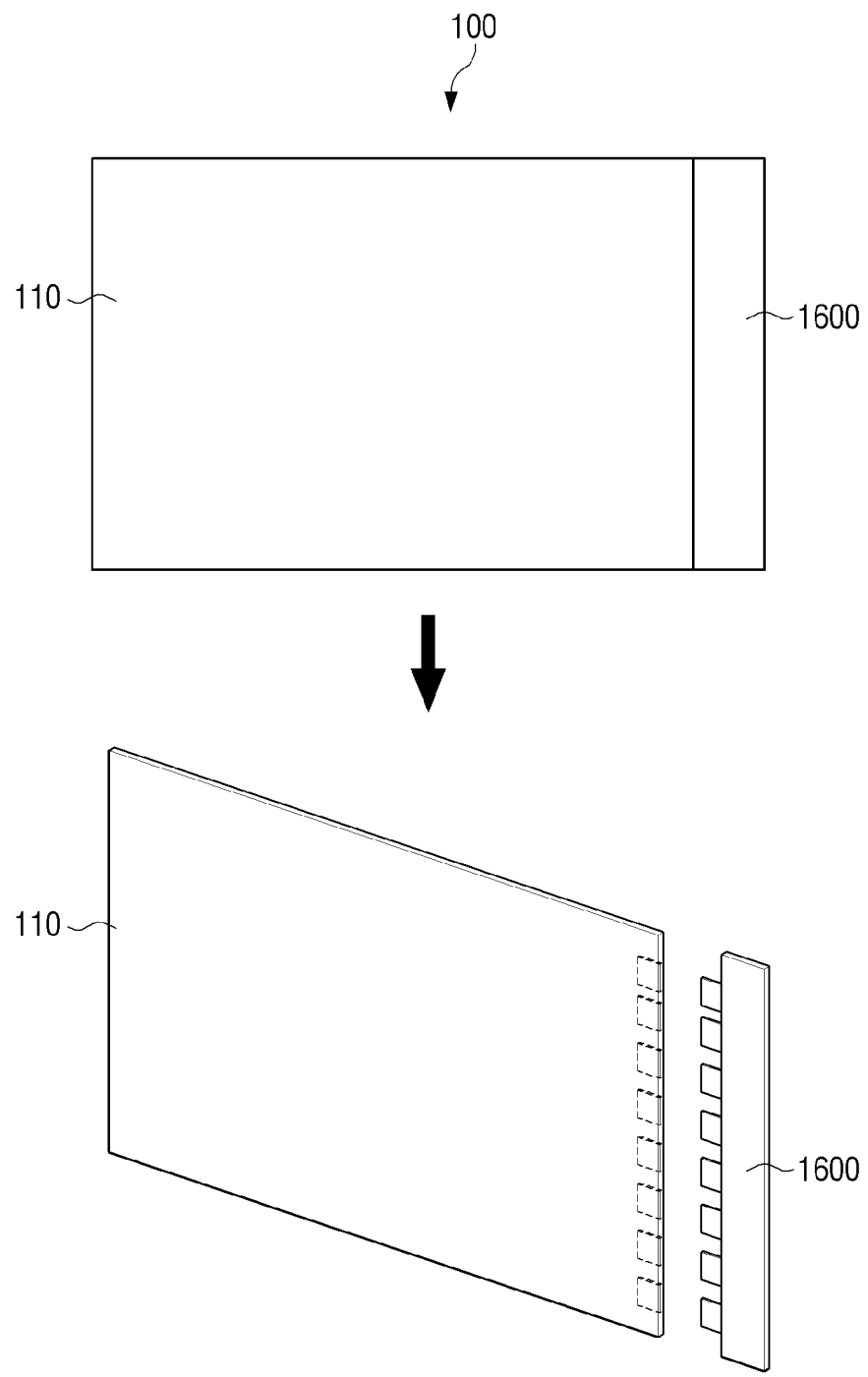
FIG. 56 is a view illustrating a display apparatus including a power supply which is attachable and detachable.

FIG. 56 is a view illustrating a display apparatus in which a power supply 1600 is attachable and detachable. Referring to FIG. 56, the power supply 1600 is provided on one edge of the display apparatus and is attachable and detachable.

The power supply 1600 is made of a flexible material and can be bent along with the display 110. Specifically, the power supply 1600 includes a cathode collector, a cathode electrode, an electrolyte, an anode electrode, an anode collector, and a sheath covering the aforementioned members.

For example, the collector may be implemented by using an alloy such as TiNi having good elasticity, metal such as copper and aluminum, a conductive material such as metal coated with carbon, carbon, and a carbon fiber, or a conducting polymer such as polypyrole.

The cathode electrode may be manufactured by a negative electrode material such as metal such as lithium, natrium, zinc, magnesium, cadmium, hydrogen storage alloy, and lead, nonmetal such as carbon, and a high molecular electrode material such as organosulfur.

The anode electrode may be manufactured by a positive electrode material such as sulfur and metal sulfide, lithium transition metal oxide such as $LiCoO_2$, and a high molecular electrode material such as $SOCl_2$, $MnO_2$, $Ag_2O$, $Cl_2$, $NiCl_2$, and $NiOOH$. The electrolyte may be implemented in a gel form using PEO, PVdF, PMMA, and PVAC.

The sheath may use a general polymer resin. For example, PVC, HDPE, or epoxy may be used. Besides these, any material that can prevent damage of a thread-type cell and is freely flexible or bendable may be used for the sheath.

Each of the anode electrode and the cathode electrode in the power supply 1600 may include a connector to be electrically connected to an external source.

Referring to FIG. 56, the connector protrudes from the power supply 1600 and a recess corresponding to a location, a size, and a shape of the connector is formed on the display 110. Accordingly, the power supply 1600 is connected with the display 110 as the connector and the recess are connected to each other. The connector of the power supply 1600 is connected to a power connection pad (not shown) of the display apparatus 100 to supply power to the display apparatus 100.

Although the power supply 1600 is attached to or detached from one edge of the display apparatus 100 in FIG. 56, this is merely an example. A location and a shape of the power supply 1600 may be changed according to a product characteristic. For example, if the display apparatus 100 has a predetermined thickness, the power supply 1600 may be mounted on a rear surface of the display apparatus 100.

The display apparatus 100 may suggest a guide to instruct the user to perform an appropriate bending.

Figure 57:
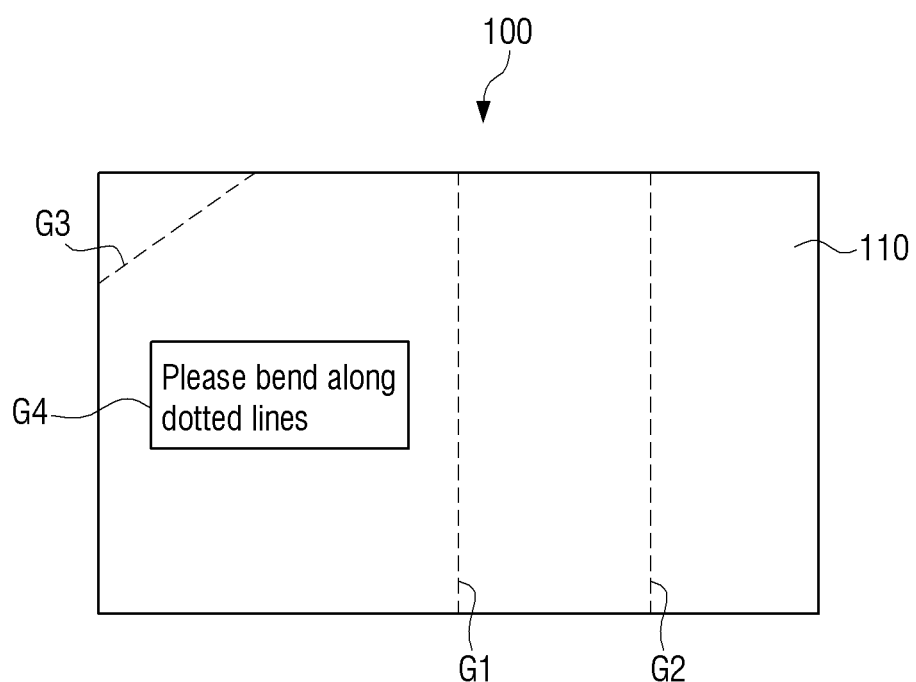
FIG. 57 is a view illustrating an operation of a flexible display apparatus which displays a guide.

FIG. 57 is a view illustrating the display apparatus 100 which displays various guides. Referring to FIG. 57, the display apparatus 100 may display guides such as dotted line guides G1, G2, and G3 and a text guide G4 on the screen of the display 110. The dotted line guides G1, G2, and G3 are to locate a bending line in the first area or the second area, and the text guide G4 directly instructs the user to bend along the dotted lines.

The guide provided on the display apparatus 100 may be implemented by using an image or a pop-up window besides the dotted line or the text described above. Also, the guide may be implemented in a form so that it can inform a number of times that bending is performed, a degree of bending, a bending angle, a bending direction, a bending order, and a bending shape, besides the bending location.

Such guides may be displayed when the display apparatus 100 is turned on or a locking state is released. Also, the guides may be displayed when an application that allows bending input is executed. In this case, the guides may be displayed only if a guide display function is selected on an option menu.

Also, the display apparatus 100 which employs the above-described various inputting methods may provide feedback in response to user manipulation. Such feedback may be provided using sight, hearing and touch.

For example, if the bending line is not located in the first area or the second, a voice message to induce the user to re-bend may be output.

Figure 58:
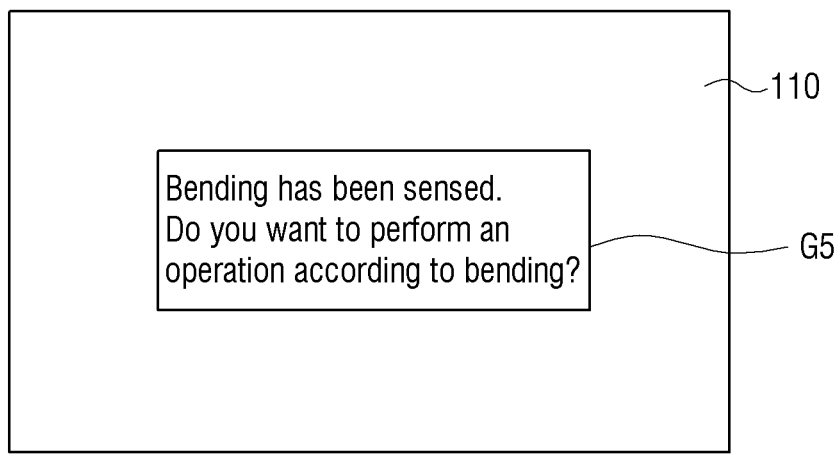
FIGS. 58 and 59 are views illustrating an operation of a flexible display apparatus which provides feedback according to user manipulation.

FIG. 58 illustrates an example of an inquiry message G5 when bending is sensed. According to the exemplary embodiments described above, if the bending line is located in the first area or the second area, a corresponding function can be directly performed. However, as shown in FIG. 58, the display apparatus 100 may display the message G5 to ask the user as to whether to perform the corresponding function, and a check menu item (not shown), and, if the user selects the check menu item, may perform an operation corresponding to the previously input bending. Also, if the user who has checked the message G5 of FIG. 58 performs the bending that the user has performed previously once again, the display apparatus may perform an operation corresponding to the bending.

The message may be provided to the user through voice feedback and haptic feedback besides the visual message. The voice feedback is outputting a voice to induce the user to re-bend. The haptic feedback is informing the user by locally vibrating a part of the surface of the display 110, vibrating the whole display apparatus 100, or deforming a location of a bending line where bending is sensed convexly.

Figure 59:
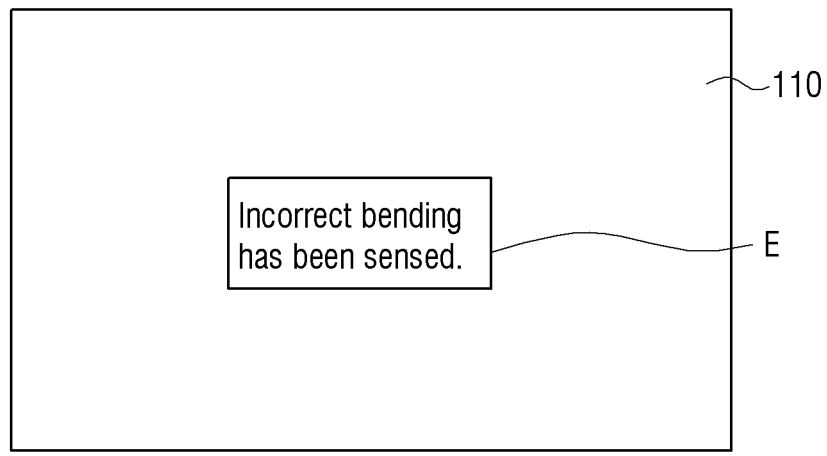

FIG. 59 illustrates an example of a visual feedback message (E) informing that ineffective bending is performed, that is, the bending line overlaps with the first area and the second area. Although a message (E) of a text type is provided in a pop-up form in FIG. 59, an arrow informing a correct bending input location, a dotted line indicating an exact bending line, a solid line, or texts or exemplary guide images informing a correct bending input method may be provided. For example, a text message saying "Please bend the right upper corner inwardly and then unbend it as shown in the picture" may be displayed along with an image showing that the right corner is bent.

An example of voice feedback, which is provided when incorrect bending is sensed, may be a warning sound, a voice message informing of incorrect input, and a voice message explaining a correct bending input method.

An example of haptic feedback, which is provided when incorrect bending is sensed, may be vibrating of the whole display apparatus 100, locally vibrating of a surface that a user's body touches, and informing of ineffective bending by generating heat on a portion that the user's body touches.

As described above, the user can check whether the bending line overlaps with the first area and the second area according to the feedback, and can take follow-up measures.

Figure 60:
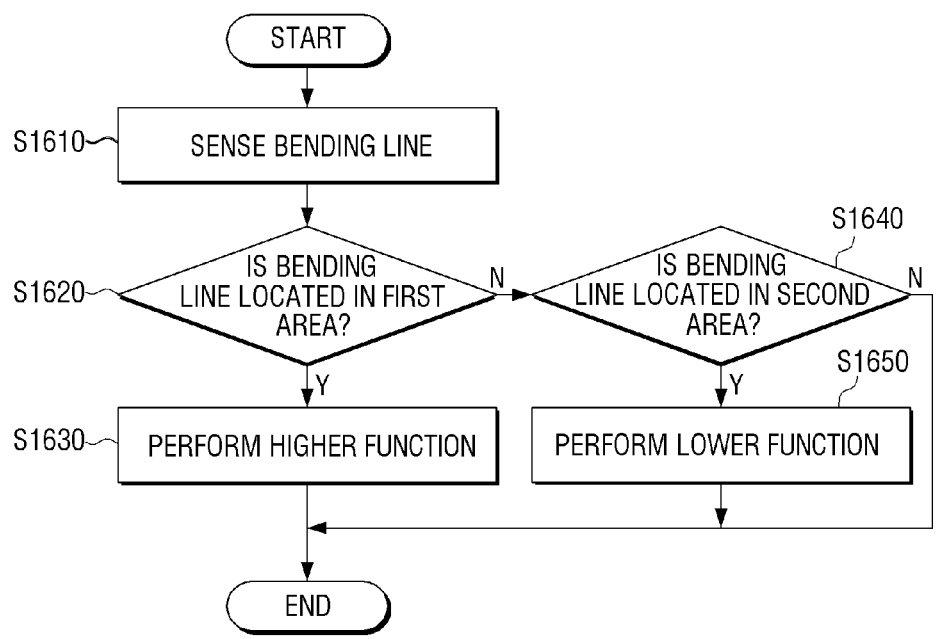
FIG. 60 is a flowchart to explain a method for controlling of a display apparatus according to an exemplary embodiment.

FIG. 60 is a flowchart to explain a method for controlling of a display apparatus according to an exemplary embodiment. In particular, the display apparatus according to an exemplary embodiment may include a display.

First, a bending line, which is formed by bending of the display, is sensed (S1610). Specifically, a location of a bending line may be sensed. That is, the bending line is sensed using a bend sensor and the bending line may be a line that connects different points at which the bend sensor outputs the greatest value.

After that, if the bending line is located in a first area of the display when at least one application is driven (S1620-Y), a higher function is performed (S1630). The higher function may be an operating system level function such as a function of displaying a home screen on the display.

The home screen may be a screen that includes at least one icon indicating an application installed in the display apparatus.

In this case, if the bending line is located in the first area of the display, the display apparatus stops driving the application displayed on the display and displays the home screen.

If the bending line is located in a second area of the display (S1640), a lower function is performed (S1650). The lower function may be an application level function that is specific to an application being executed and displayed on the screen and that is executable in an application.

The first area may be an area that includes a center of the display and the second area may be an area that does not include the center of the display.

Specifically, the first area may include at least one of a horizontal area which has a predetermined width on the center of the display in a vertical direction and is extended in a horizontal direction, a vertical area which has a predetermined width on the center of the display in the horizontal direction and is extended in the vertical direction, and an area which includes the horizontal area and the vertical area.

The first area may include at least one of a first diagonal area which has a predetermined width and is extended from a left upper end of the display across to a right lower end of the display, a second diagonal area which has a predetermined width and is extended from a right upper end of the display across to a left lower end of the display, and an area which includes the first diagonal area and the second diagonal area.

The second area may include at least one of a corner area which is formed within a predetermined distance from each corner of the display, and a peripheral area which is formed within a predetermined distance from each side of the display.

The first area and the second area have been described above in detail with reference to FIGS. 22 to 29.

A different function may be performed according to a driven application. Therefore, a function that is performed if a bending line is located in the second area is different according to an application as follows:

If an e-book application execution screen is displayed on the display, and, if a bending line is located in the second area of the display, a currently displayed e-book may be changed to another e-book or a page of the currently displayed e-book may be changed.

If an image is displayed on the display as an application is driven, and if a bending line is located in the second area of the display, the currently displayed image may be changed to another image or a rear side of the currently displayed image may be displayed.

Also, if multimedia content is reproduced as an application is driven, and, if a bending line is located in the second area of the display, another multimedia content may be reproduced or at least one function of pausing, fast forwarding, rewinding, multi speeds reproducing, and volume control of the currently reproduced multimedia content may be performed. The multimedia content may include at least one of moving image content and music content.

Figure 61:
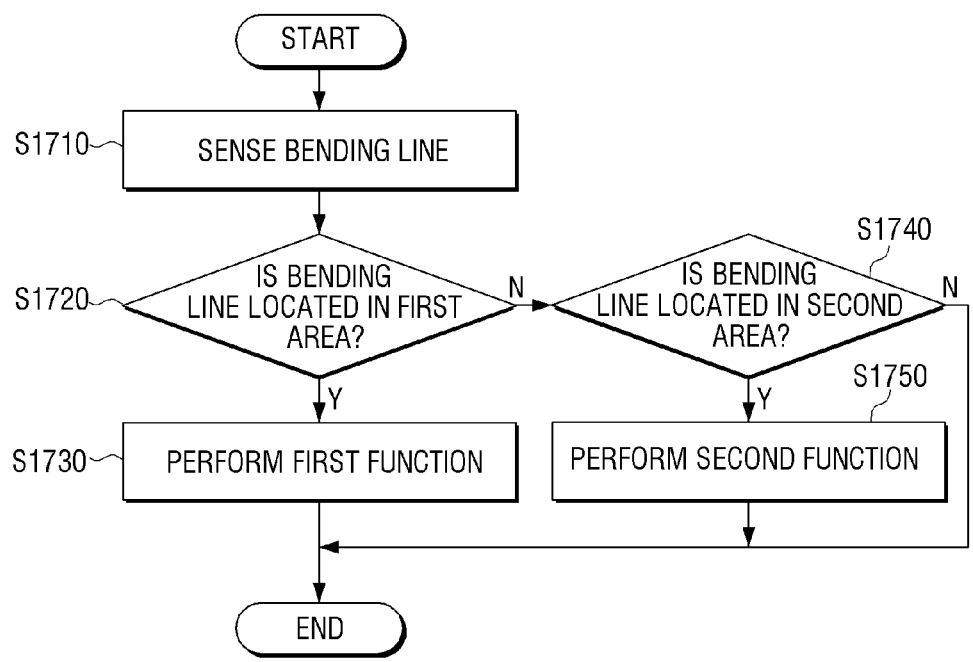
FIG. 61 is a flowchart to explain a method for controlling of a display apparatus according to an exemplary embodiment.

FIG. 61 is a flowchart to explain a method for controlling of a display apparatus according to an exemplary embodiment. In particular, the display apparatus according to an exemplary embodiment may include a display.

A bending line formed by bending of the display is sensed (S1710).

Specifically, a location of a bending line is sensed. That is, the bending line is sensed using a bend sensor, and the bending line may be a line that connects different points at which the bend sensor outputs the greatest value.

After that, if at least one application is driven, and, if the bending line is located in a first area of the display (S1720-Y), a first function of the application is performed (S1730). If the bending line is located in a second area of the display (S1740-Y), a second function of the application is performed.

Specifically, the first area may be an area that includes a center of the display and the second area may be an area that does not include the center of the display.

The first area may include at least one of a horizontal area which has a predetermined width on the center of the display in a vertical direction and is extended in a horizontal direction, a vertical area which has a predetermined width on the center of the display in the horizontal direction and is extended in the vertical direction, and an area which includes the horizontal area and the vertical area.

The first area may include at least one of a first diagonal area which has a predetermined width and is extended from a left upper end of the display across to a right lower end of the display, a second diagonal area which has a predetermined width and is extended from a right upper end of the display across to a left lower end of the display, and an area which includes the first diagonal area and the second diagonal area.

The second area may include at least one of a corner area which is formed within a predetermined distance from each corner of the display, and a peripheral area which is formed within a predetermined distance from each side of the display.

The first area and the second area have been described above in detail with reference to FIGS. 22 to 29.

The method for controlling of the display apparatus according to an exemplary embodiment may perform various functions according to an area in which a bending line is located.

In the case of the first function, if it is determined that a bending line is located in the first area of the display, a content which is displayed on the display as an application is driven may be changed to another content. The second function is a function that is executed in an application and thus will be explained according to each application.

If an e-book application execution screen is displayed on the display, and, if a bending line is located in the first area of the display, a currently displayed e-book may be changed to another e-book, and, if the bending line is located in the second area of the display, a page of the currently displayed e-book may be changed.

If an image is displayed on the display as an application is driven, and if a bending line is located in the first area of the display, the currently displayed image may be changed to another image, and, if the bending line is located in the second area of the display, a rear side of the currently displayed image may be displayed.

Also, if a multimedia content is reproduced as an application is driven, and, if a bending line is located in the first area of the display, another multimedia content may be reproduced, and, if the bending line is located in the second area of the display, at least one function of pausing, fast forwarding, rewinding, multi speeds reproducing, and volume control of the currently reproduced multimedia content may be performed. The multimedia content may include at least one of moving image content and music content.

Also, if a plurality of web pages are executed as an application is driven, and, if a bending line is located in the first area of the display, a currently displayed web page screen may be changed to another web page screen, and, if the bending line is located in the second area of the display, a number of web pages being executed may be adjusted.

Regarding the second function, if a bending line is located in the second area of the display, a menu on a function that is executable in the application may be displayed in a form of a GUI.

Regarding the first function, if a bending line is located in the first area of the display, a mode on a screen displayed on the display may be changed.

Specifically, if a bending line is located in the first area of the display, a screen including at least one object may be displayed on the display. The object may include at least one of an icon, a widget, and an image.

If a plurality of applications are driven, and, if a bending line is located in the first area of the display, a screen including information on the plurality of applications currently driven may be displayed on the display.

Also, if a bending line is located in the first area of the display, an application execution screen displayed on the display may be changed to another application execution screen. If a plurality of applications are simultaneously driven, the another application may be one of the plurality of applications.

Also, a non-transitory computer readable medium, which stores a program for performing a method for controlling according to an exemplary embodiment in sequence, may be provided.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM), and may be provided.

Although the block diagram illustrating the display apparatus does not illustrate a bus, the elements of the display apparatus may be communicated with one another through a bus. Also, the display apparatus may further include a processor such as a CPU or a microprocessor for performing the above-described various operations.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A deformable display device comprising:
   a deformable display;
   a sensor which senses a deformation in a first area of the deformable display and a deformation in a second area of the deformable display, wherein the deformation in the first area is sensed while the deformation in the second area is sensed; and
   a controller which:
      if the deformation in the first area satisfies a predetermined condition, identifies the deformation in the first area as an effective deformation and the deformation in the second area as an ineffective deformation; and
      if the deformation in the first area does not satisfy the predetermined condition, identifies the deformation in the first area and the deformation in the second area as an ineffective deformation.

2. The deformable display device of claim 1, wherein the controller further determines whether to identify the deformation in both the first area and the deformation in the second area as the effective deformation , and
   wherein the controller further identifies both the first area and the second area as the effective deformation if it is determined to identify both the first area and the second area.

3. The deformable display device of claim 1, wherein the controller identifies only the deformation in the first area as the effective deformation if the deformation is wholly located within the first area and at least one predetermined margin area adjacent to the first area.

4. The deformable display device of claim 3, wherein the controller identifies only the deformation in the second area as the effective deformation if the deformation is wholly located within the second area and at least one predetermined margin area adjacent to the second area.

5. The deformable display device of claim 4, wherein the at least one predetermined margin area adjacent to the first area corresponds to at least one of a usage history of the deformable display, a manufacturer setting, a bending type, a usage history of a user, and a user setting.

6. The deformable display device of claim 5, wherein the at least one predetermined margin area adjacent to the second area corresponds to at least one of a usage history of the deformable display, a manufacturer setting, a bending type, a usage history of a user, and a user setting.

7. The deformable display device of claim 1, wherein the controller identifies only the deformation in the first area as the effective deformation based on deformation information comprising at least one of a partial size of the deformation located in one or more areas of the deformable display, a total size of the deformation, an angle of the deformation, a location of the deformation, a number of areas where the deformation is located, and a holding time of the deformation.

8. The deformable display device of claim 1, wherein the controller determines whether to identify only the deformation in the first area as the effective deformation based on deformation information, an application being displayed on the deformable display and one or more active input areas corresponding to the application.

9. The deformable display device of claim 1, wherein the controller determines whether to identify only the deformation in the first area as the effective deformation based on deformation information and a skill level of a user.

10. The deformable display device of claim 9, wherein the skill level of the user is determined based upon a user profile comprising at least one of a date of first use of the deformable display by the user, a number of uses of the deformable display by the user, a total time of usage of the deformable display by the user, a metric which indicates an accuracy of deformation input by the user, and a total number of deformations input by the user.

11. The deformable display device of claim 10, wherein the skill level comprises at least one of a score of the user determined based upon the user profile and a category of the user determined based upon the user profile.

12. The deformable display device of claim 1, wherein the deformation comprises a line that connects points at which the sensor outputs a greatest deformation value.

13. The deformable display device of claim 1, wherein the controller further determines whether to identify none of the deformation in the first area and the deformation in the second area as the effective deformation, and
   wherein the controller further identifies iv) none of the first area and the second area as the effective deformation if it is determined to identify none of the first area and the second area.

14. A method for controlling a deformable display device comprising:
   sensing a deformation located in a first area of the deformable display and a deformation in a second area of the deformable display, wherein the deformation in the first area is sensed while the deformation in the second area is sensed;
   if the deformation in the first area satisfies a predetermined condition, identifying the deformation in the first area as an effective deformation and the deformation in the second area as an ineffective deformation; and
   if the deformation in the first area does not satisfy the predetermined condition, identifying the deformation in the first area and the deformation in the second area as an ineffective deformation.

15. The method of claim 14, further comprising:
   determining whether to identify both the deformation in the first area and the deformation in the second area as the effective deformation; and
   identifying both the first area and the second area as the effective deformation if it is determined to identify both the first area and the second area.

16. The method of claim 14, wherein the identifying only the first area comprises identifying only the deformation in the first area as the effective deformation if the deformation is wholly located within the first area and at least one predetermined margin area adjacent to the first area.

17. The method of claim 16, further comprising identifying only the deformation in the second area as the effective deformation if the deformation is wholly located within the second area and at least one predetermined margin area adjacent to the second area.

18. The method of claim 17, wherein the at least one predetermined margin area adjacent to the first area corresponds to at least one of a usage history of the deformable display, a manufacturer setting, a bending type, a usage history of a user, and/or a user setting.

19. The method of claim 18, wherein the at least one predetermined margin area adjacent to the second area corresponds to at least one of a usage history of the deformable display, a manufacturer setting, a bending type, a usage history of a user, and/or a user setting.

20. The method of claim 14, wherein the identifying only the deformation in the first area as the effective deformation is performed based on deformation information comprising at least one of a partial size of the deformation located in one or more areas of the deformable display, a total size of the deformation, an angle of the deformation, a location of the deformation, a number of areas where the deformation is located, and a holding time of the deformation.

21. The method of claim 14, wherein identifying only the deformation in the first area as the effective deformation is comprises determining whether to identify only the deformation in the first area as the effective deformation based on deformation information, an application being displayed on the deformable display and one or more active input areas corresponding to the application.

22. The method of claim 14, wherein the identifying only the deformation in the first area as the effective deformation is comprises determining whether to identify only the deformation in the first area based on deformation information and a skill level of a user.

23. The method of claim 22, wherein the skill level of the user is determined based upon a user profile comprising at least one of a date of first use of the deformable display by the user, a number of uses of the deformable display by the user, a total time of usage of the deformable display by the user, a metric which indicates an accuracy of deformation inputs by the user, and a total number of deformations input by the user.

24. The method of claim 23, wherein the skill level comprises at least one of a score of a user determined based upon the user profile and a category of a user determined based upon the user profile.

25. The method of claim 14, wherein the deformation information comprises a line that connects points at which the sensor outputs a greatest deformation value.

26. The method of claim 14, further comprising:
determining whether to identify none of the first area and the second area as the deformation area based on the deformation information; and
identifying none of the first area and the second area as the deformation area if it is determined to identify none of the first area and the second area.

27. A non-transitory computer readable medium having recorded thereon instructions which are executed by a computer to perform the method of claim 14.

* * * * *